US007177062B2

(12) United States Patent
Yano

(10) Patent No.: US 7,177,062 B2
(45) Date of Patent: Feb. 13, 2007

(54) DISPLAY DRIVE METHOD AND DISPLAY APPARATUS

(75) Inventor: Tomoya Yano, Kanagawa (JP)

(73) Assignee: Sony Corporation, Tokyo (JP)

( * ) Notice: Subject to any disclaimer, the term of this patent is extended or adjusted under 35 U.S.C. 154(b) by 102 days.

(21) Appl. No.: 10/494,649

(22) PCT Filed: Nov. 13, 2002

(86) PCT No.: PCT/JP02/11853

§ 371 (c)(1),
(2), (4) Date: May 5, 2004

(87) PCT Pub. No.: WO03/044764

PCT Pub. Date: May 30, 2003

(65) Prior Publication Data

US 2004/0263939 A1 Dec. 30, 2004

(30) Foreign Application Priority Data

Nov. 22, 2001 (JP) ............................ 2001-357784

(51) Int. Cl.
*G02B 26/00* (2006.01)

(52) U.S. Cl. ...................................................... 359/238

(58) Field of Classification Search ................. 359/238
See application file for complete search history.

(56) References Cited

U.S. PATENT DOCUMENTS 6,147,792 A 11/2000 Jones et al.
6,154,259 A * 11/2000 Hargis et al. ............... 348/756
6,462,728 B1 * 10/2002 Janssen et al. .............. 345/100

FOREIGN PATENT DOCUMENTS

| | | |
|---|---|---|
| EP | 0261901 | 3/1988 |
| EP | 0658870 | 9/1996 |
| EP | 0953956 | 11/1999 |
| JP | 63-226178 | 9/1988 |
| JP | 04-186282 | 7/1992 |
| JP | 7-168159 | 7/1995 |
| JP | 11-352941 | 12/1999 |
| JP | 2001-100707 | 4/2001 |
| JP | 2001-166749 | 6/2001 |
| JP | 2002-49361 | 2/2002 |
| JP | 2002-108264 | 4/2002 |

* cited by examiner

*Primary Examiner*—Ricky Mack
*Assistant Examiner*—Joseph Martinez
(74) *Attorney, Agent, or Firm*—Sonnenschein Nath & Rosenthal LLP

(57) ABSTRACT

The present invention is directed to a display method of performing image display, which comprises outputting corresponding subfield data every plural subfields by pulse width modulation to thereby drive a display element. In driving the display element, rewrite operations of all display pictures are completed in such a manner that subfield data are simultaneously outputted within one field time period, and respective plural subfield data are simultaneously outputted also at any time point within one field time period so that display drive is performed. By employing such display drive, rewrite operations with respect to respective subfields are completed after one field time period is completed. Thus, transfer speed (rate) of data to be transferred in correspondence with the minimum time width can be lowered to much degree as compared to display drive by the conventional subfield system.

4 Claims, 46 Drawing Sheets

| SUBFIELD | 0 | 1 | 2 | 3 | 4 | 5 | 6 | 7 | 8 | 9 | 10 | 11 |
|---|---|---|---|---|---|---|---|---|---|---|---|---|
| WEIGHTING | 1+1/12 | 2+1/12 | 4+1/12 | 8+1/12 | 16+1/12 | 32+1/12 | 64+1/12 | 128+1/12 | 128+1/12 | 128+1/12 | 128+1/12 | 128+1/12 |

FIG.8

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 1.0833333 |
| 2 | 0 | 1 | 0 | 0 | 0 | 0 | 0 | 0 | 0 | 0 | 0 | 0 | 2.0833333 |
| 3 | 1 | 1 | 0 | 0 | 0 | 0 | 0 | 0 | 0 | 0 | 0 | 0 | 3.1666667 |
| 4 | 0 | 0 | 1 | 0 | 0 | 0 | 0 | 0 | 0 | 0 | 0 | 0 | 4.0833333 |
| 5 | 1 | 0 | 1 | 0 | 0 | 0 | 0 | 0 | 0 | 0 | 0 | 0 | 5.1666667 |
| 6 | 0 | 1 | 1 | 0 | 0 | 0 | 0 | 0 | 0 | 0 | 0 | 0 | 6.1666667 |
| 7 | 1 | 1 | 1 | 0 | 0 | 0 | 0 | 0 | 0 | 0 | 0 | 0 | 7.25 |
| 8 | 0 | 0 | 0 | 1 | 0 | 0 | 0 | 0 | 0 | 0 | 0 | 0 | 8.0833333 |
| 9 | 1 | 0 | 0 | 1 | 0 | 0 | 0 | 0 | 0 | 0 | 0 | 0 | 9.1666667 |
| 10 | 0 | 1 | 0 | 1 | 0 | 0 | 0 | 0 | 0 | 0 | 0 | 0 | 10.166667 |
| 11 | 1 | 1 | 0 | 1 | 0 | 0 | 0 | 0 | 0 | 0 | 0 | 0 | 11.25 |
| 12 | 0 | 0 | 1 | 1 | 0 | 0 | 0 | 0 | 0 | 0 | 0 | 0 | 12.166667 |
| 13 | 1 | 0 | 1 | 1 | 0 | 0 | 0 | 0 | 0 | 0 | 0 | 0 | 13.25 |
| 14 | 0 | 1 | 1 | 1 | 0 | 0 | 0 | 0 | 0 | 0 | 0 | 0 | 14.25 |
| 15 | 1 | 1 | 1 | 1 | 0 | 0 | 0 | 0 | 0 | 0 | 0 | 0 | 15.333333 |
| 16 | 0 | 0 | 0 | 0 | 1 | 0 | 0 | 0 | 0 | 0 | 0 | 0 | 16.083333 |
| 17 | 1 | 0 | 0 | 0 | 1 | 0 | 0 | 0 | 0 | 0 | 0 | 0 | 17.166667 |
| 18 | 0 | 1 | 0 | 0 | 1 | 0 | 0 | 0 | 0 | 0 | 0 | 0 | 18.166667 |
| 19 | 1 | 1 | 0 | 0 | 1 | 0 | 0 | 0 | 0 | 0 | 0 | 0 | 19.25 |
| 20 | 0 | 0 | 1 | 0 | 1 | 0 | 0 | 0 | 0 | 0 | 0 | 0 | 20.166667 |
| 21 | 1 | 0 | 1 | 0 | 1 | 0 | 0 | 0 | 0 | 0 | 0 | 0 | 21.25 |
| 22 | 0 | 1 | 1 | 0 | 1 | 0 | 0 | 0 | 0 | 0 | 0 | 0 | 22.25 |
| 23 | 1 | 1 | 1 | 0 | 1 | 0 | 0 | 0 | 0 | 0 | 0 | 0 | 23.333333 |
| 24 | 0 | 0 | 0 | 1 | 1 | 0 | 0 | 0 | 0 | 0 | 0 | 0 | 24.166667 |
| 25 | 1 | 0 | 0 | 1 | 1 | 0 | 0 | 0 | 0 | 0 | 0 | 0 | 25.25 |
| 26 | 0 | 1 | 0 | 1 | 1 | 0 | 0 | 0 | 0 | 0 | 0 | 0 | 26.25 |
| 27 | 1 | 1 | 0 | 1 | 1 | 0 | 0 | 0 | 0 | 0 | 0 | 0 | 27.333333 |
| 28 | 0 | 0 | 1 | 1 | 1 | 0 | 0 | 0 | 0 | 0 | 0 | 0 | 28.25 |
| 29 | 1 | 0 | 1 | 1 | 1 | 0 | 0 | 0 | 0 | 0 | 0 | 0 | 29.333333 |
| 30 | 0 | 1 | 1 | 1 | 1 | 0 | 0 | 0 | 0 | 0 | 0 | 0 | 30.333333 |
| 31 | 1 | 1 | 1 | 1 | 1 | 0 | 0 | 0 | 0 | 0 | 0 | 0 | 31.416667 |

FIG.9

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 32 | 0 | 0 | 0 | 0 | 0 | 1 | 0 | 0 | 0 | 0 | 0 | 0 | 32.083333 |
| 33 | 1 | 0 | 0 | 0 | 0 | 1 | 0 | 0 | 0 | 0 | 0 | 0 | 33.166667 |
| 34 | 0 | 1 | 0 | 0 | 0 | 1 | 0 | 0 | 0 | 0 | 0 | 0 | 34.166667 |
| 35 | 1 | 1 | 0 | 0 | 0 | 1 | 0 | 0 | 0 | 0 | 0 | 0 | 35.25 |
| 36 | 0 | 0 | 1 | 0 | 0 | 1 | 0 | 0 | 0 | 0 | 0 | 0 | 36.166667 |
| 37 | 1 | 0 | 1 | 0 | 0 | 1 | 0 | 0 | 0 | 0 | 0 | 0 | 37.25 |
| 38 | 0 | 1 | 1 | 0 | 0 | 1 | 0 | 0 | 0 | 0 | 0 | 0 | 38.25 |
| 39 | 1 | 1 | 1 | 0 | 0 | 1 | 0 | 0 | 0 | 0 | 0 | 0 | 39.333333 |
| 40 | 0 | 0 | 0 | 1 | 0 | 1 | 0 | 0 | 0 | 0 | 0 | 0 | 40.166667 |
| 41 | 1 | 0 | 0 | 1 | 0 | 1 | 0 | 0 | 0 | 0 | 0 | 0 | 41.25 |
| 42 | 0 | 1 | 0 | 1 | 0 | 1 | 0 | 0 | 0 | 0 | 0 | 0 | 42.25 |
| 43 | 1 | 1 | 0 | 1 | 0 | 1 | 0 | 0 | 0 | 0 | 0 | 0 | 43.333333 |
| 44 | 0 | 0 | 1 | 1 | 0 | 1 | 0 | 0 | 0 | 0 | 0 | 0 | 44.25 |
| 45 | 1 | 0 | 1 | 1 | 0 | 1 | 0 | 0 | 0 | 0 | 0 | 0 | 45.333333 |
| 46 | 0 | 1 | 1 | 1 | 0 | 1 | 0 | 0 | 0 | 0 | 0 | 0 | 46.333333 |
| 47 | 1 | 1 | 1 | 1 | 0 | 1 | 0 | 0 | 0 | 0 | 0 | 0 | 47.416667 |
| 48 | 0 | 0 | 0 | 0 | 1 | 1 | 0 | 0 | 0 | 0 | 0 | 0 | 48.166667 |
| 49 | 1 | 0 | 0 | 0 | 1 | 1 | 0 | 0 | 0 | 0 | 0 | 0 | 49.25 |
| 50 | 0 | 1 | 0 | 0 | 1 | 1 | 0 | 0 | 0 | 0 | 0 | 0 | 50.25 |
| 51 | 1 | 1 | 0 | 0 | 1 | 1 | 0 | 0 | 0 | 0 | 0 | 0 | 51.333333 |
| 52 | 0 | 0 | 1 | 0 | 1 | 1 | 0 | 0 | 0 | 0 | 0 | 0 | 52.25 |
| 53 | 1 | 0 | 1 | 0 | 1 | 1 | 0 | 0 | 0 | 0 | 0 | 0 | 53.333333 |
| 54 | 0 | 1 | 1 | 0 | 1 | 1 | 0 | 0 | 0 | 0 | 0 | 0 | 54.333333 |
| 55 | 1 | 1 | 1 | 0 | 1 | 1 | 0 | 0 | 0 | 0 | 0 | 0 | 55.416667 |
| 56 | 0 | 0 | 0 | 1 | 1 | 1 | 0 | 0 | 0 | 0 | 0 | 0 | 56.25 |
| 57 | 1 | 0 | 0 | 1 | 1 | 1 | 0 | 0 | 0 | 0 | 0 | 0 | 57.333333 |
| 58 | 0 | 1 | 0 | 1 | 1 | 1 | 0 | 0 | 0 | 0 | 0 | 0 | 58.333333 |
| 59 | 1 | 1 | 0 | 1 | 1 | 1 | 0 | 0 | 0 | 0 | 0 | 0 | 59.416667 |
| 60 | 0 | 0 | 1 | 1 | 1 | 1 | 0 | 0 | 0 | 0 | 0 | 0 | 60.333333 |
| 61 | 1 | 0 | 1 | 1 | 1 | 1 | 0 | 0 | 0 | 0 | 0 | 0 | 61.416667 |
| 62 | 0 | 1 | 1 | 1 | 1 | 1 | 0 | 0 | 0 | 0 | 0 | 0 | 62.416667 |
| 63 | 1 | 1 | 1 | 1 | 1 | 1 | 0 | 0 | 0 | 0 | 0 | 0 | 63.5 |

FIG. 10

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 64 | 0 | 0 | 0 | 0 | 0 | 0 | 1 | 0 | 0 | 0 | 0 | 0 | 64.083333 |
| 65 | 1 | 0 | 0 | 0 | 0 | 0 | 1 | 0 | 0 | 0 | 0 | 0 | 65.166667 |
| 66 | 0 | 1 | 0 | 0 | 0 | 0 | 1 | 0 | 0 | 0 | 0 | 0 | 66.166667 |
| 67 | 1 | 1 | 0 | 0 | 0 | 0 | 1 | 0 | 0 | 0 | 0 | 0 | 67.25 |
| 68 | 0 | 0 | 1 | 0 | 0 | 0 | 1 | 0 | 0 | 0 | 0 | 0 | 68.166667 |
| 69 | 1 | 0 | 1 | 0 | 0 | 0 | 1 | 0 | 0 | 0 | 0 | 0 | 69.25 |
| 70 | 0 | 1 | 1 | 0 | 0 | 0 | 1 | 0 | 0 | 0 | 0 | 0 | 70.25 |
| 71 | 1 | 1 | 1 | 0 | 0 | 0 | 1 | 0 | 0 | 0 | 0 | 0 | 71.333333 |
| 72 | 0 | 0 | 0 | 1 | 0 | 0 | 1 | 0 | 0 | 0 | 0 | 0 | 72.166667 |
| 73 | 1 | 0 | 0 | 1 | 0 | 0 | 1 | 0 | 0 | 0 | 0 | 0 | 73.25 |
| 74 | 0 | 1 | 0 | 1 | 0 | 0 | 1 | 0 | 0 | 0 | 0 | 0 | 74.25 |
| 75 | 1 | 1 | 0 | 1 | 0 | 0 | 1 | 0 | 0 | 0 | 0 | 0 | 75.333333 |
| 76 | 0 | 0 | 1 | 1 | 0 | 0 | 1 | 0 | 0 | 0 | 0 | 0 | 76.25 |
| 77 | 1 | 0 | 1 | 1 | 0 | 0 | 1 | 0 | 0 | 0 | 0 | 0 | 77.333333 |
| 78 | 0 | 1 | 1 | 1 | 0 | 0 | 1 | 0 | 0 | 0 | 0 | 0 | 78.333333 |
| 79 | 1 | 1 | 1 | 1 | 0 | 0 | 1 | 0 | 0 | 0 | 0 | 0 | 79.416667 |
| 80 | 0 | 0 | 0 | 0 | 1 | 0 | 1 | 0 | 0 | 0 | 0 | 0 | 80.166667 |
| 81 | 1 | 0 | 0 | 0 | 1 | 0 | 1 | 0 | 0 | 0 | 0 | 0 | 81.25 |
| 82 | 0 | 1 | 0 | 0 | 1 | 0 | 1 | 0 | 0 | 0 | 0 | 0 | 82.25 |
| 83 | 1 | 1 | 0 | 0 | 1 | 0 | 1 | 0 | 0 | 0 | 0 | 0 | 83.333333 |
| 84 | 0 | 0 | 1 | 0 | 1 | 0 | 1 | 0 | 0 | 0 | 0 | 0 | 84.25 |
| 85 | 1 | 0 | 1 | 0 | 1 | 0 | 1 | 0 | 0 | 0 | 0 | 0 | 85.333333 |
| 86 | 0 | 1 | 1 | 0 | 1 | 0 | 1 | 0 | 0 | 0 | 0 | 0 | 86.333333 |
| 87 | 1 | 1 | 1 | 0 | 1 | 0 | 1 | 0 | 0 | 0 | 0 | 0 | 87.416667 |
| 88 | 0 | 0 | 0 | 1 | 1 | 0 | 1 | 0 | 0 | 0 | 0 | 0 | 88.25 |
| 89 | 1 | 0 | 0 | 1 | 1 | 0 | 1 | 0 | 0 | 0 | 0 | 0 | 89.333333 |
| 90 | 0 | 1 | 0 | 1 | 1 | 0 | 1 | 0 | 0 | 0 | 0 | 0 | 90.333333 |
| 91 | 1 | 1 | 0 | 1 | 1 | 0 | 1 | 0 | 0 | 0 | 0 | 0 | 91.416667 |
| 92 | 0 | 0 | 1 | 1 | 1 | 0 | 1 | 0 | 0 | 0 | 0 | 0 | 92.333333 |
| 93 | 1 | 0 | 1 | 1 | 1 | 0 | 1 | 0 | 0 | 0 | 0 | 0 | 93.416667 |
| 94 | 0 | 1 | 1 | 1 | 1 | 0 | 1 | 0 | 0 | 0 | 0 | 0 | 94.416667 |
| 95 | 1 | 1 | 1 | 1 | 1 | 0 | 1 | 0 | 0 | 0 | 0 | 0 | 95.5 |

FIG. 11

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 96 | 0 | 0 | 0 | 0 | 0 | 1 | 1 | 0 | 0 | 0 | 0 | 0 | 96.166667 |
| 97 | 1 | 0 | 0 | 0 | 0 | 1 | 1 | 0 | 0 | 0 | 0 | 0 | 97.25 |
| 98 | 0 | 1 | 0 | 0 | 0 | 1 | 1 | 0 | 0 | 0 | 0 | 0 | 98.25 |
| 99 | 1 | 1 | 0 | 0 | 0 | 1 | 1 | 0 | 0 | 0 | 0 | 0 | 99.333333 |
| 100 | 0 | 0 | 1 | 0 | 0 | 1 | 1 | 0 | 0 | 0 | 0 | 0 | 100.25 |
| 101 | 1 | 0 | 1 | 0 | 0 | 1 | 1 | 0 | 0 | 0 | 0 | 0 | 101.33333 |
| 102 | 0 | 1 | 1 | 0 | 0 | 1 | 1 | 0 | 0 | 0 | 0 | 0 | 102.33333 |
| 103 | 1 | 1 | 1 | 0 | 0 | 1 | 1 | 0 | 0 | 0 | 0 | 0 | 103.41667 |
| 104 | 0 | 0 | 0 | 1 | 0 | 1 | 1 | 0 | 0 | 0 | 0 | 0 | 104.25 |
| 105 | 1 | 0 | 0 | 1 | 0 | 1 | 1 | 0 | 0 | 0 | 0 | 0 | 105.33333 |
| 106 | 0 | 1 | 0 | 1 | 0 | 1 | 1 | 0 | 0 | 0 | 0 | 0 | 106.33333 |
| 107 | 1 | 1 | 0 | 1 | 0 | 1 | 1 | 0 | 0 | 0 | 0 | 0 | 107.41667 |
| 108 | 0 | 0 | 1 | 1 | 0 | 1 | 1 | 0 | 0 | 0 | 0 | 0 | 108.33333 |
| 109 | 1 | 0 | 1 | 1 | 0 | 1 | 1 | 0 | 0 | 0 | 0 | 0 | 109.41667 |
| 110 | 0 | 1 | 1 | 1 | 0 | 1 | 1 | 0 | 0 | 0 | 0 | 0 | 110.41667 |
| 111 | 1 | 1 | 1 | 1 | 0 | 1 | 1 | 0 | 0 | 0 | 0 | 0 | 111.5 |
| 112 | 0 | 0 | 0 | 0 | 1 | 1 | 1 | 0 | 0 | 0 | 0 | 0 | 112.25 |
| 113 | 1 | 0 | 0 | 0 | 1 | 1 | 1 | 0 | 0 | 0 | 0 | 0 | 113.33333 |
| 114 | 0 | 1 | 0 | 0 | 1 | 1 | 1 | 0 | 0 | 0 | 0 | 0 | 114.33333 |
| 115 | 1 | 1 | 0 | 0 | 1 | 1 | 1 | 0 | 0 | 0 | 0 | 0 | 115.41667 |
| 116 | 0 | 0 | 1 | 0 | 1 | 1 | 1 | 0 | 0 | 0 | 0 | 0 | 116.33333 |
| 117 | 1 | 0 | 1 | 0 | 1 | 1 | 1 | 0 | 0 | 0 | 0 | 0 | 117.41667 |
| 118 | 0 | 1 | 1 | 0 | 1 | 1 | 1 | 0 | 0 | 0 | 0 | 0 | 118.41667 |
| 119 | 1 | 1 | 1 | 0 | 1 | 1 | 1 | 0 | 0 | 0 | 0 | 0 | 119.5 |
| 120 | 0 | 0 | 0 | 1 | 1 | 1 | 1 | 0 | 0 | 0 | 0 | 0 | 120.33333 |
| 121 | 1 | 0 | 0 | 1 | 1 | 1 | 1 | 0 | 0 | 0 | 0 | 0 | 121.41667 |
| 122 | 0 | 1 | 0 | 1 | 1 | 1 | 1 | 0 | 0 | 0 | 0 | 0 | 122.41667 |
| 123 | 1 | 1 | 0 | 1 | 1 | 1 | 1 | 0 | 0 | 0 | 0 | 0 | 123.5 |
| 124 | 0 | 0 | 1 | 1 | 1 | 1 | 1 | 0 | 0 | 0 | 0 | 0 | 124.41667 |
| 125 | 1 | 0 | 1 | 1 | 1 | 1 | 1 | 0 | 0 | 0 | 0 | 0 | 125.5 |
| 126 | 0 | 1 | 1 | 1 | 1 | 1 | 1 | 0 | 0 | 0 | 0 | 0 | 126.5 |
| 127 | 1 | 1 | 1 | 1 | 1 | 1 | 1 | 0 | 0 | 0 | 0 | 0 | 127.58333 |

FIG.12

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 128 | 0 | 0 | 0 | 0 | 0 | 0 | 0 | 1 | 0 | 0 | 0 | 0 | 128.08333 |
| 129 | 1 | 0 | 0 | 0 | 0 | 0 | 0 | 1 | 0 | 0 | 0 | 0 | 129.16667 |
| 130 | 0 | 1 | 0 | 0 | 0 | 0 | 0 | 1 | 0 | 0 | 0 | 0 | 130.16667 |
| 131 | 1 | 1 | 0 | 0 | 0 | 0 | 0 | 1 | 0 | 0 | 0 | 0 | 131.25 |
| 132 | 0 | 0 | 1 | 0 | 0 | 0 | 0 | 1 | 0 | 0 | 0 | 0 | 132.16667 |
| 133 | 1 | 0 | 1 | 0 | 0 | 0 | 0 | 1 | 0 | 0 | 0 | 0 | 133.25 |
| 134 | 0 | 1 | 1 | 0 | 0 | 0 | 0 | 1 | 0 | 0 | 0 | 0 | 134.25 |
| 135 | 1 | 1 | 1 | 0 | 0 | 0 | 0 | 1 | 0 | 0 | 0 | 0 | 135.33333 |
| 136 | 0 | 0 | 0 | 1 | 0 | 0 | 0 | 1 | 0 | 0 | 0 | 0 | 136.16667 |
| 137 | 1 | 0 | 0 | 1 | 0 | 0 | 0 | 1 | 0 | 0 | 0 | 0 | 137.25 |
| 138 | 0 | 1 | 0 | 1 | 0 | 0 | 0 | 1 | 0 | 0 | 0 | 0 | 138.25 |
| 139 | 1 | 1 | 0 | 1 | 0 | 0 | 0 | 1 | 0 | 0 | 0 | 0 | 139.33333 |
| 140 | 0 | 0 | 1 | 1 | 0 | 0 | 0 | 1 | 0 | 0 | 0 | 0 | 140.25 |
| 141 | 1 | 0 | 1 | 1 | 0 | 0 | 0 | 1 | 0 | 0 | 0 | 0 | 141.33333 |
| 142 | 0 | 1 | 1 | 1 | 0 | 0 | 0 | 1 | 0 | 0 | 0 | 0 | 142.33333 |
| 143 | 1 | 1 | 1 | 1 | 0 | 0 | 0 | 1 | 0 | 0 | 0 | 0 | 143.41667 |
| 144 | 0 | 0 | 0 | 0 | 1 | 0 | 0 | 1 | 0 | 0 | 0 | 0 | 144.16667 |
| 145 | 1 | 0 | 0 | 0 | 1 | 0 | 0 | 1 | 0 | 0 | 0 | 0 | 145.25 |
| 146 | 0 | 1 | 0 | 0 | 1 | 0 | 0 | 1 | 0 | 0 | 0 | 0 | 146.25 |
| 147 | 1 | 1 | 0 | 0 | 1 | 0 | 0 | 1 | 0 | 0 | 0 | 0 | 147.33333 |
| 148 | 0 | 0 | 1 | 0 | 1 | 0 | 0 | 1 | 0 | 0 | 0 | 0 | 148.25 |
| 149 | 1 | 0 | 1 | 0 | 1 | 0 | 0 | 1 | 0 | 0 | 0 | 0 | 149.33333 |
| 150 | 0 | 1 | 1 | 0 | 1 | 0 | 0 | 1 | 0 | 0 | 0 | 0 | 150.33333 |
| 151 | 1 | 1 | 1 | 0 | 1 | 0 | 0 | 1 | 0 | 0 | 0 | 0 | 151.41667 |
| 152 | 0 | 0 | 0 | 1 | 1 | 0 | 0 | 1 | 0 | 0 | 0 | 0 | 152.25 |
| 153 | 1 | 0 | 0 | 1 | 1 | 0 | 0 | 1 | 0 | 0 | 0 | 0 | 153.33333 |
| 154 | 0 | 1 | 0 | 1 | 1 | 0 | 0 | 1 | 0 | 0 | 0 | 0 | 154.33333 |
| 155 | 1 | 1 | 0 | 1 | 1 | 0 | 0 | 1 | 0 | 0 | 0 | 0 | 155.41667 |
| 156 | 0 | 0 | 1 | 1 | 1 | 0 | 0 | 1 | 0 | 0 | 0 | 0 | 156.33333 |
| 157 | 1 | 0 | 1 | 1 | 1 | 0 | 0 | 1 | 0 | 0 | 0 | 0 | 157.41667 |
| 158 | 0 | 1 | 1 | 1 | 1 | 0 | 0 | 1 | 0 | 0 | 0 | 0 | 158.41667 |
| 159 | 1 | 1 | 1 | 1 | 1 | 0 | 0 | 1 | 0 | 0 | 0 | 0 | 159.5 |

FIG.13

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 160 | 0 | 0 | 0 | 0 | 0 | 1 | 0 | 1 | 0 | 0 | 0 | 0 | 160.16667 |
| 161 | 1 | 0 | 0 | 0 | 0 | 1 | 0 | 1 | 0 | 0 | 0 | 0 | 161.25 |
| 162 | 0 | 1 | 0 | 0 | 0 | 1 | 0 | 1 | 0 | 0 | 0 | 0 | 162.25 |
| 163 | 1 | 1 | 0 | 0 | 0 | 1 | 0 | 1 | 0 | 0 | 0 | 0 | 163.33333 |
| 164 | 0 | 0 | 1 | 0 | 0 | 1 | 0 | 1 | 0 | 0 | 0 | 0 | 164.25 |
| 165 | 1 | 0 | 1 | 0 | 0 | 1 | 0 | 1 | 0 | 0 | 0 | 0 | 165.33333 |
| 166 | 0 | 1 | 1 | 0 | 0 | 1 | 0 | 1 | 0 | 0 | 0 | 0 | 166.33333 |
| 167 | 1 | 1 | 1 | 0 | 0 | 1 | 0 | 1 | 0 | 0 | 0 | 0 | 167.41667 |
| 168 | 0 | 0 | 0 | 1 | 0 | 1 | 0 | 1 | 0 | 0 | 0 | 0 | 168.25 |
| 169 | 1 | 0 | 0 | 1 | 0 | 1 | 0 | 1 | 0 | 0 | 0 | 0 | 169.33333 |
| 170 | 0 | 1 | 0 | 1 | 0 | 1 | 0 | 1 | 0 | 0 | 0 | 0 | 170.33333 |
| 171 | 1 | 1 | 0 | 1 | 0 | 1 | 0 | 1 | 0 | 0 | 0 | 0 | 171.41667 |
| 172 | 0 | 0 | 1 | 1 | 0 | 1 | 0 | 1 | 0 | 0 | 0 | 0 | 172.33333 |
| 173 | 1 | 0 | 1 | 1 | 0 | 1 | 0 | 1 | 0 | 0 | 0 | 0 | 173.41667 |
| 174 | 0 | 1 | 1 | 1 | 0 | 1 | 0 | 1 | 0 | 0 | 0 | 0 | 174.41667 |
| 175 | 1 | 1 | 1 | 1 | 0 | 1 | 0 | 1 | 0 | 0 | 0 | 0 | 175.5 |
| 176 | 0 | 0 | 0 | 0 | 1 | 1 | 0 | 1 | 0 | 0 | 0 | 0 | 176.25 |
| 177 | 1 | 0 | 0 | 0 | 1 | 1 | 0 | 1 | 0 | 0 | 0 | 0 | 177.33333 |
| 178 | 0 | 1 | 0 | 0 | 1 | 1 | 0 | 1 | 0 | 0 | 0 | 0 | 178.33333 |
| 179 | 1 | 1 | 0 | 0 | 1 | 1 | 0 | 1 | 0 | 0 | 0 | 0 | 179.41667 |
| 180 | 0 | 0 | 1 | 0 | 1 | 1 | 0 | 1 | 0 | 0 | 0 | 0 | 180.33333 |
| 181 | 1 | 0 | 1 | 0 | 1 | 1 | 0 | 1 | 0 | 0 | 0 | 0 | 181.41667 |
| 182 | 0 | 1 | 1 | 0 | 1 | 1 | 0 | 1 | 0 | 0 | 0 | 0 | 182.41667 |
| 183 | 1 | 1 | 1 | 0 | 1 | 1 | 0 | 1 | 0 | 0 | 0 | 0 | 183.5 |
| 184 | 0 | 0 | 0 | 1 | 1 | 1 | 0 | 1 | 0 | 0 | 0 | 0 | 184.33333 |
| 185 | 1 | 0 | 0 | 1 | 1 | 1 | 0 | 1 | 0 | 0 | 0 | 0 | 185.41667 |
| 186 | 0 | 1 | 0 | 1 | 1 | 1 | 0 | 1 | 0 | 0 | 0 | 0 | 186.41667 |
| 187 | 1 | 1 | 0 | 1 | 1 | 1 | 0 | 1 | 0 | 0 | 0 | 0 | 187.5 |
| 188 | 0 | 0 | 1 | 1 | 1 | 1 | 0 | 1 | 0 | 0 | 0 | 0 | 188.41667 |
| 189 | 1 | 0 | 1 | 1 | 1 | 1 | 0 | 1 | 0 | 0 | 0 | 0 | 189.5 |
| 190 | 0 | 1 | 1 | 1 | 1 | 1 | 0 | 1 | 0 | 0 | 0 | 0 | 190.5 |
| 191 | 1 | 1 | 1 | 1 | 1 | 1 | 0 | 1 | 0 | 0 | 0 | 0 | 191.58333 |

FIG.14

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 192 | 0 | 0 | 0 | 0 | 0 | 0 | 1 | 1 | 0 | 0 | 0 | 0 | 192.16667 |
| 193 | 1 | 0 | 0 | 0 | 0 | 0 | 1 | 1 | 0 | 0 | 0 | 0 | 193.25 |
| 194 | 0 | 1 | 0 | 0 | 0 | 0 | 1 | 1 | 0 | 0 | 0 | 0 | 194.25 |
| 195 | 1 | 1 | 0 | 0 | 0 | 0 | 1 | 1 | 0 | 0 | 0 | 0 | 195.33333 |
| 196 | 0 | 0 | 1 | 0 | 0 | 0 | 1 | 1 | 0 | 0 | 0 | 0 | 196.25 |
| 197 | 1 | 0 | 1 | 0 | 0 | 0 | 1 | 1 | 0 | 0 | 0 | 0 | 197.33333 |
| 198 | 0 | 1 | 1 | 0 | 0 | 0 | 1 | 1 | 0 | 0 | 0 | 0 | 198.33333 |
| 199 | 1 | 1 | 1 | 0 | 0 | 0 | 1 | 1 | 0 | 0 | 0 | 0 | 199.41667 |
| 200 | 0 | 0 | 0 | 1 | 0 | 0 | 1 | 1 | 0 | 0 | 0 | 0 | 200.25 |
| 201 | 1 | 0 | 0 | 1 | 0 | 0 | 1 | 1 | 0 | 0 | 0 | 0 | 201.33333 |
| 202 | 0 | 1 | 0 | 1 | 0 | 0 | 1 | 1 | 0 | 0 | 0 | 0 | 202.33333 |
| 203 | 1 | 1 | 0 | 1 | 0 | 0 | 1 | 1 | 0 | 0 | 0 | 0 | 203.41667 |
| 204 | 0 | 0 | 1 | 1 | 0 | 0 | 1 | 1 | 0 | 0 | 0 | 0 | 204.33333 |
| 205 | 1 | 0 | 1 | 1 | 0 | 0 | 1 | 1 | 0 | 0 | 0 | 0 | 205.41667 |
| 206 | 0 | 1 | 1 | 1 | 0 | 0 | 1 | 1 | 0 | 0 | 0 | 0 | 206.41667 |
| 207 | 1 | 1 | 1 | 1 | 0 | 0 | 1 | 1 | 0 | 0 | 0 | 0 | 207.5 |
| 208 | 0 | 0 | 0 | 0 | 1 | 0 | 1 | 1 | 0 | 0 | 0 | 0 | 208.25 |
| 209 | 1 | 0 | 0 | 0 | 1 | 0 | 1 | 1 | 0 | 0 | 0 | 0 | 209.33333 |
| 210 | 0 | 1 | 0 | 0 | 1 | 0 | 1 | 1 | 0 | 0 | 0 | 0 | 210.33333 |
| 211 | 1 | 1 | 0 | 0 | 1 | 0 | 1 | 1 | 0 | 0 | 0 | 0 | 211.41667 |
| 212 | 0 | 0 | 1 | 0 | 1 | 0 | 1 | 1 | 0 | 0 | 0 | 0 | 212.33333 |
| 213 | 1 | 0 | 1 | 0 | 1 | 0 | 1 | 1 | 0 | 0 | 0 | 0 | 213.41667 |
| 214 | 0 | 1 | 1 | 0 | 1 | 0 | 1 | 1 | 0 | 0 | 0 | 0 | 214.41667 |
| 215 | 1 | 1 | 1 | 0 | 1 | 0 | 1 | 1 | 0 | 0 | 0 | 0 | 215.5 |
| 216 | 0 | 0 | 0 | 1 | 1 | 0 | 1 | 1 | 0 | 0 | 0 | 0 | 216.33333 |
| 217 | 1 | 0 | 0 | 1 | 1 | 0 | 1 | 1 | 0 | 0 | 0 | 0 | 217.41667 |
| 218 | 0 | 1 | 0 | 1 | 1 | 0 | 1 | 1 | 0 | 0 | 0 | 0 | 218.41667 |
| 219 | 1 | 1 | 0 | 1 | 1 | 0 | 1 | 1 | 0 | 0 | 0 | 0 | 219.5 |
| 220 | 0 | 0 | 1 | 1 | 1 | 0 | 1 | 1 | 0 | 0 | 0 | 0 | 220.41667 |
| 221 | 1 | 0 | 1 | 1 | 1 | 0 | 1 | 1 | 0 | 0 | 0 | 0 | 221.5 |
| 222 | 0 | 1 | 1 | 1 | 1 | 0 | 1 | 1 | 0 | 0 | 0 | 0 | 222.5 |
| 223 | 1 | 1 | 1 | 1 | 1 | 0 | 1 | 1 | 0 | 0 | 0 | 0 | 223.58333 |

FIG.15

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 224 | 0 | 0 | 0 | 0 | 0 | 1 | 1 | 1 | 0 | 0 | 0 | 0 | 224.25 |
| 225 | 1 | 0 | 0 | 0 | 0 | 1 | 1 | 1 | 0 | 0 | 0 | 0 | 225.33333 |
| 226 | 0 | 1 | 0 | 0 | 0 | 1 | 1 | 1 | 0 | 0 | 0 | 0 | 226.33333 |
| 227 | 1 | 1 | 0 | 0 | 0 | 1 | 1 | 1 | 0 | 0 | 0 | 0 | 227.41667 |
| 228 | 0 | 0 | 1 | 0 | 0 | 1 | 1 | 1 | 0 | 0 | 0 | 0 | 228.33333 |
| 229 | 1 | 0 | 1 | 0 | 0 | 1 | 1 | 1 | 0 | 0 | 0 | 0 | 229.41667 |
| 230 | 0 | 1 | 1 | 0 | 0 | 1 | 1 | 1 | 0 | 0 | 0 | 0 | 230.41667 |
| 231 | 1 | 1 | 1 | 0 | 0 | 1 | 1 | 1 | 0 | 0 | 0 | 0 | 231.5 |
| 232 | 0 | 0 | 0 | 1 | 0 | 1 | 1 | 1 | 0 | 0 | 0 | 0 | 232.33333 |
| 233 | 1 | 0 | 0 | 1 | 0 | 1 | 1 | 1 | 0 | 0 | 0 | 0 | 233.41667 |
| 234 | 0 | 1 | 0 | 1 | 0 | 1 | 1 | 1 | 0 | 0 | 0 | 0 | 234.41667 |
| 235 | 1 | 1 | 0 | 1 | 0 | 1 | 1 | 1 | 0 | 0 | 0 | 0 | 235.5 |
| 236 | 0 | 0 | 1 | 1 | 0 | 1 | 1 | 1 | 0 | 0 | 0 | 0 | 236.41667 |
| 237 | 1 | 0 | 1 | 1 | 0 | 1 | 1 | 1 | 0 | 0 | 0 | 0 | 237.5 |
| 238 | 0 | 1 | 1 | 1 | 0 | 1 | 1 | 1 | 0 | 0 | 0 | 0 | 238.5 |
| 239 | 1 | 1 | 1 | 1 | 0 | 1 | 1 | 1 | 0 | 0 | 0 | 0 | 239.58333 |
| 240 | 0 | 0 | 0 | 0 | 1 | 1 | 1 | 1 | 0 | 0 | 0 | 0 | 240.33333 |
| 241 | 1 | 0 | 0 | 0 | 1 | 1 | 1 | 1 | 0 | 0 | 0 | 0 | 241.41667 |
| 242 | 0 | 1 | 0 | 0 | 1 | 1 | 1 | 1 | 0 | 0 | 0 | 0 | 242.41667 |
| 243 | 1 | 1 | 0 | 0 | 1 | 1 | 1 | 1 | 0 | 0 | 0 | 0 | 243.5 |
| 244 | 0 | 0 | 1 | 0 | 1 | 1 | 1 | 1 | 0 | 0 | 0 | 0 | 244.41667 |
| 245 | 1 | 0 | 1 | 0 | 1 | 1 | 1 | 1 | 0 | 0 | 0 | 0 | 245.5 |
| 246 | 0 | 1 | 1 | 0 | 1 | 1 | 1 | 1 | 0 | 0 | 0 | 0 | 246.5 |
| 247 | 1 | 1 | 1 | 0 | 1 | 1 | 1 | 1 | 0 | 0 | 0 | 0 | 247.58333 |
| 248 | 0 | 0 | 0 | 1 | 1 | 1 | 1 | 1 | 0 | 0 | 0 | 0 | 248.41667 |
| 249 | 1 | 0 | 0 | 1 | 1 | 1 | 1 | 1 | 0 | 0 | 0 | 0 | 249.5 |
| 250 | 0 | 1 | 0 | 1 | 1 | 1 | 1 | 1 | 0 | 0 | 0 | 0 | 250.5 |
| 251 | 1 | 1 | 0 | 1 | 1 | 1 | 1 | 1 | 0 | 0 | 0 | 0 | 251.58333 |
| 252 | 0 | 0 | 1 | 1 | 1 | 1 | 1 | 1 | 0 | 0 | 0 | 0 | 252.5 |
| 253 | 1 | 0 | 1 | 1 | 1 | 1 | 1 | 1 | 0 | 0 | 0 | 0 | 253.58333 |
| 254 | 0 | 1 | 1 | 1 | 1 | 1 | 1 | 1 | 0 | 0 | 0 | 0 | 254.58333 |
| 255 | 1 | 1 | 1 | 1 | 1 | 1 | 1 | 1 | 0 | 0 | 0 | 0 | 255.66667 |

FIG. 16

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 256 | 0 | 0 | 0 | 0 | 0 | 0 | 0 | 1 | 1 | 0 | 0 | 0 | 256.16667 |
| 257 | 1 | 0 | 0 | 0 | 0 | 0 | 0 | 1 | 1 | 0 | 0 | 0 | 257.25 |
| 258 | 0 | 1 | 0 | 0 | 0 | 0 | 0 | 1 | 1 | 0 | 0 | 0 | 258.25 |
| 259 | 1 | 1 | 0 | 0 | 0 | 0 | 0 | 1 | 1 | 0 | 0 | 0 | 259.33333 |
| 260 | 0 | 0 | 1 | 0 | 0 | 0 | 0 | 1 | 1 | 0 | 0 | 0 | 260.25 |
| 261 | 1 | 0 | 1 | 0 | 0 | 0 | 0 | 1 | 1 | 0 | 0 | 0 | 261.33333 |
| 262 | 0 | 1 | 1 | 0 | 0 | 0 | 0 | 1 | 1 | 0 | 0 | 0 | 262.33333 |
| 263 | 1 | 1 | 1 | 0 | 0 | 0 | 0 | 1 | 1 | 0 | 0 | 0 | 263.41667 |
| 264 | 0 | 0 | 0 | 1 | 0 | 0 | 0 | 1 | 1 | 0 | 0 | 0 | 264.25 |
| 265 | 1 | 0 | 0 | 1 | 0 | 0 | 0 | 1 | 1 | 0 | 0 | 0 | 265.33333 |
| 266 | 0 | 1 | 0 | 1 | 0 | 0 | 0 | 1 | 1 | 0 | 0 | 0 | 266.33333 |
| 267 | 1 | 1 | 0 | 1 | 0 | 0 | 0 | 1 | 1 | 0 | 0 | 0 | 267.41667 |
| 268 | 0 | 0 | 1 | 1 | 0 | 0 | 0 | 1 | 1 | 0 | 0 | 0 | 268.33333 |
| 269 | 1 | 0 | 1 | 1 | 0 | 0 | 0 | 1 | 1 | 0 | 0 | 0 | 269.41667 |
| 270 | 0 | 1 | 1 | 1 | 0 | 0 | 0 | 1 | 1 | 0 | 0 | 0 | 270.41667 |
| 271 | 1 | 1 | 1 | 1 | 0 | 0 | 0 | 1 | 1 | 0 | 0 | 0 | 271.5 |
| 272 | 0 | 0 | 0 | 0 | 1 | 0 | 0 | 1 | 1 | 0 | 0 | 0 | 272.25 |
| 273 | 1 | 0 | 0 | 0 | 1 | 0 | 0 | 1 | 1 | 0 | 0 | 0 | 273.33333 |
| 274 | 0 | 1 | 0 | 0 | 1 | 0 | 0 | 1 | 1 | 0 | 0 | 0 | 274.33333 |
| 275 | 1 | 1 | 0 | 0 | 1 | 0 | 0 | 1 | 1 | 0 | 0 | 0 | 275.41667 |
| 276 | 0 | 0 | 1 | 0 | 1 | 0 | 0 | 1 | 1 | 0 | 0 | 0 | 276.33333 |
| 277 | 1 | 0 | 1 | 0 | 1 | 0 | 0 | 1 | 1 | 0 | 0 | 0 | 277.41667 |
| 278 | 0 | 1 | 1 | 0 | 1 | 0 | 0 | 1 | 1 | 0 | 0 | 0 | 278.41667 |
| 279 | 1 | 1 | 1 | 0 | 1 | 0 | 0 | 1 | 1 | 0 | 0 | 0 | 279.5 |
| 280 | 0 | 0 | 0 | 1 | 1 | 0 | 0 | 1 | 1 | 0 | 0 | 0 | 280.33333 |
| 281 | 1 | 0 | 0 | 1 | 1 | 0 | 0 | 1 | 1 | 0 | 0 | 0 | 281.41667 |
| 282 | 0 | 1 | 0 | 1 | 1 | 0 | 0 | 1 | 1 | 0 | 0 | 0 | 282.41667 |
| 283 | 1 | 1 | 0 | 1 | 1 | 0 | 0 | 1 | 1 | 0 | 0 | 0 | 283.5 |
| 284 | 0 | 0 | 1 | 1 | 1 | 0 | 0 | 1 | 1 | 0 | 0 | 0 | 284.41667 |
| 285 | 1 | 0 | 1 | 1 | 1 | 0 | 0 | 1 | 1 | 0 | 0 | 0 | 285.5 |
| 286 | 0 | 1 | 1 | 1 | 1 | 0 | 0 | 1 | 1 | 0 | 0 | 0 | 286.5 |
| 287 | 1 | 1 | 1 | 1 | 1 | 0 | 0 | 1 | 1 | 0 | 0 | 0 | 287.58333 |

FIG.17

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 288 | 0 | 0 | 0 | 0 | 0 | 1 | 0 | 1 | 1 | 0 | 0 | 0 | 288.25 |
| 289 | 1 | 0 | 0 | 0 | 0 | 1 | 0 | 1 | 1 | 0 | 0 | 0 | 289.33333 |
| 290 | 0 | 1 | 0 | 0 | 0 | 1 | 0 | 1 | 1 | 0 | 0 | 0 | 290.33333 |
| 291 | 1 | 1 | 0 | 0 | 0 | 1 | 0 | 1 | 1 | 0 | 0 | 0 | 291.41667 |
| 292 | 0 | 0 | 1 | 0 | 0 | 1 | 0 | 1 | 1 | 0 | 0 | 0 | 292.33333 |
| 293 | 1 | 0 | 1 | 0 | 0 | 1 | 0 | 1 | 1 | 0 | 0 | 0 | 293.41667 |
| 294 | 0 | 1 | 1 | 0 | 0 | 1 | 0 | 1 | 1 | 0 | 0 | 0 | 294.41667 |
| 295 | 1 | 1 | 1 | 0 | 0 | 1 | 0 | 1 | 1 | 0 | 0 | 0 | 295.5 |
| 296 | 0 | 0 | 0 | 1 | 0 | 1 | 0 | 1 | 1 | 0 | 0 | 0 | 296.33333 |
| 297 | 1 | 0 | 0 | 1 | 0 | 1 | 0 | 1 | 1 | 0 | 0 | 0 | 297.41667 |
| 298 | 0 | 1 | 0 | 1 | 0 | 1 | 0 | 1 | 1 | 0 | 0 | 0 | 298.41667 |
| 299 | 1 | 1 | 0 | 1 | 0 | 1 | 0 | 1 | 1 | 0 | 0 | 0 | 299.5 |
| 300 | 0 | 0 | 1 | 1 | 0 | 1 | 0 | 1 | 1 | 0 | 0 | 0 | 300.41667 |
| 301 | 1 | 0 | 1 | 1 | 0 | 1 | 0 | 1 | 1 | 0 | 0 | 0 | 301.5 |
| 302 | 0 | 1 | 1 | 1 | 0 | 1 | 0 | 1 | 1 | 0 | 0 | 0 | 302.5 |
| 303 | 1 | 1 | 1 | 1 | 0 | 1 | 0 | 1 | 1 | 0 | 0 | 0 | 303.58333 |
| 304 | 0 | 0 | 0 | 0 | 1 | 1 | 0 | 1 | 1 | 0 | 0 | 0 | 304.33333 |
| 305 | 1 | 0 | 0 | 0 | 1 | 1 | 0 | 1 | 1 | 0 | 0 | 0 | 305.41667 |
| 306 | 0 | 1 | 0 | 0 | 1 | 1 | 0 | 1 | 1 | 0 | 0 | 0 | 306.41667 |
| 307 | 1 | 1 | 0 | 0 | 1 | 1 | 0 | 1 | 1 | 0 | 0 | 0 | 307.5 |
| 308 | 0 | 0 | 1 | 0 | 1 | 1 | 0 | 1 | 1 | 0 | 0 | 0 | 308.41667 |
| 309 | 1 | 0 | 1 | 0 | 1 | 1 | 0 | 1 | 1 | 0 | 0 | 0 | 309.5 |
| 310 | 0 | 1 | 1 | 0 | 1 | 1 | 0 | 1 | 1 | 0 | 0 | 0 | 310.5 |
| 311 | 1 | 1 | 1 | 0 | 1 | 1 | 0 | 1 | 1 | 0 | 0 | 0 | 311.58333 |
| 312 | 0 | 0 | 0 | 1 | 1 | 1 | 0 | 1 | 1 | 0 | 0 | 0 | 312.41667 |
| 313 | 1 | 0 | 0 | 1 | 1 | 1 | 0 | 1 | 1 | 0 | 0 | 0 | 313.5 |
| 314 | 0 | 1 | 0 | 1 | 1 | 1 | 0 | 1 | 1 | 0 | 0 | 0 | 314.5 |
| 315 | 1 | 1 | 0 | 1 | 1 | 1 | 0 | 1 | 1 | 0 | 0 | 0 | 315.58333 |
| 316 | 0 | 0 | 1 | 1 | 1 | 1 | 0 | 1 | 1 | 0 | 0 | 0 | 316.5 |
| 317 | 1 | 0 | 1 | 1 | 1 | 1 | 0 | 1 | 1 | 0 | 0 | 0 | 317.58333 |
| 318 | 0 | 1 | 1 | 1 | 1 | 1 | 0 | 1 | 1 | 0 | 0 | 0 | 318.58333 |
| 319 | 1 | 1 | 1 | 1 | 1 | 1 | 0 | 1 | 1 | 0 | 0 | 0 | 319.66667 |

FIG.18

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 320 | 0 | 0 | 0 | 0 | 0 | 0 | 1 | 1 | 1 | 0 | 0 | 0 | 320.25 |
| 321 | 1 | 0 | 0 | 0 | 0 | 0 | 1 | 1 | 1 | 0 | 0 | 0 | 321.3333 |
| 322 | 0 | 1 | 0 | 0 | 0 | 0 | 1 | 1 | 1 | 0 | 0 | 0 | 322.3333 |
| 323 | 1 | 1 | 0 | 0 | 0 | 0 | 1 | 1 | 1 | 0 | 0 | 0 | 323.41667 |
| 324 | 0 | 0 | 1 | 0 | 0 | 0 | 1 | 1 | 1 | 0 | 0 | 0 | 324.33333 |
| 325 | 1 | 0 | 1 | 0 | 0 | 0 | 1 | 1 | 1 | 0 | 0 | 0 | 325.41667 |
| 326 | 0 | 1 | 1 | 0 | 0 | 0 | 1 | 1 | 1 | 0 | 0 | 0 | 326.41667 |
| 327 | 1 | 1 | 1 | 0 | 0 | 0 | 1 | 1 | 1 | 0 | 0 | 0 | 327.5 |
| 328 | 0 | 0 | 0 | 1 | 0 | 0 | 1 | 1 | 1 | 0 | 0 | 0 | 328.33333 |
| 329 | 1 | 0 | 0 | 1 | 0 | 0 | 1 | 1 | 1 | 0 | 0 | 0 | 329.41667 |
| 330 | 0 | 1 | 0 | 1 | 0 | 0 | 1 | 1 | 1 | 0 | 0 | 0 | 330.41667 |
| 331 | 1 | 1 | 0 | 1 | 0 | 0 | 1 | 1 | 1 | 0 | 0 | 0 | 331.5 |
| 332 | 0 | 0 | 1 | 1 | 0 | 0 | 1 | 1 | 1 | 0 | 0 | 0 | 332.41667 |
| 333 | 1 | 0 | 1 | 1 | 0 | 0 | 1 | 1 | 1 | 0 | 0 | 0 | 333.5 |
| 334 | 0 | 1 | 1 | 1 | 0 | 0 | 1 | 1 | 1 | 0 | 0 | 0 | 334.5 |
| 335 | 1 | 1 | 1 | 1 | 0 | 0 | 1 | 1 | 1 | 0 | 0 | 0 | 335.58333 |
| 336 | 0 | 0 | 0 | 0 | 1 | 0 | 1 | 1 | 1 | 0 | 0 | 0 | 336.33333 |
| 337 | 1 | 0 | 0 | 0 | 1 | 0 | 1 | 1 | 1 | 0 | 0 | 0 | 337.41667 |
| 338 | 0 | 1 | 0 | 0 | 1 | 0 | 1 | 1 | 1 | 0 | 0 | 0 | 338.41667 |
| 339 | 1 | 1 | 0 | 0 | 1 | 0 | 1 | 1 | 1 | 0 | 0 | 0 | 339.5 |
| 340 | 0 | 0 | 1 | 0 | 1 | 0 | 1 | 1 | 1 | 0 | 0 | 0 | 340.41667 |
| 341 | 1 | 0 | 1 | 0 | 1 | 0 | 1 | 1 | 1 | 0 | 0 | 0 | 341.5 |
| 342 | 0 | 1 | 1 | 0 | 1 | 0 | 1 | 1 | 1 | 0 | 0 | 0 | 342.5 |
| 343 | 1 | 1 | 1 | 0 | 1 | 0 | 1 | 1 | 1 | 0 | 0 | 0 | 343.58333 |
| 344 | 0 | 0 | 0 | 1 | 1 | 0 | 1 | 1 | 1 | 0 | 0 | 0 | 344.41667 |
| 345 | 1 | 0 | 0 | 1 | 1 | 0 | 1 | 1 | 1 | 0 | 0 | 0 | 345.5 |
| 346 | 0 | 1 | 0 | 1 | 1 | 0 | 1 | 1 | 1 | 0 | 0 | 0 | 346.5 |
| 347 | 1 | 1 | 0 | 1 | 1 | 0 | 1 | 1 | 1 | 0 | 0 | 0 | 347.58333 |
| 348 | 0 | 0 | 1 | 1 | 1 | 0 | 1 | 1 | 1 | 0 | 0 | 0 | 348.5 |
| 349 | 1 | 0 | 1 | 1 | 1 | 0 | 1 | 1 | 1 | 0 | 0 | 0 | 349.58333 |
| 350 | 0 | 1 | 1 | 1 | 1 | 0 | 1 | 1 | 1 | 0 | 0 | 0 | 350.58333 |
| 351 | 1 | 1 | 1 | 1 | 1 | 0 | 1 | 1 | 1 | 0 | 0 | 0 | 351.66667 |

FIG.19

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 352 | 0 | 0 | 0 | 0 | 0 | 1 | 1 | 1 | 1 | 0 | 0 | 0 | 352.33333 |
| 353 | 1 | 0 | 0 | 0 | 0 | 1 | 1 | 1 | 1 | 0 | 0 | 0 | 353.41667 |
| 354 | 0 | 1 | 0 | 0 | 0 | 1 | 1 | 1 | 1 | 0 | 0 | 0 | 354.41667 |
| 355 | 1 | 1 | 0 | 0 | 0 | 1 | 1 | 1 | 1 | 0 | 0 | 0 | 355.5 |
| 356 | 0 | 0 | 1 | 0 | 0 | 1 | 1 | 1 | 1 | 0 | 0 | 0 | 356.41667 |
| 357 | 1 | 0 | 1 | 0 | 0 | 1 | 1 | 1 | 1 | 0 | 0 | 0 | 357.5 |
| 358 | 0 | 1 | 1 | 0 | 0 | 1 | 1 | 1 | 1 | 0 | 0 | 0 | 358.5 |
| 359 | 1 | 1 | 1 | 0 | 0 | 1 | 1 | 1 | 1 | 0 | 0 | 0 | 359.58333 |
| 360 | 0 | 0 | 0 | 1 | 0 | 1 | 1 | 1 | 1 | 0 | 0 | 0 | 360.41667 |
| 361 | 1 | 0 | 0 | 1 | 0 | 1 | 1 | 1 | 1 | 0 | 0 | 0 | 361.5 |
| 362 | 0 | 1 | 0 | 1 | 0 | 1 | 1 | 1 | 1 | 0 | 0 | 0 | 362.5 |
| 363 | 1 | 1 | 0 | 1 | 0 | 1 | 1 | 1 | 1 | 0 | 0 | 0 | 363.58333 |
| 364 | 0 | 0 | 1 | 1 | 0 | 1 | 1 | 1 | 1 | 0 | 0 | 0 | 364.5 |
| 365 | 1 | 0 | 1 | 1 | 0 | 1 | 1 | 1 | 1 | 0 | 0 | 0 | 365.58333 |
| 366 | 0 | 1 | 1 | 1 | 0 | 1 | 1 | 1 | 1 | 0 | 0 | 0 | 366.58333 |
| 367 | 1 | 1 | 1 | 1 | 0 | 1 | 1 | 1 | 1 | 0 | 0 | 0 | 367.66667 |
| 368 | 0 | 0 | 0 | 0 | 1 | 1 | 1 | 1 | 1 | 0 | 0 | 0 | 368.41667 |
| 369 | 1 | 0 | 0 | 0 | 1 | 1 | 1 | 1 | 1 | 0 | 0 | 0 | 369.5 |
| 370 | 0 | 1 | 0 | 0 | 1 | 1 | 1 | 1 | 1 | 0 | 0 | 0 | 370.5 |
| 371 | 1 | 1 | 0 | 0 | 1 | 1 | 1 | 1 | 1 | 0 | 0 | 0 | 371.58333 |
| 372 | 0 | 0 | 1 | 0 | 1 | 1 | 1 | 1 | 1 | 0 | 0 | 0 | 372.5 |
| 373 | 1 | 0 | 1 | 0 | 1 | 1 | 1 | 1 | 1 | 0 | 0 | 0 | 373.58333 |
| 374 | 0 | 1 | 1 | 0 | 1 | 1 | 1 | 1 | 1 | 0 | 0 | 0 | 374.58333 |
| 375 | 1 | 1 | 1 | 0 | 1 | 1 | 1 | 1 | 1 | 0 | 0 | 0 | 375.66667 |
| 376 | 0 | 0 | 0 | 1 | 1 | 1 | 1 | 1 | 1 | 0 | 0 | 0 | 376.5 |
| 377 | 1 | 0 | 0 | 1 | 1 | 1 | 1 | 1 | 1 | 0 | 0 | 0 | 377.58333 |
| 378 | 0 | 1 | 0 | 1 | 1 | 1 | 1 | 1 | 1 | 0 | 0 | 0 | 378.58333 |
| 379 | 1 | 1 | 0 | 1 | 1 | 1 | 1 | 1 | 1 | 0 | 0 | 0 | 379.66667 |
| 380 | 0 | 0 | 1 | 1 | 1 | 1 | 1 | 1 | 1 | 0 | 0 | 0 | 380.58333 |
| 381 | 1 | 0 | 1 | 1 | 1 | 1 | 1 | 1 | 1 | 0 | 0 | 0 | 381.66667 |
| 382 | 0 | 1 | 1 | 1 | 1 | 1 | 1 | 1 | 1 | 0 | 0 | 0 | 382.66667 |
| 383 | 1 | 1 | 1 | 1 | 1 | 1 | 1 | 1 | 1 | 0 | 0 | 0 | 383.75 |

FIG. 20

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 384 | 0 | 0 | 0 | 0 | 0 | 0 | 0 | 1 | 1 | 1 | 0 | 0 | 384.25 |
| 385 | 1 | 0 | 0 | 0 | 0 | 0 | 0 | 1 | 1 | 1 | 0 | 0 | 385.33333 |
| 386 | 0 | 1 | 0 | 0 | 0 | 0 | 0 | 1 | 1 | 1 | 0 | 0 | 386.33333 |
| 387 | 1 | 1 | 0 | 0 | 0 | 0 | 0 | 1 | 1 | 1 | 0 | 0 | 387.41667 |
| 388 | 0 | 0 | 1 | 0 | 0 | 0 | 0 | 1 | 1 | 1 | 0 | 0 | 388.33333 |
| 389 | 1 | 0 | 1 | 0 | 0 | 0 | 0 | 1 | 1 | 1 | 0 | 0 | 389.41667 |
| 390 | 0 | 1 | 1 | 0 | 0 | 0 | 0 | 1 | 1 | 1 | 0 | 0 | 390.41667 |
| 391 | 1 | 1 | 1 | 0 | 0 | 0 | 0 | 1 | 1 | 1 | 0 | 0 | 391.5 |
| 392 | 0 | 0 | 0 | 1 | 0 | 0 | 0 | 1 | 1 | 1 | 0 | 0 | 392.33333 |
| 393 | 1 | 0 | 0 | 1 | 0 | 0 | 0 | 1 | 1 | 1 | 0 | 0 | 393.41667 |
| 394 | 0 | 1 | 0 | 1 | 0 | 0 | 0 | 1 | 1 | 1 | 0 | 0 | 394.41667 |
| 395 | 1 | 1 | 0 | 1 | 0 | 0 | 0 | 1 | 1 | 1 | 0 | 0 | 395.5 |
| 396 | 0 | 0 | 1 | 1 | 0 | 0 | 0 | 1 | 1 | 1 | 0 | 0 | 396.41667 |
| 397 | 1 | 0 | 1 | 1 | 0 | 0 | 0 | 1 | 1 | 1 | 0 | 0 | 397.5 |
| 398 | 0 | 1 | 1 | 1 | 0 | 0 | 0 | 1 | 1 | 1 | 0 | 0 | 398.5 |
| 399 | 1 | 1 | 1 | 1 | 0 | 0 | 0 | 1 | 1 | 1 | 0 | 0 | 399.58333 |
| 400 | 0 | 0 | 0 | 0 | 1 | 0 | 0 | 1 | 1 | 1 | 0 | 0 | 400.33333 |
| 401 | 1 | 0 | 0 | 0 | 1 | 0 | 0 | 1 | 1 | 1 | 0 | 0 | 401.41667 |
| 402 | 0 | 1 | 0 | 0 | 1 | 0 | 0 | 1 | 1 | 1 | 0 | 0 | 402.41667 |
| 403 | 1 | 1 | 0 | 0 | 1 | 0 | 0 | 1 | 1 | 1 | 0 | 0 | 403.5 |
| 404 | 0 | 0 | 1 | 0 | 1 | 0 | 0 | 1 | 1 | 1 | 0 | 0 | 404.41667 |
| 405 | 1 | 0 | 1 | 0 | 1 | 0 | 0 | 1 | 1 | 1 | 0 | 0 | 405.5 |
| 406 | 0 | 1 | 1 | 0 | 1 | 0 | 0 | 1 | 1 | 1 | 0 | 0 | 406.5 |
| 407 | 1 | 1 | 1 | 0 | 1 | 0 | 0 | 1 | 1 | 1 | 0 | 0 | 407.58333 |
| 408 | 0 | 0 | 0 | 1 | 1 | 0 | 0 | 1 | 1 | 1 | 0 | 0 | 408.41667 |
| 409 | 1 | 0 | 0 | 1 | 1 | 0 | 0 | 1 | 1 | 1 | 0 | 0 | 409.5 |
| 410 | 0 | 1 | 0 | 1 | 1 | 0 | 0 | 1 | 1 | 1 | 0 | 0 | 410.5 |
| 411 | 1 | 1 | 0 | 1 | 1 | 0 | 0 | 1 | 1 | 1 | 0 | 0 | 411.58333 |
| 412 | 0 | 0 | 1 | 1 | 1 | 0 | 0 | 1 | 1 | 1 | 0 | 0 | 412.5 |
| 413 | 1 | 0 | 1 | 1 | 1 | 0 | 0 | 1 | 1 | 1 | 0 | 0 | 413.58333 |
| 414 | 0 | 1 | 1 | 1 | 1 | 0 | 0 | 1 | 1 | 1 | 0 | 0 | 414.58333 |
| 415 | 1 | 1 | 1 | 1 | 1 | 0 | 0 | 1 | 1 | 1 | 0 | 0 | 415.66667 |

FIG.21

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 416 | 0 | 0 | 0 | 0 | 0 | 1 | 0 | 1 | 1 | 1 | 0 | 0 | 416.33333 |
| 417 | 1 | 0 | 0 | 0 | 0 | 1 | 0 | 1 | 1 | 1 | 0 | 0 | 417.41667 |
| 418 | 0 | 1 | 0 | 0 | 0 | 1 | 0 | 1 | 1 | 1 | 0 | 0 | 418.41667 |
| 419 | 1 | 1 | 0 | 0 | 0 | 1 | 0 | 1 | 1 | 1 | 0 | 0 | 419.5 |
| 420 | 0 | 0 | 1 | 0 | 0 | 1 | 0 | 1 | 1 | 1 | 0 | 0 | 420.41667 |
| 421 | 1 | 0 | 1 | 0 | 0 | 1 | 0 | 1 | 1 | 1 | 0 | 0 | 421.5 |
| 422 | 0 | 1 | 1 | 0 | 0 | 1 | 0 | 1 | 1 | 1 | 0 | 0 | 422.5 |
| 423 | 1 | 1 | 1 | 0 | 0 | 1 | 0 | 1 | 1 | 1 | 0 | 0 | 423.58333 |
| 424 | 0 | 0 | 0 | 1 | 0 | 1 | 0 | 1 | 1 | 1 | 0 | 0 | 424.41667 |
| 425 | 1 | 0 | 0 | 1 | 0 | 1 | 0 | 1 | 1 | 1 | 0 | 0 | 425.5 |
| 426 | 0 | 1 | 0 | 1 | 0 | 1 | 0 | 1 | 1 | 1 | 0 | 0 | 426.5 |
| 427 | 1 | 1 | 0 | 1 | 0 | 1 | 0 | 1 | 1 | 1 | 0 | 0 | 427.58333 |
| 428 | 0 | 0 | 1 | 1 | 0 | 1 | 0 | 1 | 1 | 1 | 0 | 0 | 428.5 |
| 429 | 1 | 0 | 1 | 1 | 0 | 1 | 0 | 1 | 1 | 1 | 0 | 0 | 429.58333 |
| 430 | 0 | 1 | 1 | 1 | 0 | 1 | 0 | 1 | 1 | 1 | 0 | 0 | 430.58333 |
| 431 | 1 | 1 | 1 | 1 | 0 | 1 | 0 | 1 | 1 | 1 | 0 | 0 | 431.66667 |
| 432 | 0 | 0 | 0 | 0 | 1 | 1 | 0 | 1 | 1 | 1 | 0 | 0 | 432.41667 |
| 433 | 1 | 0 | 0 | 0 | 1 | 1 | 0 | 1 | 1 | 1 | 0 | 0 | 433.5 |
| 434 | 0 | 1 | 0 | 0 | 1 | 1 | 0 | 1 | 1 | 1 | 0 | 0 | 434.5 |
| 435 | 1 | 1 | 0 | 0 | 1 | 1 | 0 | 1 | 1 | 1 | 0 | 0 | 435.58333 |
| 436 | 0 | 0 | 1 | 0 | 1 | 1 | 0 | 1 | 1 | 1 | 0 | 0 | 436.5 |
| 437 | 1 | 0 | 1 | 0 | 1 | 1 | 0 | 1 | 1 | 1 | 0 | 0 | 437.58333 |
| 438 | 0 | 1 | 1 | 0 | 1 | 1 | 0 | 1 | 1 | 1 | 0 | 0 | 438.58333 |
| 439 | 1 | 1 | 1 | 0 | 1 | 1 | 0 | 1 | 1 | 1 | 0 | 0 | 439.66667 |
| 440 | 0 | 0 | 0 | 1 | 1 | 1 | 0 | 1 | 1 | 1 | 0 | 0 | 440.5 |
| 441 | 1 | 0 | 0 | 1 | 1 | 1 | 0 | 1 | 1 | 1 | 0 | 0 | 441.58333 |
| 442 | 0 | 1 | 0 | 1 | 1 | 1 | 0 | 1 | 1 | 1 | 0 | 0 | 442.58333 |
| 443 | 1 | 1 | 0 | 1 | 1 | 1 | 0 | 1 | 1 | 1 | 0 | 0 | 443.66667 |
| 444 | 0 | 0 | 1 | 1 | 1 | 1 | 0 | 1 | 1 | 1 | 0 | 0 | 444.58333 |
| 445 | 1 | 0 | 1 | 1 | 1 | 1 | 0 | 1 | 1 | 1 | 0 | 0 | 445.66667 |
| 446 | 0 | 1 | 1 | 1 | 1 | 1 | 0 | 1 | 1 | 1 | 0 | 0 | 446.66667 |
| 447 | 1 | 1 | 1 | 1 | 1 | 1 | 0 | 1 | 1 | 1 | 0 | 0 | 447.75 |

FIG.22

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 448 | 0 | 0 | 0 | 0 | 0 | 0 | 1 | 1 | 1 | 1 | 0 | 0 | 448.33333 |
| 449 | 1 | 0 | 0 | 0 | 0 | 0 | 1 | 1 | 1 | 1 | 0 | 0 | 449.41667 |
| 450 | 0 | 1 | 0 | 0 | 0 | 0 | 1 | 1 | 1 | 1 | 0 | 0 | 450.41667 |
| 451 | 1 | 1 | 0 | 0 | 0 | 0 | 1 | 1 | 1 | 1 | 0 | 0 | 451.5 |
| 452 | 0 | 0 | 1 | 0 | 0 | 0 | 1 | 1 | 1 | 1 | 0 | 0 | 452.42667 |
| 453 | 1 | 0 | 1 | 0 | 0 | 0 | 1 | 1 | 1 | 1 | 0 | 0 | 453.5 |
| 454 | 0 | 1 | 1 | 0 | 0 | 0 | 1 | 1 | 1 | 1 | 0 | 0 | 454.5 |
| 455 | 1 | 1 | 1 | 0 | 0 | 0 | 1 | 1 | 1 | 1 | 0 | 0 | 455.58333 |
| 456 | 0 | 0 | 0 | 1 | 0 | 0 | 1 | 1 | 1 | 1 | 0 | 0 | 456.41667 |
| 457 | 1 | 0 | 0 | 1 | 0 | 0 | 1 | 1 | 1 | 1 | 0 | 0 | 457.5 |
| 458 | 0 | 1 | 0 | 1 | 0 | 0 | 1 | 1 | 1 | 1 | 0 | 0 | 458.5 |
| 459 | 1 | 1 | 0 | 1 | 0 | 0 | 1 | 1 | 1 | 1 | 0 | 0 | 459.58333 |
| 460 | 0 | 0 | 1 | 1 | 0 | 0 | 1 | 1 | 1 | 1 | 0 | 0 | 460.5 |
| 461 | 1 | 0 | 1 | 1 | 0 | 0 | 1 | 1 | 1 | 1 | 0 | 0 | 461.58333 |
| 462 | 0 | 1 | 1 | 1 | 0 | 0 | 1 | 1 | 1 | 1 | 0 | 0 | 462.58333 |
| 463 | 1 | 1 | 1 | 1 | 0 | 0 | 1 | 1 | 1 | 1 | 0 | 0 | 463.66667 |
| 464 | 0 | 0 | 0 | 0 | 1 | 0 | 1 | 1 | 1 | 1 | 0 | 0 | 464.41667 |
| 465 | 1 | 0 | 0 | 0 | 1 | 0 | 1 | 1 | 1 | 1 | 0 | 0 | 465.5 |
| 466 | 0 | 1 | 0 | 0 | 1 | 0 | 1 | 1 | 1 | 1 | 0 | 0 | 466.5 |
| 467 | 1 | 1 | 0 | 0 | 1 | 0 | 1 | 1 | 1 | 1 | 0 | 0 | 467.58333 |
| 468 | 0 | 0 | 1 | 0 | 1 | 0 | 1 | 1 | 1 | 1 | 0 | 0 | 468.5 |
| 469 | 1 | 0 | 1 | 0 | 1 | 0 | 1 | 1 | 1 | 1 | 0 | 0 | 469.58333 |
| 470 | 0 | 1 | 1 | 0 | 1 | 0 | 1 | 1 | 1 | 1 | 0 | 0 | 470.58333 |
| 471 | 1 | 1 | 1 | 0 | 1 | 0 | 1 | 1 | 1 | 1 | 0 | 0 | 471.66667 |
| 472 | 0 | 0 | 0 | 1 | 1 | 0 | 1 | 1 | 1 | 1 | 0 | 0 | 472.5 |
| 473 | 1 | 0 | 0 | 1 | 1 | 0 | 1 | 1 | 1 | 1 | 0 | 0 | 473.58333 |
| 474 | 0 | 1 | 0 | 1 | 1 | 0 | 1 | 1 | 1 | 1 | 0 | 0 | 474.58333 |
| 475 | 1 | 1 | 0 | 1 | 1 | 0 | 1 | 1 | 1 | 1 | 0 | 0 | 475.66667 |
| 476 | 0 | 0 | 1 | 1 | 1 | 0 | 1 | 1 | 1 | 1 | 0 | 0 | 476.58333 |
| 477 | 1 | 0 | 1 | 1 | 1 | 0 | 1 | 1 | 1 | 1 | 0 | 0 | 477.66667 |
| 478 | 0 | 1 | 1 | 1 | 1 | 0 | 1 | 1 | 1 | 1 | 0 | 0 | 478.66667 |
| 479 | 1 | 1 | 1 | 1 | 1 | 0 | 1 | 1 | 1 | 1 | 0 | 0 | 479.75 |

FIG.23

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 480 | 0 | 0 | 0 | 0 | 0 | 1 | 1 | 1 | 1 | 1 | 0 | 0 | 480.41667 |
| 481 | 1 | 0 | 0 | 0 | 0 | 1 | 1 | 1 | 1 | 1 | 0 | 0 | 481.5 |
| 482 | 0 | 1 | 0 | 0 | 0 | 1 | 1 | 1 | 1 | 1 | 0 | 0 | 482.5 |
| 483 | 1 | 1 | 0 | 0 | 0 | 1 | 1 | 1 | 1 | 1 | 0 | 0 | 483.58333 |
| 484 | 0 | 0 | 1 | 0 | 0 | 1 | 1 | 1 | 1 | 1 | 0 | 0 | 484.5 |
| 485 | 1 | 0 | 1 | 0 | 0 | 1 | 1 | 1 | 1 | 1 | 0 | 0 | 485.58333 |
| 486 | 0 | 1 | 1 | 0 | 0 | 1 | 1 | 1 | 1 | 1 | 0 | 0 | 486.58333 |
| 487 | 1 | 1 | 1 | 0 | 0 | 1 | 1 | 1 | 1 | 1 | 0 | 0 | 487.66667 |
| 488 | 0 | 0 | 0 | 1 | 0 | 1 | 1 | 1 | 1 | 1 | 0 | 0 | 488.5 |
| 489 | 1 | 0 | 0 | 1 | 0 | 1 | 1 | 1 | 1 | 1 | 0 | 0 | 489.58333 |
| 490 | 0 | 1 | 0 | 1 | 0 | 1 | 1 | 1 | 1 | 1 | 0 | 0 | 490.58333 |
| 491 | 1 | 1 | 0 | 1 | 0 | 1 | 1 | 1 | 1 | 1 | 0 | 0 | 491.66667 |
| 492 | 0 | 0 | 1 | 1 | 0 | 1 | 1 | 1 | 1 | 1 | 0 | 0 | 492.58333 |
| 493 | 1 | 0 | 1 | 1 | 0 | 1 | 1 | 1 | 1 | 1 | 0 | 0 | 493.66667 |
| 494 | 0 | 1 | 1 | 1 | 0 | 1 | 1 | 1 | 1 | 1 | 0 | 0 | 494.66667 |
| 495 | 1 | 1 | 1 | 1 | 0 | 1 | 1 | 1 | 1 | 1 | 0 | 0 | 495.75 |
| 496 | 0 | 0 | 0 | 0 | 1 | 1 | 1 | 1 | 1 | 1 | 0 | 0 | 496.5 |
| 497 | 1 | 0 | 0 | 0 | 1 | 1 | 1 | 1 | 1 | 1 | 0 | 0 | 497.58333 |
| 498 | 0 | 1 | 0 | 0 | 1 | 1 | 1 | 1 | 1 | 1 | 0 | 0 | 498.58333 |
| 499 | 1 | 1 | 0 | 0 | 1 | 1 | 1 | 1 | 1 | 1 | 0 | 0 | 499.66667 |
| 500 | 0 | 0 | 1 | 0 | 1 | 1 | 1 | 1 | 1 | 1 | 0 | 0 | 500.58333 |
| 501 | 1 | 0 | 1 | 0 | 1 | 1 | 1 | 1 | 1 | 1 | 0 | 0 | 501.66667 |
| 502 | 0 | 1 | 1 | 0 | 1 | 1 | 1 | 1 | 1 | 1 | 0 | 0 | 502.66667 |
| 503 | 1 | 1 | 1 | 0 | 1 | 1 | 1 | 1 | 1 | 1 | 0 | 0 | 503.75 |
| 504 | 0 | 0 | 0 | 1 | 1 | 1 | 1 | 1 | 1 | 1 | 0 | 0 | 504.58333 |
| 505 | 1 | 0 | 0 | 1 | 1 | 1 | 1 | 1 | 1 | 1 | 0 | 0 | 505.66667 |
| 506 | 0 | 1 | 0 | 1 | 1 | 1 | 1 | 1 | 1 | 1 | 0 | 0 | 506.66667 |
| 507 | 1 | 1 | 0 | 1 | 1 | 1 | 1 | 1 | 1 | 1 | 0 | 0 | 507.75 |
| 508 | 0 | 0 | 1 | 1 | 1 | 1 | 1 | 1 | 1 | 1 | 0 | 0 | 508.66667 |
| 509 | 1 | 0 | 1 | 1 | 1 | 1 | 1 | 1 | 1 | 1 | 0 | 0 | 509.75 |
| 510 | 0 | 1 | 1 | 1 | 1 | 1 | 1 | 1 | 1 | 1 | 0 | 0 | 510.75 |
| 511 | 1 | 1 | 1 | 1 | 1 | 1 | 1 | 1 | 1 | 1 | 0 | 0 | 511.83333 |

FIG.24

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 512 | 0 | 0 | 0 | 0 | 0 | 0 | 0 | 1 | 1 | 1 | 1 | 0 | 512.33333 |
| 513 | 1 | 0 | 0 | 0 | 0 | 0 | 0 | 1 | 1 | 1 | 1 | 0 | 513.41667 |
| 514 | 0 | 1 | 0 | 0 | 0 | 0 | 0 | 1 | 1 | 1 | 1 | 0 | 514.41667 |
| 515 | 1 | 1 | 0 | 0 | 0 | 0 | 0 | 1 | 1 | 1 | 1 | 0 | 515.5 |
| 516 | 0 | 0 | 1 | 0 | 0 | 0 | 0 | 1 | 1 | 1 | 1 | 0 | 516.41667 |
| 517 | 1 | 0 | 1 | 0 | 0 | 0 | 0 | 1 | 1 | 1 | 1 | 0 | 517.5 |
| 518 | 0 | 1 | 1 | 0 | 0 | 0 | 0 | 1 | 1 | 1 | 1 | 0 | 518.5 |
| 519 | 1 | 1 | 1 | 0 | 0 | 0 | 0 | 1 | 1 | 1 | 1 | 0 | 519.58333 |
| 520 | 0 | 0 | 0 | 1 | 0 | 0 | 0 | 1 | 1 | 1 | 1 | 0 | 520.41667 |
| 521 | 1 | 0 | 0 | 1 | 0 | 0 | 0 | 1 | 1 | 1 | 1 | 0 | 521.5 |
| 522 | 0 | 1 | 0 | 1 | 0 | 0 | 0 | 1 | 1 | 1 | 1 | 0 | 522.5 |
| 523 | 1 | 1 | 0 | 1 | 0 | 0 | 0 | 1 | 1 | 1 | 1 | 0 | 523.58333 |
| 524 | 0 | 0 | 1 | 1 | 0 | 0 | 0 | 1 | 1 | 1 | 1 | 0 | 524.5 |
| 525 | 1 | 0 | 1 | 1 | 0 | 0 | 0 | 1 | 1 | 1 | 1 | 0 | 525.58333 |
| 526 | 0 | 1 | 1 | 1 | 0 | 0 | 0 | 1 | 1 | 1 | 1 | 0 | 526.58333 |
| 527 | 1 | 1 | 1 | 1 | 0 | 0 | 0 | 1 | 1 | 1 | 1 | 0 | 527.66667 |
| 528 | 0 | 0 | 0 | 0 | 1 | 0 | 0 | 1 | 1 | 1 | 1 | 0 | 528.41667 |
| 529 | 1 | 0 | 0 | 0 | 1 | 0 | 0 | 1 | 1 | 1 | 1 | 0 | 529.5 |
| 530 | 0 | 1 | 0 | 0 | 1 | 0 | 0 | 1 | 1 | 1 | 1 | 0 | 530.5 |
| 531 | 1 | 1 | 0 | 0 | 1 | 0 | 0 | 1 | 1 | 1 | 1 | 0 | 531.58333 |
| 532 | 0 | 0 | 1 | 0 | 1 | 0 | 0 | 1 | 1 | 1 | 1 | 0 | 532.5 |
| 533 | 1 | 0 | 1 | 0 | 1 | 0 | 0 | 1 | 1 | 1 | 1 | 0 | 533.58333 |
| 534 | 0 | 1 | 1 | 0 | 1 | 0 | 0 | 1 | 1 | 1 | 1 | 0 | 534.58333 |
| 535 | 1 | 1 | 1 | 0 | 1 | 0 | 0 | 1 | 1 | 1 | 1 | 0 | 535.66667 |
| 536 | 0 | 0 | 0 | 1 | 1 | 0 | 0 | 1 | 1 | 1 | 1 | 0 | 536.5 |
| 537 | 1 | 0 | 0 | 1 | 1 | 0 | 0 | 1 | 1 | 1 | 1 | 0 | 537.58333 |
| 538 | 0 | 1 | 0 | 1 | 1 | 0 | 0 | 1 | 1 | 1 | 1 | 0 | 538.58333 |
| 539 | 1 | 1 | 0 | 1 | 1 | 0 | 0 | 1 | 1 | 1 | 1 | 0 | 539.66667 |
| 540 | 0 | 0 | 1 | 1 | 1 | 0 | 0 | 1 | 1 | 1 | 1 | 0 | 540.58333 |
| 541 | 1 | 0 | 1 | 1 | 1 | 0 | 0 | 1 | 1 | 1 | 1 | 0 | 541.66667 |
| 542 | 0 | 1 | 1 | 1 | 1 | 0 | 0 | 1 | 1 | 1 | 1 | 0 | 542.66667 |
| 543 | 1 | 1 | 1 | 1 | 1 | 0 | 0 | 1 | 1 | 1 | 1 | 0 | 543.75 |

FIG.25

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 544 | 0 | 0 | 0 | 0 | 0 | 1 | 0 | 1 | 1 | 1 | 1 | 0 | 544.41667 |
| 545 | 1 | 0 | 0 | 0 | 0 | 1 | 0 | 1 | 1 | 1 | 1 | 0 | 545.5 |
| 546 | 0 | 1 | 0 | 0 | 0 | 1 | 0 | 1 | 1 | 1 | 1 | 0 | 546.5 |
| 547 | 1 | 1 | 0 | 0 | 0 | 1 | 0 | 1 | 1 | 1 | 1 | 0 | 547.58333 |
| 548 | 0 | 0 | 1 | 0 | 0 | 1 | 0 | 1 | 1 | 1 | 1 | 0 | 548.5 |
| 549 | 1 | 0 | 1 | 0 | 0 | 1 | 0 | 1 | 1 | 1 | 1 | 0 | 549.58333 |
| 550 | 0 | 1 | 1 | 0 | 0 | 1 | 0 | 1 | 1 | 1 | 1 | 0 | 550.58333 |
| 551 | 1 | 1 | 1 | 0 | 0 | 1 | 0 | 1 | 1 | 1 | 1 | 0 | 551.66667 |
| 552 | 0 | 0 | 0 | 1 | 0 | 1 | 0 | 1 | 1 | 1 | 1 | 0 | 552.5 |
| 553 | 1 | 0 | 0 | 1 | 0 | 1 | 0 | 1 | 1 | 1 | 1 | 0 | 553.58333 |
| 554 | 0 | 1 | 0 | 1 | 0 | 1 | 0 | 1 | 1 | 1 | 1 | 0 | 554.58333 |
| 555 | 1 | 1 | 0 | 1 | 0 | 1 | 0 | 1 | 1 | 1 | 1 | 0 | 555.66667 |
| 556 | 0 | 0 | 1 | 1 | 0 | 1 | 0 | 1 | 1 | 1 | 1 | 0 | 556.58333 |
| 557 | 1 | 0 | 1 | 1 | 0 | 1 | 0 | 1 | 1 | 1 | 1 | 0 | 557.66667 |
| 558 | 0 | 1 | 1 | 1 | 0 | 1 | 0 | 1 | 1 | 1 | 1 | 0 | 558.66667 |
| 559 | 1 | 1 | 1 | 1 | 0 | 1 | 0 | 1 | 1 | 1 | 1 | 0 | 559.75 |
| 560 | 0 | 0 | 0 | 0 | 1 | 1 | 0 | 1 | 1 | 1 | 1 | 0 | 560.5 |
| 561 | 1 | 0 | 0 | 0 | 1 | 1 | 0 | 1 | 1 | 1 | 1 | 0 | 561.58333 |
| 562 | 0 | 1 | 0 | 0 | 1 | 1 | 0 | 1 | 1 | 1 | 1 | 0 | 562.58333 |
| 563 | 1 | 1 | 0 | 0 | 1 | 1 | 0 | 1 | 1 | 1 | 1 | 0 | 563.66667 |
| 564 | 0 | 0 | 1 | 0 | 1 | 1 | 0 | 1 | 1 | 1 | 1 | 0 | 564.58333 |
| 565 | 1 | 0 | 1 | 0 | 1 | 1 | 0 | 1 | 1 | 1 | 1 | 0 | 565.66667 |
| 566 | 0 | 1 | 1 | 0 | 1 | 1 | 0 | 1 | 1 | 1 | 1 | 0 | 566.66667 |
| 567 | 1 | 1 | 1 | 0 | 1 | 1 | 0 | 1 | 1 | 1 | 1 | 0 | 567.75 |
| 568 | 0 | 0 | 0 | 1 | 1 | 1 | 0 | 1 | 1 | 1 | 1 | 0 | 568.58333 |
| 569 | 1 | 0 | 0 | 1 | 1 | 1 | 0 | 1 | 1 | 1 | 1 | 0 | 569.66667 |
| 570 | 0 | 1 | 0 | 1 | 1 | 1 | 0 | 1 | 1 | 1 | 1 | 0 | 570.66667 |
| 571 | 1 | 1 | 0 | 1 | 1 | 1 | 0 | 1 | 1 | 1 | 1 | 0 | 571.75 |
| 572 | 0 | 0 | 1 | 1 | 1 | 1 | 0 | 1 | 1 | 1 | 1 | 0 | 572.66667 |
| 573 | 1 | 0 | 1 | 1 | 1 | 1 | 0 | 1 | 1 | 1 | 1 | 0 | 573.75 |
| 574 | 0 | 1 | 1 | 1 | 1 | 1 | 0 | 1 | 1 | 1 | 1 | 0 | 574.75 |
| 575 | 1 | 1 | 1 | 1 | 1 | 1 | 0 | 1 | 1 | 1 | 1 | 0 | 575.83333 |

FIG.26

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 576 | 0 | 0 | 0 | 0 | 0 | 0 | 1 | 1 | 1 | 1 | 1 | 0 | 576.41667 |
| 577 | 1 | 0 | 0 | 0 | 0 | 0 | 1 | 1 | 1 | 1 | 1 | 0 | 577.5 |
| 578 | 0 | 1 | 0 | 0 | 0 | 0 | 1 | 1 | 1 | 1 | 1 | 0 | 578.5 |
| 579 | 1 | 1 | 0 | 0 | 0 | 0 | 1 | 1 | 1 | 1 | 1 | 0 | 579.58333 |
| 580 | 0 | 0 | 1 | 0 | 0 | 0 | 1 | 1 | 1 | 1 | 1 | 0 | 580.5 |
| 581 | 1 | 0 | 1 | 0 | 0 | 0 | 1 | 1 | 1 | 1 | 1 | 0 | 581.58333 |
| 582 | 0 | 1 | 1 | 0 | 0 | 0 | 1 | 1 | 1 | 1 | 1 | 0 | 582.58333 |
| 583 | 1 | 1 | 1 | 0 | 0 | 0 | 1 | 1 | 1 | 1 | 1 | 0 | 583.66667 |
| 584 | 0 | 0 | 0 | 1 | 0 | 0 | 1 | 1 | 1 | 1 | 1 | 0 | 584.5 |
| 585 | 1 | 0 | 0 | 1 | 0 | 0 | 1 | 1 | 1 | 1 | 1 | 0 | 585.58333 |
| 586 | 0 | 1 | 0 | 1 | 0 | 0 | 1 | 1 | 1 | 1 | 1 | 0 | 586.58333 |
| 587 | 1 | 1 | 0 | 1 | 0 | 0 | 1 | 1 | 1 | 1 | 1 | 0 | 587.66667 |
| 588 | 0 | 0 | 1 | 1 | 0 | 0 | 1 | 1 | 1 | 1 | 1 | 0 | 588.58333 |
| 589 | 1 | 0 | 1 | 1 | 0 | 0 | 1 | 1 | 1 | 1 | 1 | 0 | 589.66667 |
| 590 | 0 | 1 | 1 | 1 | 0 | 0 | 1 | 1 | 1 | 1 | 1 | 0 | 590.66667 |
| 591 | 1 | 1 | 1 | 1 | 0 | 0 | 1 | 1 | 1 | 1 | 1 | 0 | 591.75 |
| 592 | 0 | 0 | 0 | 0 | 1 | 0 | 1 | 1 | 1 | 1 | 1 | 0 | 592.5 |
| 593 | 1 | 0 | 0 | 0 | 1 | 0 | 1 | 1 | 1 | 1 | 1 | 0 | 593.58333 |
| 594 | 0 | 1 | 0 | 0 | 1 | 0 | 1 | 1 | 1 | 1 | 1 | 0 | 594.58333 |
| 595 | 1 | 1 | 0 | 0 | 1 | 0 | 1 | 1 | 1 | 1 | 1 | 0 | 595.66667 |
| 596 | 0 | 0 | 1 | 0 | 1 | 0 | 1 | 1 | 1 | 1 | 1 | 0 | 596.58333 |
| 597 | 1 | 0 | 1 | 0 | 1 | 0 | 1 | 1 | 1 | 1 | 1 | 0 | 597.66667 |
| 598 | 0 | 1 | 1 | 0 | 1 | 0 | 1 | 1 | 1 | 1 | 1 | 0 | 598.66667 |
| 599 | 1 | 1 | 1 | 0 | 1 | 0 | 1 | 1 | 1 | 1 | 1 | 0 | 599.75 |
| 600 | 0 | 0 | 0 | 1 | 1 | 0 | 1 | 1 | 1 | 1 | 1 | 0 | 600.58333 |
| 601 | 1 | 0 | 0 | 1 | 1 | 0 | 1 | 1 | 1 | 1 | 1 | 0 | 601.66667 |
| 602 | 0 | 1 | 0 | 1 | 1 | 0 | 1 | 1 | 1 | 1 | 1 | 0 | 602.66667 |
| 603 | 1 | 1 | 0 | 1 | 1 | 0 | 1 | 1 | 1 | 1 | 1 | 0 | 603.75 |
| 604 | 0 | 0 | 1 | 1 | 1 | 0 | 1 | 1 | 1 | 1 | 1 | 0 | 604.66667 |
| 605 | 1 | 0 | 1 | 1 | 1 | 0 | 1 | 1 | 1 | 1 | 1 | 0 | 605.75 |
| 606 | 0 | 1 | 1 | 1 | 1 | 0 | 1 | 1 | 1 | 1 | 1 | 0 | 606.75 |
| 607 | 1 | 1 | 1 | 1 | 1 | 0 | 1 | 1 | 1 | 1 | 1 | 0 | 607.83333 |

FIG.27

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 608 | 0 | 0 | 0 | 0 | 0 | 1 | 1 | 1 | 1 | 1 | 1 | 0 | 608.5 |
| 609 | 1 | 0 | 0 | 0 | 0 | 1 | 1 | 1 | 1 | 1 | 1 | 0 | 609.58333 |
| 610 | 0 | 1 | 0 | 0 | 0 | 1 | 1 | 1 | 1 | 1 | 1 | 0 | 610.58333 |
| 611 | 1 | 1 | 0 | 0 | 0 | 1 | 1 | 1 | 1 | 1 | 1 | 0 | 611.66667 |
| 612 | 0 | 0 | 1 | 0 | 0 | 1 | 1 | 1 | 1 | 1 | 1 | 0 | 612.58333 |
| 613 | 1 | 0 | 1 | 0 | 0 | 1 | 1 | 1 | 1 | 1 | 1 | 0 | 613.66667 |
| 614 | 0 | 1 | 1 | 0 | 0 | 1 | 1 | 1 | 1 | 1 | 1 | 0 | 614.66667 |
| 615 | 1 | 1 | 1 | 0 | 0 | 1 | 1 | 1 | 1 | 1 | 1 | 0 | 615.75 |
| 616 | 0 | 0 | 0 | 1 | 0 | 1 | 1 | 1 | 1 | 1 | 1 | 0 | 616.58333 |
| 617 | 1 | 0 | 0 | 1 | 0 | 1 | 1 | 1 | 1 | 1 | 1 | 0 | 617.66667 |
| 618 | 0 | 1 | 0 | 1 | 0 | 1 | 1 | 1 | 1 | 1 | 1 | 0 | 618.66667 |
| 619 | 1 | 1 | 0 | 1 | 0 | 1 | 1 | 1 | 1 | 1 | 1 | 0 | 619.75 |
| 620 | 0 | 0 | 1 | 1 | 0 | 1 | 1 | 1 | 1 | 1 | 1 | 0 | 620.66667 |
| 621 | 1 | 0 | 1 | 1 | 0 | 1 | 1 | 1 | 1 | 1 | 1 | 0 | 621.75 |
| 622 | 0 | 1 | 1 | 1 | 0 | 1 | 1 | 1 | 1 | 1 | 1 | 0 | 622.75 |
| 623 | 1 | 1 | 1 | 1 | 0 | 1 | 1 | 1 | 1 | 1 | 1 | 0 | 623.83333 |
| 624 | 0 | 0 | 0 | 0 | 1 | 1 | 1 | 1 | 1 | 1 | 1 | 0 | 624.58333 |
| 625 | 1 | 0 | 0 | 0 | 1 | 1 | 1 | 1 | 1 | 1 | 1 | 0 | 625.66667 |
| 626 | 0 | 1 | 0 | 0 | 1 | 1 | 1 | 1 | 1 | 1 | 1 | 0 | 626.66667 |
| 627 | 1 | 1 | 0 | 0 | 1 | 1 | 1 | 1 | 1 | 1 | 1 | 0 | 627.75 |
| 628 | 0 | 0 | 1 | 0 | 1 | 1 | 1 | 1 | 1 | 1 | 1 | 0 | 628.66667 |
| 629 | 1 | 0 | 1 | 0 | 1 | 1 | 1 | 1 | 1 | 1 | 1 | 0 | 629.75 |
| 630 | 0 | 1 | 1 | 0 | 1 | 1 | 1 | 1 | 1 | 1 | 1 | 0 | 630.75 |
| 631 | 1 | 1 | 1 | 0 | 1 | 1 | 1 | 1 | 1 | 1 | 1 | 0 | 631.83333 |
| 632 | 0 | 0 | 0 | 1 | 1 | 1 | 1 | 1 | 1 | 1 | 1 | 0 | 632.66667 |
| 633 | 1 | 0 | 0 | 1 | 1 | 1 | 1 | 1 | 1 | 1 | 1 | 0 | 633.75 |
| 634 | 0 | 1 | 0 | 1 | 1 | 1 | 1 | 1 | 1 | 1 | 1 | 0 | 634.75 |
| 635 | 1 | 1 | 0 | 1 | 1 | 1 | 1 | 1 | 1 | 1 | 1 | 0 | 635.83333 |
| 636 | 0 | 0 | 1 | 1 | 1 | 1 | 1 | 1 | 1 | 1 | 1 | 0 | 636.75 |
| 637 | 1 | 0 | 1 | 1 | 1 | 1 | 1 | 1 | 1 | 1 | 1 | 0 | 637.83333 |
| 638 | 0 | 1 | 1 | 1 | 1 | 1 | 1 | 1 | 1 | 1 | 1 | 0 | 638.83333 |
| 639 | 1 | 1 | 1 | 1 | 1 | 1 | 1 | 1 | 1 | 1 | 1 | 0 | 639.91667 |

FIG.28

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 640 | 0 | 0 | 0 | 0 | 0 | 0 | 0 | 1 | 1 | 1 | 1 | 1 | 640.41667 |
| 641 | 1 | 0 | 0 | 0 | 0 | 0 | 0 | 1 | 1 | 1 | 1 | 1 | 641.5 |
| 642 | 0 | 1 | 0 | 0 | 0 | 0 | 0 | 1 | 1 | 1 | 1 | 1 | 642.5 |
| 643 | 1 | 1 | 0 | 0 | 0 | 0 | 0 | 1 | 1 | 1 | 1 | 1 | 643.58333 |
| 644 | 0 | 0 | 1 | 0 | 0 | 0 | 0 | 1 | 1 | 1 | 1 | 1 | 644.5 |
| 645 | 1 | 0 | 1 | 0 | 0 | 0 | 0 | 1 | 1 | 1 | 1 | 1 | 645.58333 |
| 646 | 0 | 1 | 1 | 0 | 0 | 0 | 0 | 1 | 1 | 1 | 1 | 1 | 646.58333 |
| 647 | 1 | 1 | 1 | 0 | 0 | 0 | 0 | 1 | 1 | 1 | 1 | 1 | 647.66667 |
| 648 | 0 | 0 | 0 | 1 | 0 | 0 | 0 | 1 | 1 | 1 | 1 | 1 | 648.5 |
| 649 | 1 | 0 | 0 | 1 | 0 | 0 | 0 | 1 | 1 | 1 | 1 | 1 | 649.58333 |
| 650 | 0 | 1 | 0 | 1 | 0 | 0 | 0 | 1 | 1 | 1 | 1 | 1 | 650.58333 |
| 651 | 1 | 1 | 0 | 1 | 0 | 0 | 0 | 1 | 1 | 1 | 1 | 1 | 651.66667 |
| 652 | 0 | 0 | 1 | 1 | 0 | 0 | 0 | 1 | 1 | 1 | 1 | 1 | 652.58333 |
| 653 | 1 | 0 | 1 | 1 | 0 | 0 | 0 | 1 | 1 | 1 | 1 | 1 | 653.66667 |
| 654 | 0 | 1 | 1 | 1 | 0 | 0 | 0 | 1 | 1 | 1 | 1 | 1 | 654.66667 |
| 655 | 1 | 1 | 1 | 1 | 0 | 0 | 0 | 1 | 1 | 1 | 1 | 1 | 655.75 |
| 656 | 0 | 0 | 0 | 0 | 1 | 0 | 0 | 1 | 1 | 1 | 1 | 1 | 656.5 |
| 657 | 1 | 0 | 0 | 0 | 1 | 0 | 0 | 1 | 1 | 1 | 1 | 1 | 657.58333 |
| 658 | 0 | 1 | 0 | 0 | 1 | 0 | 0 | 1 | 1 | 1 | 1 | 1 | 658.58333 |
| 659 | 1 | 1 | 0 | 0 | 1 | 0 | 0 | 1 | 1 | 1 | 1 | 1 | 659.66667 |
| 660 | 0 | 0 | 1 | 0 | 1 | 0 | 0 | 1 | 1 | 1 | 1 | 1 | 660.58333 |
| 661 | 1 | 0 | 1 | 0 | 1 | 0 | 0 | 1 | 1 | 1 | 1 | 1 | 661.66667 |
| 662 | 0 | 1 | 1 | 0 | 1 | 0 | 0 | 1 | 1 | 1 | 1 | 1 | 662.66667 |
| 663 | 1 | 1 | 1 | 0 | 1 | 0 | 0 | 1 | 1 | 1 | 1 | 1 | 663.75 |
| 664 | 0 | 0 | 0 | 1 | 1 | 0 | 0 | 1 | 1 | 1 | 1 | 1 | 664.58333 |
| 665 | 1 | 0 | 0 | 1 | 1 | 0 | 0 | 1 | 1 | 1 | 1 | 1 | 665.66667 |
| 666 | 0 | 1 | 0 | 1 | 1 | 0 | 0 | 1 | 1 | 1 | 1 | 1 | 666.66667 |
| 667 | 1 | 1 | 0 | 1 | 1 | 0 | 0 | 1 | 1 | 1 | 1 | 1 | 667.75 |
| 668 | 0 | 0 | 1 | 1 | 1 | 0 | 0 | 1 | 1 | 1 | 1 | 1 | 668.66667 |
| 669 | 1 | 0 | 1 | 1 | 1 | 0 | 0 | 1 | 1 | 1 | 1 | 1 | 669.75 |
| 670 | 0 | 1 | 1 | 1 | 1 | 0 | 0 | 1 | 1 | 1 | 1 | 1 | 670.75 |
| 671 | 1 | 1 | 1 | 1 | 1 | 0 | 0 | 1 | 1 | 1 | 1 | 1 | 671.83333 |

FIG.29

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 672 | 0 | 0 | 0 | 0 | 0 | 1 | 0 | 1 | 1 | 1 | 1 | 1 | 672.5 |
| 673 | 1 | 0 | 0 | 0 | 0 | 1 | 0 | 1 | 1 | 1 | 1 | 1 | 673.58333 |
| 674 | 0 | 1 | 0 | 0 | 0 | 1 | 0 | 1 | 1 | 1 | 1 | 1 | 674.58333 |
| 675 | 1 | 1 | 0 | 0 | 0 | 1 | 0 | 1 | 1 | 1 | 1 | 1 | 675.66667 |
| 676 | 0 | 0 | 1 | 0 | 0 | 1 | 0 | 1 | 1 | 1 | 1 | 1 | 676.58333 |
| 677 | 1 | 0 | 1 | 0 | 0 | 1 | 0 | 1 | 1 | 1 | 1 | 1 | 677.66667 |
| 678 | 0 | 1 | 1 | 0 | 0 | 1 | 0 | 1 | 1 | 1 | 1 | 1 | 678.66667 |
| 679 | 1 | 1 | 1 | 0 | 0 | 1 | 0 | 1 | 1 | 1 | 1 | 1 | 679.75 |
| 680 | 0 | 0 | 0 | 1 | 0 | 1 | 0 | 1 | 1 | 1 | 1 | 1 | 680.58333 |
| 681 | 1 | 0 | 0 | 1 | 0 | 1 | 0 | 1 | 1 | 1 | 1 | 1 | 681.66667 |
| 682 | 0 | 1 | 0 | 1 | 0 | 1 | 0 | 1 | 1 | 1 | 1 | 1 | 682.66667 |
| 683 | 1 | 1 | 0 | 1 | 0 | 1 | 0 | 1 | 1 | 1 | 1 | 1 | 683.75 |
| 684 | 0 | 0 | 1 | 1 | 0 | 1 | 0 | 1 | 1 | 1 | 1 | 1 | 684.66667 |
| 685 | 1 | 0 | 1 | 1 | 0 | 1 | 0 | 1 | 1 | 1 | 1 | 1 | 685.75 |
| 686 | 0 | 1 | 1 | 1 | 0 | 1 | 0 | 1 | 1 | 1 | 1 | 1 | 686.75 |
| 687 | 1 | 1 | 1 | 1 | 0 | 1 | 0 | 1 | 1 | 1 | 1 | 1 | 687.83333 |
| 688 | 0 | 0 | 0 | 0 | 1 | 1 | 0 | 1 | 1 | 1 | 1 | 1 | 688.58333 |
| 689 | 1 | 0 | 0 | 0 | 1 | 1 | 0 | 1 | 1 | 1 | 1 | 1 | 689.66667 |
| 690 | 0 | 1 | 0 | 0 | 1 | 1 | 0 | 1 | 1 | 1 | 1 | 1 | 690.66667 |
| 691 | 1 | 1 | 0 | 0 | 1 | 1 | 0 | 1 | 1 | 1 | 1 | 1 | 691.75 |
| 692 | 0 | 0 | 1 | 0 | 1 | 1 | 0 | 1 | 1 | 1 | 1 | 1 | 692.66667 |
| 693 | 1 | 0 | 1 | 0 | 1 | 1 | 0 | 1 | 1 | 1 | 1 | 1 | 693.75 |
| 694 | 0 | 1 | 1 | 0 | 1 | 1 | 0 | 1 | 1 | 1 | 1 | 1 | 694.75 |
| 695 | 1 | 1 | 1 | 0 | 1 | 1 | 0 | 1 | 1 | 1 | 1 | 1 | 695.83333 |
| 696 | 0 | 0 | 0 | 1 | 1 | 1 | 0 | 1 | 1 | 1 | 1 | 1 | 696.66667 |
| 697 | 1 | 0 | 0 | 1 | 1 | 1 | 0 | 1 | 1 | 1 | 1 | 1 | 697.75 |
| 698 | 0 | 1 | 0 | 1 | 1 | 1 | 0 | 1 | 1 | 1 | 1 | 1 | 698.75 |
| 699 | 1 | 1 | 0 | 1 | 1 | 1 | 0 | 1 | 1 | 1 | 1 | 1 | 699.83333 |
| 700 | 0 | 0 | 1 | 1 | 1 | 1 | 0 | 1 | 1 | 1 | 1 | 1 | 700.75 |
| 701 | 1 | 0 | 1 | 1 | 1 | 1 | 0 | 1 | 1 | 1 | 1 | 1 | 701.83333 |
| 702 | 0 | 1 | 1 | 1 | 1 | 1 | 0 | 1 | 1 | 1 | 1 | 1 | 702.83333 |
| 703 | 1 | 1 | 1 | 1 | 1 | 1 | 0 | 1 | 1 | 1 | 1 | 1 | 703.91667 |

FIG.30

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 704 | 0 | 0 | 0 | 0 | 0 | 0 | 1 | 1 | 1 | 1 | 1 | 1 | 704.5 |
| 705 | 1 | 0 | 0 | 0 | 0 | 0 | 1 | 1 | 1 | 1 | 1 | 1 | 705.58333 |
| 706 | 0 | 1 | 0 | 0 | 0 | 0 | 1 | 1 | 1 | 1 | 1 | 1 | 706.58333 |
| 707 | 1 | 1 | 0 | 0 | 0 | 0 | 1 | 1 | 1 | 1 | 1 | 1 | 707.66667 |
| 708 | 0 | 0 | 1 | 0 | 0 | 0 | 1 | 1 | 1 | 1 | 1 | 1 | 708.58333 |
| 709 | 1 | 0 | 1 | 0 | 0 | 0 | 1 | 1 | 1 | 1 | 1 | 1 | 709.66667 |
| 710 | 0 | 1 | 1 | 0 | 0 | 0 | 1 | 1 | 1 | 1 | 1 | 1 | 710.66667 |
| 711 | 1 | 1 | 1 | 0 | 0 | 0 | 1 | 1 | 1 | 1 | 1 | 1 | 711.75 |
| 712 | 0 | 0 | 0 | 1 | 0 | 0 | 1 | 1 | 1 | 1 | 1 | 1 | 712.58333 |
| 713 | 1 | 0 | 0 | 1 | 0 | 0 | 1 | 1 | 1 | 1 | 1 | 1 | 713.66667 |
| 714 | 0 | 1 | 0 | 1 | 0 | 0 | 1 | 1 | 1 | 1 | 1 | 1 | 714.66667 |
| 715 | 1 | 1 | 0 | 1 | 0 | 0 | 1 | 1 | 1 | 1 | 1 | 1 | 715.75 |
| 716 | 0 | 0 | 1 | 1 | 0 | 0 | 1 | 1 | 1 | 1 | 1 | 1 | 716.66667 |
| 717 | 1 | 0 | 1 | 1 | 0 | 0 | 1 | 1 | 1 | 1 | 1 | 1 | 717.75 |
| 718 | 0 | 1 | 1 | 1 | 0 | 0 | 1 | 1 | 1 | 1 | 1 | 1 | 718.75 |
| 719 | 1 | 1 | 1 | 1 | 0 | 0 | 1 | 1 | 1 | 1 | 1 | 1 | 719.83333 |
| 720 | 0 | 0 | 0 | 0 | 1 | 0 | 1 | 1 | 1 | 1 | 1 | 1 | 720.58333 |
| 721 | 1 | 0 | 0 | 0 | 1 | 0 | 1 | 1 | 1 | 1 | 1 | 1 | 721.66667 |
| 722 | 0 | 1 | 0 | 0 | 1 | 0 | 1 | 1 | 1 | 1 | 1 | 1 | 722.66667 |
| 723 | 1 | 1 | 0 | 0 | 1 | 0 | 1 | 1 | 1 | 1 | 1 | 1 | 723.75 |
| 724 | 0 | 0 | 1 | 0 | 1 | 0 | 1 | 1 | 1 | 1 | 1 | 1 | 724.66667 |
| 725 | 1 | 0 | 1 | 0 | 1 | 0 | 1 | 1 | 1 | 1 | 1 | 1 | 725.75 |
| 726 | 0 | 1 | 1 | 0 | 1 | 0 | 1 | 1 | 1 | 1 | 1 | 1 | 726.75 |
| 727 | 1 | 1 | 1 | 0 | 1 | 0 | 1 | 1 | 1 | 1 | 1 | 1 | 727.83333 |
| 728 | 0 | 0 | 0 | 1 | 1 | 0 | 1 | 1 | 1 | 1 | 1 | 1 | 728.66667 |
| 729 | 1 | 0 | 0 | 1 | 1 | 0 | 1 | 1 | 1 | 1 | 1 | 1 | 729.75 |
| 730 | 0 | 1 | 0 | 1 | 1 | 0 | 1 | 1 | 1 | 1 | 1 | 1 | 730.75 |
| 731 | 1 | 1 | 0 | 1 | 1 | 0 | 1 | 1 | 1 | 1 | 1 | 1 | 731.83333 |
| 732 | 0 | 0 | 1 | 1 | 1 | 0 | 1 | 1 | 1 | 1 | 1 | 1 | 732.75 |
| 733 | 1 | 0 | 1 | 1 | 1 | 0 | 1 | 1 | 1 | 1 | 1 | 1 | 733.83333 |
| 734 | 0 | 1 | 1 | 1 | 1 | 0 | 1 | 1 | 1 | 1 | 1 | 1 | 734.83333 |
| 735 | 1 | 1 | 1 | 1 | 1 | 0 | 1 | 1 | 1 | 1 | 1 | 1 | 735.91667 |

FIG. 31

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 1 | 2 | 4 | 8 | 16 | 32.1 | 64.083333 | 128.0833333 | 128.0833333 | 128.0833333 | 128.0833333 | 128.0833333 | |
| GRADATION | | | | | | | | | | | | | OUTPUT |
| 736 | 0 | 0 | 0 | 0 | 0 | 1 | 1 | 1 | 1 | 1 | 1 | 1 | 736.58333 |
| 737 | 1 | 0 | 0 | 0 | 0 | 1 | 1 | 1 | 1 | 1 | 1 | 1 | 737.66667 |
| 738 | 0 | 1 | 0 | 0 | 0 | 1 | 1 | 1 | 1 | 1 | 1 | 1 | 738.66667 |
| 739 | 1 | 1 | 0 | 0 | 0 | 1 | 1 | 1 | 1 | 1 | 1 | 1 | 739.75 |
| 740 | 0 | 0 | 1 | 0 | 0 | 1 | 1 | 1 | 1 | 1 | 1 | 1 | 740.66667 |
| 741 | 1 | 0 | 1 | 0 | 0 | 1 | 1 | 1 | 1 | 1 | 1 | 1 | 741.75 |
| 742 | 0 | 1 | 1 | 0 | 0 | 1 | 1 | 1 | 1 | 1 | 1 | 1 | 742.75 |
| 743 | 1 | 1 | 1 | 0 | 0 | 1 | 1 | 1 | 1 | 1 | 1 | 1 | 743.83333 |
| 744 | 0 | 0 | 0 | 1 | 0 | 1 | 1 | 1 | 1 | 1 | 1 | 1 | 744.66667 |
| 745 | 1 | 0 | 0 | 1 | 0 | 1 | 1 | 1 | 1 | 1 | 1 | 1 | 745.75 |
| 746 | 0 | 1 | 0 | 1 | 0 | 1 | 1 | 1 | 1 | 1 | 1 | 1 | 746.75 |
| 747 | 1 | 1 | 0 | 1 | 0 | 1 | 1 | 1 | 1 | 1 | 1 | 1 | 747.83333 |
| 748 | 0 | 0 | 1 | 1 | 0 | 1 | 1 | 1 | 1 | 1 | 1 | 1 | 748.75 |
| 749 | 1 | 0 | 1 | 1 | 0 | 1 | 1 | 1 | 1 | 1 | 1 | 1 | 749.83333 |
| 750 | 0 | 1 | 1 | 1 | 0 | 1 | 1 | 1 | 1 | 1 | 1 | 1 | 750.83333 |
| 751 | 1 | 1 | 1 | 1 | 0 | 1 | 1 | 1 | 1 | 1 | 1 | 1 | 751.91667 |
| 752 | 0 | 0 | 0 | 0 | 1 | 1 | 1 | 1 | 1 | 1 | 1 | 1 | 752.66667 |
| 753 | 1 | 0 | 0 | 0 | 1 | 1 | 1 | 1 | 1 | 1 | 1 | 1 | 753.75 |
| 754 | 0 | 1 | 0 | 0 | 1 | 1 | 1 | 1 | 1 | 1 | 1 | 1 | 754.75 |
| 755 | 1 | 1 | 0 | 0 | 1 | 1 | 1 | 1 | 1 | 1 | 1 | 1 | 755.83333 |
| 756 | 0 | 0 | 1 | 0 | 1 | 1 | 1 | 1 | 1 | 1 | 1 | 1 | 756.75 |
| 757 | 1 | 0 | 1 | 0 | 1 | 1 | 1 | 1 | 1 | 1 | 1 | 1 | 757.83333 |
| 758 | 0 | 1 | 1 | 0 | 1 | 1 | 1 | 1 | 1 | 1 | 1 | 1 | 758.83333 |
| 759 | 1 | 1 | 1 | 0 | 1 | 1 | 1 | 1 | 1 | 1 | 1 | 1 | 759.91667 |
| 760 | 0 | 0 | 0 | 1 | 1 | 1 | 1 | 1 | 1 | 1 | 1 | 1 | 760.75 |
| 761 | 1 | 0 | 0 | 1 | 1 | 1 | 1 | 1 | 1 | 1 | 1 | 1 | 761.83333 |
| 762 | 0 | 1 | 0 | 1 | 1 | 1 | 1 | 1 | 1 | 1 | 1 | 1 | 762.83333 |
| 763 | 1 | 1 | 0 | 1 | 1 | 1 | 1 | 1 | 1 | 1 | 1 | 1 | 763.91667 |
| 764 | 0 | 0 | 1 | 1 | 1 | 1 | 1 | 1 | 1 | 1 | 1 | 1 | 764.83333 |
| 765 | 1 | 0 | 1 | 1 | 1 | 1 | 1 | 1 | 1 | 1 | 1 | 1 | 765.91667 |
| 766 | 0 | 1 | 1 | 1 | 1 | 1 | 1 | 1 | 1 | 1 | 1 | 1 | 766.91667 |
| 767 | 1 | 1 | 1 | 1 | 1 | 1 | 1 | 1 | 1 | 1 | 1 | 1 | 768 |

FIG. 32

| SUBFIELD | 0 | 1 | 2 | 3 | 4 | 5 | 6 | 7 | 8 | 9 | 10 | 11 |
|---|---|---|---|---|---|---|---|---|---|---|---|---|
| WEIGHTING | 1x3+1/12 | 2x3+1/12 | 4x3+1/12 | 8x3+1/12 | 16x3+1/12 | 16x3+1/12 | 16x3+1/12 | 16x3+1/12 | 16x3+1/12 | 16x3+1/12 | 16x3+1/12 | 128x3+1/12 |

FIG.36

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 3 | 6.3 | 12 | 24 | 48.3 | 48.3 | 48.3 | 48.3 | 48.3 | 48.3 | 48.3 | 384.25 | |
| GRADATION | | | | | | | | | | | | | |
| 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 3.25 |
| 2 | 0 | 1 | 0 | 0 | 0 | 0 | 0 | 0 | 0 | 0 | 0 | 0 | 6.25 |
| 3 | 1 | 1 | 0 | 0 | 0 | 0 | 0 | 0 | 0 | 0 | 0 | 0 | 9.5 |
| 4 | 0 | 0 | 1 | 0 | 0 | 0 | 0 | 0 | 0 | 0 | 0 | 0 | 12.25 |
| 5 | 1 | 0 | 1 | 0 | 0 | 0 | 0 | 0 | 0 | 0 | 0 | 0 | 15.5 |
| 6 | 0 | 1 | 1 | 0 | 0 | 0 | 0 | 0 | 0 | 0 | 0 | 0 | 18.5 |
| 7 | 1 | 1 | 1 | 0 | 0 | 0 | 0 | 0 | 0 | 0 | 0 | 0 | 21.75 |
| 8 | 0 | 0 | 0 | 1 | 0 | 0 | 0 | 0 | 0 | 0 | 0 | 0 | 24.25 |
| 9 | 1 | 0 | 0 | 1 | 0 | 0 | 0 | 0 | 0 | 0 | 0 | 0 | 27.5 |
| 10 | 0 | 1 | 0 | 1 | 0 | 0 | 0 | 0 | 0 | 0 | 0 | 0 | 30.5 |
| 11 | 1 | 1 | 0 | 1 | 0 | 0 | 0 | 0 | 0 | 0 | 0 | 0 | 33.75 |
| 12 | 0 | 0 | 1 | 1 | 0 | 0 | 0 | 0 | 0 | 0 | 0 | 0 | 36.5 |
| 13 | 1 | 0 | 1 | 1 | 0 | 0 | 0 | 0 | 0 | 0 | 0 | 0 | 39.75 |
| 14 | 0 | 1 | 1 | 1 | 0 | 0 | 0 | 0 | 0 | 0 | 0 | 0 | 42.75 |
| 15 | 1 | 1 | 1 | 1 | 0 | 0 | 0 | 0 | 0 | 0 | 0 | 0 | 46 |
| 16 | 0 | 0 | 0 | 0 | 1 | 0 | 0 | 0 | 0 | 0 | 0 | 0 | 48.25 |
| 17 | 1 | 0 | 0 | 0 | 1 | 0 | 0 | 0 | 0 | 0 | 0 | 0 | 51.5 |
| 18 | 0 | 1 | 0 | 0 | 1 | 0 | 0 | 0 | 0 | 0 | 0 | 0 | 54.5 |
| 19 | 1 | 1 | 0 | 0 | 1 | 0 | 0 | 0 | 0 | 0 | 0 | 0 | 57.75 |
| 20 | 0 | 0 | 1 | 0 | 1 | 0 | 0 | 0 | 0 | 0 | 0 | 0 | 60.5 |
| 21 | 1 | 0 | 1 | 0 | 1 | 0 | 0 | 0 | 0 | 0 | 0 | 0 | 63.75 |
| 22 | 0 | 1 | 1 | 0 | 1 | 0 | 0 | 0 | 0 | 0 | 0 | 0 | 66.75 |
| 23 | 1 | 1 | 1 | 0 | 1 | 0 | 0 | 0 | 0 | 0 | 0 | 0 | 70 |
| 24 | 0 | 0 | 0 | 1 | 1 | 0 | 0 | 0 | 0 | 0 | 0 | 0 | 72.5 |
| 25 | 1 | 0 | 0 | 1 | 1 | 0 | 0 | 0 | 0 | 0 | 0 | 0 | 75.75 |
| 26 | 0 | 1 | 0 | 1 | 1 | 0 | 0 | 0 | 0 | 0 | 0 | 0 | 78.75 |
| 27 | 1 | 1 | 0 | 1 | 1 | 0 | 0 | 0 | 0 | 0 | 0 | 0 | 82 |
| 28 | 0 | 0 | 1 | 1 | 1 | 0 | 0 | 0 | 0 | 0 | 0 | 0 | 84.75 |
| 29 | 1 | 0 | 1 | 1 | 1 | 0 | 0 | 0 | 0 | 0 | 0 | 0 | 88 |
| 30 | 0 | 1 | 1 | 1 | 1 | 0 | 0 | 0 | 0 | 0 | 0 | 0 | 91 |
| 31 | 1 | 1 | 1 | 1 | 1 | 0 | 0 | 0 | 0 | 0 | 0 | 0 | 94.25 |

FIG.37

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 3 | 6.3 | 12 | 24 | 48.3 | 48.3 | 48.3 | 48.3 | 48.3 | 48.3 | 48.3 | 384.25 | |
| GRADATION | | | | | | | | | | | | | |
| 32 | 0 | 0 | 0 | 0 | 1 | 1 | 0 | 0 | 0 | 0 | 0 | 0 | 96.5 |
| 33 | 1 | 0 | 0 | 0 | 1 | 1 | 0 | 0 | 0 | 0 | 0 | 0 | 99.75 |
| 34 | 0 | 1 | 0 | 0 | 1 | 1 | 0 | 0 | 0 | 0 | 0 | 0 | 102.8 |
| 35 | 1 | 1 | 0 | 0 | 1 | 1 | 0 | 0 | 0 | 0 | 0 | 0 | 106 |
| 36 | 0 | 0 | 1 | 0 | 1 | 1 | 0 | 0 | 0 | 0 | 0 | 0 | 108.8 |
| 37 | 1 | 0 | 1 | 0 | 1 | 1 | 0 | 0 | 0 | 0 | 0 | 0 | 112 |
| 38 | 0 | 1 | 1 | 0 | 1 | 1 | 0 | 0 | 0 | 0 | 0 | 0 | 115 |
| 39 | 1 | 1 | 1 | 0 | 1 | 1 | 0 | 0 | 0 | 0 | 0 | 0 | 118.3 |
| 40 | 0 | 0 | 0 | 1 | 1 | 1 | 0 | 0 | 0 | 0 | 0 | 0 | 120.8 |
| 41 | 1 | 0 | 0 | 1 | 1 | 1 | 0 | 0 | 0 | 0 | 0 | 0 | 124 |
| 42 | 0 | 1 | 0 | 1 | 1 | 1 | 0 | 0 | 0 | 0 | 0 | 0 | 127 |
| 43 | 1 | 1 | 0 | 1 | 1 | 1 | 0 | 0 | 0 | 0 | 0 | 0 | 130.3 |
| 44 | 0 | 0 | 1 | 1 | 1 | 1 | 0 | 0 | 0 | 0 | 0 | 0 | 133 |
| 45 | 1 | 0 | 1 | 1 | 1 | 1 | 0 | 0 | 0 | 0 | 0 | 0 | 136.3 |
| 46 | 0 | 1 | 1 | 1 | 1 | 1 | 0 | 0 | 0 | 0 | 0 | 0 | 139.3 |
| 47 | 1 | 1 | 1 | 1 | 1 | 1 | 0 | 0 | 0 | 0 | 0 | 0 | 142.5 |
| 48 | 0 | 0 | 0 | 0 | 1 | 1 | 1 | 0 | 0 | 0 | 0 | 0 | 144.8 |
| 49 | 1 | 0 | 0 | 0 | 1 | 1 | 1 | 0 | 0 | 0 | 0 | 0 | 148 |
| 50 | 0 | 1 | 0 | 0 | 1 | 1 | 1 | 0 | 0 | 0 | 0 | 0 | 151 |
| 51 | 1 | 1 | 0 | 0 | 1 | 1 | 1 | 0 | 0 | 0 | 0 | 0 | 154.3 |
| 52 | 0 | 0 | 1 | 0 | 1 | 1 | 1 | 0 | 0 | 0 | 0 | 0 | 157 |
| 53 | 1 | 0 | 1 | 0 | 1 | 1 | 1 | 0 | 0 | 0 | 0 | 0 | 160.3 |
| 54 | 0 | 1 | 1 | 0 | 1 | 1 | 1 | 0 | 0 | 0 | 0 | 0 | 163.3 |
| 55 | 1 | 1 | 1 | 0 | 1 | 1 | 1 | 0 | 0 | 0 | 0 | 0 | 166.5 |
| 56 | 0 | 0 | 0 | 1 | 1 | 1 | 1 | 0 | 0 | 0 | 0 | 0 | 169 |
| 57 | 1 | 0 | 0 | 1 | 1 | 1 | 1 | 0 | 0 | 0 | 0 | 0 | 172.3 |
| 58 | 0 | 1 | 0 | 1 | 1 | 1 | 1 | 0 | 0 | 0 | 0 | 0 | 175.3 |
| 59 | 1 | 1 | 0 | 1 | 1 | 1 | 1 | 0 | 0 | 0 | 0 | 0 | 178.5 |
| 60 | 0 | 0 | 1 | 1 | 1 | 1 | 1 | 0 | 0 | 0 | 0 | 0 | 181.3 |
| 61 | 1 | 0 | 1 | 1 | 1 | 1 | 1 | 0 | 0 | 0 | 0 | 0 | 184.5 |
| 62 | 0 | 1 | 1 | 1 | 1 | 1 | 1 | 0 | 0 | 0 | 0 | 0 | 187.5 |
| 63 | 1 | 1 | 1 | 1 | 1 | 1 | 1 | 0 | 0 | 0 | 0 | 0 | 190.8 |

FIG.38

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 3 | 6.3 | 12 | 24 | 48.3 | 48.3 | 48.3 | 48.3 | 48.3 | 48.3 | 48.3 | 384.25 | |
| GRADATION | | | | | | | | | | | | | |
| 64 | 0 | 0 | 0 | 0 | 1 | 1 | 1 | 1 | 0 | 0 | 0 | 0 | 193 |
| 65 | 1 | 0 | 0 | 0 | 1 | 1 | 1 | 1 | 0 | 0 | 0 | 0 | 196.3 |
| 66 | 0 | 1 | 0 | 0 | 1 | 1 | 1 | 1 | 0 | 0 | 0 | 0 | 199.3 |
| 67 | 1 | 1 | 0 | 0 | 1 | 1 | 1 | 1 | 0 | 0 | 0 | 0 | 202.5 |
| 68 | 0 | 0 | 1 | 0 | 1 | 1 | 1 | 1 | 0 | 0 | 0 | 0 | 205.3 |
| 69 | 1 | 0 | 1 | 0 | 1 | 1 | 1 | 1 | 0 | 0 | 0 | 0 | 208.5 |
| 70 | 0 | 1 | 1 | 0 | 1 | 1 | 1 | 1 | 0 | 0 | 0 | 0 | 211.5 |
| 71 | 1 | 1 | 1 | 0 | 1 | 1 | 1 | 1 | 0 | 0 | 0 | 0 | 214.8 |
| 72 | 0 | 0 | 0 | 1 | 1 | 1 | 1 | 1 | 0 | 0 | 0 | 0 | 217.3 |
| 73 | 1 | 0 | 0 | 1 | 1 | 1 | 1 | 1 | 0 | 0 | 0 | 0 | 220.5 |
| 74 | 0 | 1 | 0 | 1 | 1 | 1 | 1 | 1 | 0 | 0 | 0 | 0 | 223.5 |
| 75 | 1 | 1 | 0 | 1 | 1 | 1 | 1 | 1 | 0 | 0 | 0 | 0 | 226.8 |
| 76 | 0 | 0 | 1 | 1 | 1 | 1 | 1 | 1 | 0 | 0 | 0 | 0 | 229.5 |
| 77 | 1 | 0 | 1 | 1 | 1 | 1 | 1 | 1 | 0 | 0 | 0 | 0 | 232.8 |
| 78 | 0 | 1 | 1 | 1 | 1 | 1 | 1 | 1 | 0 | 0 | 0 | 0 | 235.8 |
| 79 | 1 | 1 | 1 | 1 | 1 | 1 | 1 | 1 | 0 | 0 | 0 | 0 | 239 |
| 80 | 0 | 0 | 0 | 0 | 1 | 1 | 1 | 1 | 1 | 0 | 0 | 0 | 241.3 |
| 81 | 1 | 0 | 0 | 0 | 1 | 1 | 1 | 1 | 1 | 0 | 0 | 0 | 244.5 |
| 82 | 0 | 1 | 0 | 0 | 1 | 1 | 1 | 1 | 1 | 0 | 0 | 0 | 247.5 |
| 83 | 1 | 1 | 0 | 0 | 1 | 1 | 1 | 1 | 1 | 0 | 0 | 0 | 250.8 |
| 84 | 0 | 0 | 1 | 0 | 1 | 1 | 1 | 1 | 1 | 0 | 0 | 0 | 253.5 |
| 85 | 1 | 0 | 1 | 0 | 1 | 1 | 1 | 1 | 1 | 0 | 0 | 0 | 256.8 |
| 86 | 0 | 1 | 1 | 0 | 1 | 1 | 1 | 1 | 1 | 0 | 0 | 0 | 259.8 |
| 87 | 1 | 1 | 1 | 0 | 1 | 1 | 1 | 1 | 1 | 0 | 0 | 0 | 263 |
| 88 | 0 | 0 | 0 | 1 | 1 | 1 | 1 | 1 | 1 | 0 | 0 | 0 | 265.5 |
| 89 | 1 | 0 | 0 | 1 | 1 | 1 | 1 | 1 | 1 | 0 | 0 | 0 | 268.8 |
| 90 | 0 | 1 | 0 | 1 | 1 | 1 | 1 | 1 | 1 | 0 | 0 | 0 | 271.8 |
| 91 | 1 | 1 | 0 | 1 | 1 | 1 | 1 | 1 | 1 | 0 | 0 | 0 | 275 |
| 92 | 0 | 0 | 1 | 1 | 1 | 1 | 1 | 1 | 1 | 0 | 0 | 0 | 277.8 |
| 93 | 1 | 0 | 1 | 1 | 1 | 1 | 1 | 1 | 1 | 0 | 0 | 0 | 281 |
| 94 | 0 | 1 | 1 | 1 | 1 | 1 | 1 | 1 | 1 | 0 | 0 | 0 | 284 |
| 95 | 1 | 1 | 1 | 1 | 1 | 1 | 1 | 1 | 1 | 0 | 0 | 0 | 287.3 |

FIG.39

| bitplane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 3 | 6.3 | 12 | 24 | 48.3 | 48.3 | 48.3 | 48.3 | 48.3 | 48.3 | 48.3 | 384.25 | |
| GRADATION | | | | | | | | | | | | | |
| 96 | 0 | 0 | 0 | 0 | 1 | 1 | 1 | 1 | 1 | 1 | 0 | 0 | 289.5 |
| 97 | 1 | 0 | 0 | 0 | 1 | 1 | 1 | 1 | 1 | 1 | 0 | 0 | 292.8 |
| 98 | 0 | 1 | 0 | 0 | 1 | 1 | 1 | 1 | 1 | 1 | 0 | 0 | 295.8 |
| 99 | 1 | 1 | 0 | 0 | 1 | 1 | 1 | 1 | 1 | 1 | 0 | 0 | 299 |
| 100 | 0 | 0 | 1 | 0 | 1 | 1 | 1 | 1 | 1 | 1 | 0 | 0 | 301.8 |
| 101 | 1 | 0 | 1 | 0 | 1 | 1 | 1 | 1 | 1 | 1 | 0 | 0 | 305 |
| 102 | 0 | 1 | 1 | 0 | 1 | 1 | 1 | 1 | 1 | 1 | 0 | 0 | 308 |
| 103 | 1 | 1 | 1 | 0 | 1 | 1 | 1 | 1 | 1 | 1 | 0 | 0 | 311.3 |
| 104 | 0 | 0 | 0 | 1 | 1 | 1 | 1 | 1 | 1 | 1 | 0 | 0 | 313.8 |
| 105 | 1 | 0 | 0 | 1 | 1 | 1 | 1 | 1 | 1 | 1 | 0 | 0 | 317 |
| 106 | 0 | 1 | 0 | 1 | 1 | 1 | 1 | 1 | 1 | 1 | 0 | 0 | 320 |
| 107 | 1 | 1 | 0 | 1 | 1 | 1 | 1 | 1 | 1 | 1 | 0 | 0 | 323.3 |
| 108 | 0 | 0 | 1 | 1 | 1 | 1 | 1 | 1 | 1 | 1 | 0 | 0 | 326 |
| 109 | 1 | 0 | 1 | 1 | 1 | 1 | 1 | 1 | 1 | 1 | 0 | 0 | 329.3 |
| 110 | 0 | 1 | 1 | 1 | 1 | 1 | 1 | 1 | 1 | 1 | 0 | 0 | 332.3 |
| 111 | 1 | 1 | 1 | 1 | 1 | 1 | 1 | 1 | 1 | 1 | 0 | 0 | 335.5 |
| 112 | 0 | 0 | 0 | 0 | 1 | 1 | 1 | 1 | 1 | 1 | 1 | 0 | 337.8 |
| 113 | 1 | 0 | 0 | 0 | 1 | 1 | 1 | 1 | 1 | 1 | 1 | 0 | 341 |
| 114 | 0 | 1 | 0 | 0 | 1 | 1 | 1 | 1 | 1 | 1 | 1 | 0 | 344 |
| 115 | 1 | 1 | 0 | 0 | 1 | 1 | 1 | 1 | 1 | 1 | 1 | 0 | 347.3 |
| 116 | 0 | 0 | 1 | 0 | 1 | 1 | 1 | 1 | 1 | 1 | 1 | 0 | 350 |
| 117 | 1 | 0 | 1 | 0 | 1 | 1 | 1 | 1 | 1 | 1 | 1 | 0 | 353.3 |
| 118 | 0 | 1 | 1 | 0 | 1 | 1 | 1 | 1 | 1 | 1 | 1 | 0 | 356.3 |
| 119 | 1 | 1 | 1 | 0 | 1 | 1 | 1 | 1 | 1 | 1 | 1 | 0 | 359.5 |
| 120 | 0 | 0 | 0 | 1 | 1 | 1 | 1 | 1 | 1 | 1 | 1 | 0 | 362 |
| 121 | 1 | 0 | 0 | 1 | 1 | 1 | 1 | 1 | 1 | 1 | 1 | 0 | 365.3 |
| 122 | 0 | 1 | 0 | 1 | 1 | 1 | 1 | 1 | 1 | 1 | 1 | 0 | 368.3 |
| 123 | 1 | 1 | 0 | 1 | 1 | 1 | 1 | 1 | 1 | 1 | 1 | 0 | 371.5 |
| 124 | 0 | 0 | 1 | 1 | 1 | 1 | 1 | 1 | 1 | 1 | 1 | 0 | 374.3 |
| 125 | 1 | 0 | 1 | 1 | 1 | 1 | 1 | 1 | 1 | 1 | 1 | 0 | 377.5 |
| 126 | 0 | 1 | 1 | 1 | 1 | 1 | 1 | 1 | 1 | 1 | 1 | 0 | 380.5 |
| 127 | 1 | 1 | 1 | 1 | 1 | 1 | 1 | 1 | 1 | 1 | 1 | 0 | 383.8 |

FIG.40

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 3 | 6.3 | 12 | 24 | 48.3 | 48.3 | 48.3 | 48.3 | 48.3 | 48.3 | 48.3 | 384.25 | |
| GRADATION | | | | | | | | | | | | | |
| 128 | 0 | 0 | 0 | 0 | 0 | 0 | 0 | 0 | 0 | 0 | 0 | 1 | 384.3 |
| 129 | 1 | 0 | 0 | 0 | 0 | 0 | 0 | 0 | 0 | 0 | 0 | 1 | 387.5 |
| 130 | 0 | 1 | 0 | 0 | 0 | 0 | 0 | 0 | 0 | 0 | 0 | 1 | 390.5 |
| 131 | 1 | 1 | 0 | 0 | 0 | 0 | 0 | 0 | 0 | 0 | 0 | 1 | 393.8 |
| 132 | 0 | 0 | 1 | 0 | 0 | 0 | 0 | 0 | 0 | 0 | 0 | 1 | 396.5 |
| 133 | 1 | 0 | 1 | 0 | 0 | 0 | 0 | 0 | 0 | 0 | 0 | 1 | 399.8 |
| 134 | 0 | 1 | 1 | 0 | 0 | 0 | 0 | 0 | 0 | 0 | 0 | 1 | 402.8 |
| 135 | 1 | 1 | 1 | 0 | 0 | 0 | 0 | 0 | 0 | 0 | 0 | 1 | 406 |
| 136 | 0 | 0 | 0 | 1 | 0 | 0 | 0 | 0 | 0 | 0 | 0 | 1 | 408.5 |
| 137 | 1 | 0 | 0 | 1 | 0 | 0 | 0 | 0 | 0 | 0 | 0 | 1 | 411.8 |
| 138 | 0 | 1 | 0 | 1 | 0 | 0 | 0 | 0 | 0 | 0 | 0 | 1 | 414.8 |
| 139 | 1 | 1 | 0 | 1 | 0 | 0 | 0 | 0 | 0 | 0 | 0 | 1 | 418 |
| 140 | 0 | 0 | 1 | 1 | 0 | 0 | 0 | 0 | 0 | 0 | 0 | 1 | 420.8 |
| 141 | 1 | 0 | 1 | 1 | 0 | 0 | 0 | 0 | 0 | 0 | 0 | 1 | 424 |
| 142 | 0 | 1 | 1 | 1 | 0 | 0 | 0 | 0 | 0 | 0 | 0 | 1 | 427 |
| 143 | 1 | 1 | 1 | 1 | 0 | 0 | 0 | 0 | 0 | 0 | 0 | 1 | 430.3 |
| 144 | 0 | 0 | 0 | 0 | 1 | 0 | 0 | 0 | 0 | 0 | 0 | 1 | 432.5 |
| 145 | 1 | 0 | 0 | 0 | 1 | 0 | 0 | 0 | 0 | 0 | 0 | 1 | 435.8 |
| 146 | 0 | 1 | 0 | 0 | 1 | 0 | 0 | 0 | 0 | 0 | 0 | 1 | 438.8 |
| 147 | 1 | 1 | 0 | 0 | 1 | 0 | 0 | 0 | 0 | 0 | 0 | 1 | 442 |
| 148 | 0 | 0 | 1 | 0 | 1 | 0 | 0 | 0 | 0 | 0 | 0 | 1 | 444.8 |
| 149 | 1 | 0 | 1 | 0 | 1 | 0 | 0 | 0 | 0 | 0 | 0 | 1 | 448 |
| 150 | 0 | 1 | 1 | 0 | 1 | 0 | 0 | 0 | 0 | 0 | 0 | 1 | 451 |
| 151 | 1 | 1 | 1 | 0 | 1 | 0 | 0 | 0 | 0 | 0 | 0 | 1 | 454.3 |
| 152 | 0 | 0 | 0 | 1 | 1 | 0 | 0 | 0 | 0 | 0 | 0 | 1 | 456.8 |
| 153 | 1 | 0 | 0 | 1 | 1 | 0 | 0 | 0 | 0 | 0 | 0 | 1 | 460 |
| 154 | 0 | 1 | 0 | 1 | 1 | 0 | 0 | 0 | 0 | 0 | 0 | 1 | 463 |
| 155 | 1 | 1 | 0 | 1 | 1 | 0 | 0 | 0 | 0 | 0 | 0 | 1 | 466.3 |
| 156 | 0 | 0 | 1 | 1 | 1 | 0 | 0 | 0 | 0 | 0 | 0 | 1 | 469 |
| 157 | 1 | 0 | 1 | 1 | 1 | 0 | 0 | 0 | 0 | 0 | 0 | 1 | 472.3 |
| 158 | 0 | 1 | 1 | 1 | 1 | 0 | 0 | 0 | 0 | 0 | 0 | 1 | 475.3 |
| 159 | 1 | 1 | 1 | 1 | 1 | 0 | 0 | 0 | 0 | 0 | 0 | 1 | 478.5 |

FIG.41

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 3 | 6.3 | 12 | 24 | 48.3 | 48.3 | 48.3 | 48.3 | 48.3 | 48.3 | 48.3 | 384.25 | |
| GRADATION | | | | | | | | | | | | | |
| 160 | 0 | 0 | 0 | 0 | 1 | 1 | 0 | 0 | 0 | 0 | 0 | 1 | 480.8 |
| 161 | 1 | 0 | 0 | 0 | 1 | 1 | 0 | 0 | 0 | 0 | 0 | 1 | 484 |
| 162 | 0 | 1 | 0 | 0 | 1 | 1 | 0 | 0 | 0 | 0 | 0 | 1 | 487 |
| 163 | 1 | 1 | 0 | 0 | 1 | 1 | 0 | 0 | 0 | 0 | 0 | 1 | 490.3 |
| 164 | 0 | 0 | 1 | 0 | 1 | 1 | 0 | 0 | 0 | 0 | 0 | 1 | 493 |
| 165 | 1 | 0 | 1 | 0 | 1 | 1 | 0 | 0 | 0 | 0 | 0 | 1 | 496.3 |
| 166 | 0 | 1 | 1 | 0 | 1 | 1 | 0 | 0 | 0 | 0 | 0 | 1 | 499.3 |
| 167 | 1 | 1 | 1 | 0 | 1 | 1 | 0 | 0 | 0 | 0 | 0 | 1 | 502.5 |
| 168 | 0 | 0 | 0 | 1 | 1 | 1 | 0 | 0 | 0 | 0 | 0 | 1 | 505 |
| 169 | 1 | 0 | 0 | 1 | 1 | 1 | 0 | 0 | 0 | 0 | 0 | 1 | 508.5 |
| 170 | 0 | 1 | 0 | 1 | 1 | 1 | 0 | 0 | 0 | 0 | 0 | 1 | 511.3 |
| 171 | 1 | 1 | 0 | 1 | 1 | 1 | 0 | 0 | 0 | 0 | 0 | 1 | 514.5 |
| 172 | 0 | 0 | 1 | 1 | 1 | 1 | 0 | 0 | 0 | 0 | 0 | 1 | 517.3 |
| 173 | 1 | 0 | 1 | 1 | 1 | 1 | 0 | 0 | 0 | 0 | 0 | 1 | 520.5 |
| 174 | 0 | 1 | 1 | 1 | 1 | 1 | 0 | 0 | 0 | 0 | 0 | 1 | 523.5 |
| 175 | 1 | 1 | 1 | 1 | 1 | 1 | 0 | 0 | 0 | 0 | 0 | 1 | 526.8 |
| 176 | 0 | 0 | 0 | 0 | 1 | 1 | 1 | 0 | 0 | 0 | 0 | 1 | 529 |
| 177 | 1 | 0 | 0 | 0 | 1 | 1 | 1 | 0 | 0 | 0 | 0 | 1 | 532.3 |
| 178 | 0 | 1 | 0 | 0 | 1 | 1 | 1 | 0 | 0 | 0 | 0 | 1 | 535.3 |
| 179 | 1 | 1 | 0 | 0 | 1 | 1 | 1 | 0 | 0 | 0 | 0 | 1 | 538.5 |
| 180 | 0 | 0 | 1 | 0 | 1 | 1 | 1 | 0 | 0 | 0 | 0 | 1 | 541.3 |
| 181 | 1 | 0 | 1 | 0 | 1 | 1 | 1 | 0 | 0 | 0 | 0 | 1 | 544.5 |
| 182 | 0 | 1 | 1 | 0 | 1 | 1 | 1 | 0 | 0 | 0 | 0 | 1 | 547.5 |
| 183 | 1 | 1 | 1 | 0 | 1 | 1 | 1 | 0 | 0 | 0 | 0 | 1 | 550.8 |
| 184 | 0 | 0 | 0 | 1 | 1 | 1 | 1 | 0 | 0 | 0 | 0 | 1 | 553.3 |
| 185 | 1 | 0 | 0 | 1 | 1 | 1 | 1 | 0 | 0 | 0 | 0 | 1 | 556.5 |
| 186 | 0 | 1 | 0 | 1 | 1 | 1 | 1 | 0 | 0 | 0 | 0 | 1 | 559.5 |
| 187 | 1 | 1 | 0 | 1 | 1 | 1 | 1 | 0 | 0 | 0 | 0 | 1 | 562.8 |
| 188 | 0 | 0 | 1 | 1 | 1 | 1 | 1 | 0 | 0 | 0 | 0 | 1 | 565.5 |
| 189 | 1 | 0 | 1 | 1 | 1 | 1 | 1 | 0 | 0 | 0 | 0 | 1 | 568.8 |
| 190 | 0 | 1 | 1 | 1 | 1 | 1 | 1 | 0 | 0 | 0 | 0 | 1 | 571.8 |
| 191 | 1 | 1 | 1 | 1 | 1 | 1 | 1 | 0 | 0 | 0 | 0 | 1 | 575 |

FIG. 42

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 3 | 6.3 | 12 | 24 | 48.3 | 48.3 | 48.3 | 48.3 | 48.3 | 48.3 | 48.3 | 384.25 | |
| GRADATION | | | | | | | | | | | | | |
| 192 | 0 | 0 | 0 | 0 | 1 | 1 | 1 | 1 | 0 | 0 | 0 | 1 | 577.3 |
| 193 | 1 | 0 | 0 | 0 | 1 | 1 | 1 | 1 | 0 | 0 | 0 | 1 | 580.5 |
| 194 | 0 | 1 | 0 | 0 | 1 | 1 | 1 | 1 | 0 | 0 | 0 | 1 | 583.5 |
| 195 | 1 | 1 | 0 | 0 | 1 | 1 | 1 | 1 | 0 | 0 | 0 | 1 | 586.8 |
| 196 | 0 | 0 | 1 | 0 | 1 | 1 | 1 | 1 | 0 | 0 | 0 | 1 | 589.5 |
| 197 | 1 | 0 | 1 | 0 | 1 | 1 | 1 | 1 | 0 | 0 | 0 | 1 | 592.8 |
| 198 | 0 | 1 | 1 | 0 | 1 | 1 | 1 | 1 | 0 | 0 | 0 | 1 | 595.8 |
| 199 | 1 | 1 | 1 | 0 | 1 | 1 | 1 | 1 | 0 | 0 | 0 | 1 | 599 |
| 200 | 0 | 0 | 0 | 1 | 1 | 1 | 1 | 1 | 0 | 0 | 0 | 1 | 601.5 |
| 201 | 1 | 0 | 0 | 1 | 1 | 1 | 1 | 1 | 0 | 0 | 0 | 1 | 604.8 |
| 202 | 0 | 1 | 0 | 1 | 1 | 1 | 1 | 1 | 0 | 0 | 0 | 1 | 607.8 |
| 203 | 1 | 1 | 0 | 1 | 1 | 1 | 1 | 1 | 0 | 0 | 0 | 1 | 611 |
| 204 | 0 | 0 | 1 | 1 | 1 | 1 | 1 | 1 | 0 | 0 | 0 | 1 | 613.8 |
| 205 | 1 | 0 | 1 | 1 | 1 | 1 | 1 | 1 | 0 | 0 | 0 | 1 | 617 |
| 206 | 0 | 1 | 1 | 1 | 1 | 1 | 1 | 1 | 0 | 0 | 0 | 1 | 620 |
| 207 | 1 | 1 | 1 | 1 | 1 | 1 | 1 | 1 | 0 | 0 | 0 | 1 | 623.3 |
| 208 | 0 | 0 | 0 | 0 | 1 | 1 | 1 | 1 | 1 | 0 | 0 | 1 | 625.5 |
| 209 | 1 | 0 | 0 | 0 | 1 | 1 | 1 | 1 | 1 | 0 | 0 | 1 | 628.8 |
| 210 | 0 | 1 | 0 | 0 | 1 | 1 | 1 | 1 | 1 | 0 | 0 | 1 | 631.8 |
| 211 | 1 | 1 | 0 | 0 | 1 | 1 | 1 | 1 | 1 | 0 | 0 | 1 | 635 |
| 212 | 0 | 0 | 1 | 0 | 1 | 1 | 1 | 1 | 1 | 0 | 0 | 1 | 637.8 |
| 213 | 1 | 0 | 1 | 0 | 1 | 1 | 1 | 1 | 1 | 0 | 0 | 1 | 641 |
| 214 | 0 | 1 | 1 | 0 | 1 | 1 | 1 | 1 | 1 | 0 | 0 | 1 | 644 |
| 215 | 1 | 1 | 1 | 0 | 1 | 1 | 1 | 1 | 1 | 0 | 0 | 1 | 647.3 |
| 216 | 0 | 0 | 0 | 1 | 1 | 1 | 1 | 1 | 1 | 0 | 0 | 1 | 649.8 |
| 217 | 1 | 0 | 0 | 1 | 1 | 1 | 1 | 1 | 1 | 0 | 0 | 1 | 653 |
| 218 | 0 | 1 | 0 | 1 | 1 | 1 | 1 | 1 | 1 | 0 | 0 | 1 | 656 |
| 219 | 1 | 1 | 0 | 1 | 1 | 1 | 1 | 1 | 1 | 0 | 0 | 1 | 659.3 |
| 220 | 0 | 0 | 1 | 1 | 1 | 1 | 1 | 1 | 1 | 0 | 0 | 1 | 662 |
| 221 | 1 | 0 | 1 | 1 | 1 | 1 | 1 | 1 | 1 | 0 | 0 | 1 | 665.3 |
| 222 | 0 | 1 | 1 | 1 | 1 | 1 | 1 | 1 | 1 | 0 | 0 | 1 | 668.3 |
| 223 | 1 | 1 | 1 | 1 | 1 | 1 | 1 | 1 | 1 | 0 | 0 | 1 | 671.5 |

FIG. 43

| bit plane No. | 0 | 1 | 2 | 3 | 4 | 5 | 6 | 7 | 8 | 9 | 10 | 11 | |
|---|---|---|---|---|---|---|---|---|---|---|---|---|---|
| WEIGHT | 3 | 6.3 | 12 | 24 | 48.3 | 48.3 | 48.3 | 48.3 | 48.3 | 48.3 | 48.3 | 384.25 | |
| GRADATION | | | | | | | | | | | | | |
| 224 | 0 | 0 | 0 | 0 | 1 | 1 | 1 | 1 | 1 | 1 | 0 | 1 | 673.8 |
| 225 | 1 | 0 | 0 | 0 | 1 | 1 | 1 | 1 | 1 | 1 | 0 | 1 | 677 |
| 226 | 0 | 1 | 0 | 0 | 1 | 1 | 1 | 1 | 1 | 1 | 0 | 1 | 680 |
| 227 | 1 | 1 | 0 | 0 | 1 | 1 | 1 | 1 | 1 | 1 | 0 | 1 | 683.3 |
| 228 | 0 | 0 | 1 | 0 | 1 | 1 | 1 | 1 | 1 | 1 | 0 | 1 | 686 |
| 229 | 1 | 0 | 1 | 0 | 1 | 1 | 1 | 1 | 1 | 1 | 0 | 1 | 689.3 |
| 230 | 0 | 1 | 1 | 0 | 1 | 1 | 1 | 1 | 1 | 1 | 0 | 1 | 692.3 |
| 231 | 1 | 1 | 1 | 0 | 1 | 1 | 1 | 1 | 1 | 1 | 0 | 1 | 695.5 |
| 232 | 0 | 0 | 0 | 1 | 1 | 1 | 1 | 1 | 1 | 1 | 0 | 1 | 698 |
| 233 | 1 | 0 | 0 | 1 | 1 | 1 | 1 | 1 | 1 | 1 | 0 | 1 | 701.3 |
| 234 | 0 | 1 | 0 | 1 | 1 | 1 | 1 | 1 | 1 | 1 | 0 | 1 | 704.3 |
| 235 | 1 | 1 | 0 | 1 | 1 | 1 | 1 | 1 | 1 | 1 | 0 | 1 | 707.5 |
| 236 | 0 | 0 | 1 | 1 | 1 | 1 | 1 | 1 | 1 | 1 | 0 | 1 | 710.3 |
| 237 | 1 | 0 | 1 | 1 | 1 | 1 | 1 | 1 | 1 | 1 | 0 | 1 | 713.5 |
| 238 | 0 | 1 | 1 | 1 | 1 | 1 | 1 | 1 | 1 | 1 | 0 | 1 | 716.5 |
| 239 | 1 | 1 | 1 | 1 | 1 | 1 | 1 | 1 | 1 | 1 | 0 | 1 | 719.8 |
| 240 | 0 | 0 | 0 | 0 | 1 | 1 | 1 | 1 | 1 | 1 | 1 | 1 | 722 |
| 241 | 1 | 0 | 0 | 0 | 1 | 1 | 1 | 1 | 1 | 1 | 1 | 1 | 725.3 |
| 242 | 0 | 1 | 0 | 0 | 1 | 1 | 1 | 1 | 1 | 1 | 1 | 1 | 728.3 |
| 243 | 1 | 1 | 0 | 0 | 1 | 1 | 1 | 1 | 1 | 1 | 1 | 1 | 731.5 |
| 244 | 0 | 0 | 1 | 0 | 1 | 1 | 1 | 1 | 1 | 1 | 1 | 1 | 734.3 |
| 245 | 1 | 0 | 1 | 0 | 1 | 1 | 1 | 1 | 1 | 1 | 1 | 1 | 737.5 |
| 246 | 0 | 1 | 1 | 0 | 1 | 1 | 1 | 1 | 1 | 1 | 1 | 1 | 740.5 |
| 247 | 1 | 1 | 1 | 0 | 1 | 1 | 1 | 1 | 1 | 1 | 1 | 1 | 743.8 |
| 248 | 0 | 0 | 0 | 1 | 1 | 1 | 1 | 1 | 1 | 1 | 1 | 1 | 746.3 |
| 249 | 1 | 0 | 0 | 1 | 1 | 1 | 1 | 1 | 1 | 1 | 1 | 1 | 749.5 |
| 250 | 0 | 1 | 0 | 1 | 1 | 1 | 1 | 1 | 1 | 1 | 1 | 1 | 752.5 |
| 251 | 1 | 1 | 0 | 1 | 1 | 1 | 1 | 1 | 1 | 1 | 1 | 1 | 755.8 |
| 252 | 0 | 0 | 1 | 1 | 1 | 1 | 1 | 1 | 1 | 1 | 1 | 1 | 758.5 |
| 253 | 1 | 0 | 1 | 1 | 1 | 1 | 1 | 1 | 1 | 1 | 1 | 1 | 761.8 |
| 254 | 0 | 1 | 1 | 1 | 1 | 1 | 1 | 1 | 1 | 1 | 1 | 1 | 764.8 |
| 255 | 1 | 1 | 1 | 1 | 1 | 1 | 1 | 1 | 1 | 1 | 1 | 1 | 768 |

FIG.44

DISPLAY DRIVE METHOD AND DISPLAY APPARATUS

BACKGROUND OF THE INVENTION

The present invention relates to a display drive method and a display apparatus which drive display element, and more particularly to a display drive method and a display apparatus which are adapted for outputting, on the basis of concept of subfield, corresponding data every the subfield by PWM (Pulse Width Modulation).

This Application claims priority of Japanese Patent Application No. 2001-357784, filed on Nov. 22, 2001, the entirety of which is incorporated by reference herein.

Various display elements utilizing light modulation element are widely known as display element. Further, e.g., in displays using such light modulation element as display element, PWM (Pulse Width Modulation) system is known as display drive system for light modulation. In this PWM system, time width of condition where, e.g., light source luminance is caused to be constant to thereby conduct gradation representation.

In the PWM system, particularly the drive system utilizing subfield is known. Here, the subfield is also called bit plane. This drive system is based on the above-described binary display state by ON/OFF (emitting (white)/non-emitting (black)), and is adapted to form combination of bit planes in which time width is set by weight of data bits. Display elements are driven by combination of these plural bit planes (subfields) to thereby represent gradation.

In performing display drive by the PWM system as described above, it is necessary to conduct weighting by time width. Further, time width of the least significant bit in this case can be expressed by the following formula.

$$T_{LSB} = \frac{t_f}{2^n - 1} \tag{1}$$

$T_{LSB}$: Least Significant Bit Time Width $t_f$: frame frequency n: number of bits Assuming that time width is based on the above-mentioned formula (1), if the frame frequency is equal to 120 Hz on the premise that gradation representation is performed by, e.g., 10 bits, time width of the least significant bit (least significant bit time width) of plural subfields becomes equal to 8 μs.

Time change of rewrite operation of subfield data is shown as drive operation in the general subfield system is shown in FIG. 46. In this case, the case where rewrite operation of one field is conducted by three subfields of subfields 0, 1, 2 is shown as the case where gradation is represented by 3 bits. In this figure, field n and the next field n+1 are shown, wherein the longitudinal direction indicates vertical scanning direction (ROW direction) and the lateral direction indicates time passage.

In the case where the display element is liquid crystal, a.c. drive is conducted in order to avoid deterioration of liquid crystal by d. c. drive in a manner well known. However, here, polarity of subfield data is inverted every field time period to thereby perform a.c. drive. In this case, as subfield data, positive data is outputted in the field n and negative data is outputted in the field n+1.

In FIG. 46, at the time period of the preceding field n, subfield data 0 which is positive in polarity corresponding to subfield 0 is first outputted and is written in line-sequential manner in accordance with time width by a predetermined weighting. When picture as subfield 0 is assumed to be formed as the result of the fact that write operation of the subfield data 0 has been conducted with respect to all pictures, subfield data 1 which is positive in polarity corresponding to the subfield 1 is subsequently similarly written in line-sequential manner by time half width by a predetermined weighting. Thus, picture as subfield 0 is formed. Further, subfield data 2 which is positive in polarity corresponding to subfield 2 is subsequently written in line-sequential manner to form picture as the subfield 2.

As the result of the fact that pictures as subfields 0, 1, 2 are formed in sequence in a manner as described above at one field time period, rewrite operation of data with respect to field n is first completed.

Subsequently, rewrite operation of data with respect to field n+1 is conducted. In this instance, in view of necessity of inverting drive for the purpose of preventing degradation of liquid crystal, subfield data is inverted to allow it to be negative in polarity. Thereafter, subfield data are written in a manner as described above to thereby sequentially form pictures as subfields 0, 1, 2.

Meanwhile, as understood from the explanation with reference to FIG. 46, rewrite operations of subfield data at respective subfield time periods are conducted in line-sequential manner. Accordingly, it is required that rewrite operation (output) of one subfield data is executed within the time of the least significant bit time width. Data transfer speed (rate) for transferring data to display device comprising display elements will be also determined in correspondence thereto.

As a practical example, the case where the frame frequency is equal to 120 Hz at gradation representation by 10 bits will be considered. In this case, as previously described, the least significant bit time width becomes equal to 8 μs by the formula (1). Further, under this condition, the display device comprising display elements is assumed to be in conformity with the standard of WXGA (Wide eXtended Graphics Array) having the number of pixels of 1280×768. In order to cope with such configuration, even if, e.g., data bus width is caused to be 32 bits, data transfer speed (rate) becomes equal to 3.8 GHz. For example, when data transfer speed (rate) is raised to such degree, realization of the display device would not become actual in the case where ability, etc. of the existing circuit, etc. is taken into consideration. Accordingly, also in the display drive based on the concept of subfield, it is required that the data transfer speed (rate) can be caused to be as low as possible.

Also in the display drive based on the concept of subfield as explained from now on, in the case where display element is liquid crystal, it is necessary to employ a.c. drive. Further, in the case of display drive by the general subfield system shown in FIG. 46, common potential to be applied to the common electrode formed in solid plane form on the entirety of display screen in a manner opposite to pixel electrodes of liquid crystal display elements is caused to be constant. Under such condition, positive/negative data are applied to pixel electrodes with this common potential being as reference to thereby realize a.c. drive.

In the case of such a.c. drive, when absolute value of liquid crystal drive maximum voltage level of each polarity is assumed to be Vmax, pixel switches which form respective pixels are required to have withstand voltage corresponding to voltage width of ±Vmax. For example, increase in withstand voltage of the pixel switch leads to enlargement of size of the pixel switch. Accordingly, the number of pixels per unit area becomes small. Thus, this results in obstacle to, e.g., hastening of high fineness and/or miniaturization of the liquid crystal display device.

SUMMARY OF THE INVENTION

An object of the present invention is to provide a novel display drive method and a novel display apparatus for displaying display elements which can solve problems that prior arts as described above have.

A display drive method according to the present invention is directed to a display drive method of outputting corresponding subfield data every plural subfields by pulse width modulation to thereby drive display elements, wherein there is executed a drive control procedure to drive display elements in such a manner that respective plural subfield data are simultaneously outputted also at any time point within a field time period.

A display apparatus according to the present invention is directed to a display apparatus adapted for driving a light modulation element to thereby perform image display, the display apparatus comprising drive means adapted for outputting corresponding subfield data every predetermined plural subfields by pulse width modulation to thereby drive the light modulation element, and adapted for driving the light modulation element in such a manner that respective subfield data are simultaneously outputted also at any time point within one field time period.

In the present invention, at any time point within one field period, display drive is conducted in such a manner that respective subfields data are simultaneously outputted. In the present invention, such display drive is performed, whereby the minimum time width with respect to the subfield is such that the number of rows is dominant. Thus, the data transfer speed (rate) does not depend upon time width of the subfield.

Still further objects of the present invention and practical merits obtained by the present invention will become more apparent from the description of the embodiments which will be given below with reference to the attached drawings.

BRIEF DESCRIPTION OF THE DRAWINGS

FIG. 8 is an explanatory view showing weighting of time every subfield in the system configuration of the first example of the present invention.

FIGS. 9 to 32 are explanatory views showing subfield pattern in the system configuration of the first example of the present invention.

FIG. 36 is an explanatory view showing weighting of time every subfield in the system configuration of the second example of the present invention.

FIGS. 37 to 44 are explanatory views showing subfield pattern in the system configuration of the second example of the present invention.

DETAILED DESCRIPTION OF THE PRESENTLY PREFERRED EMBODIMENTS

Figure 1:
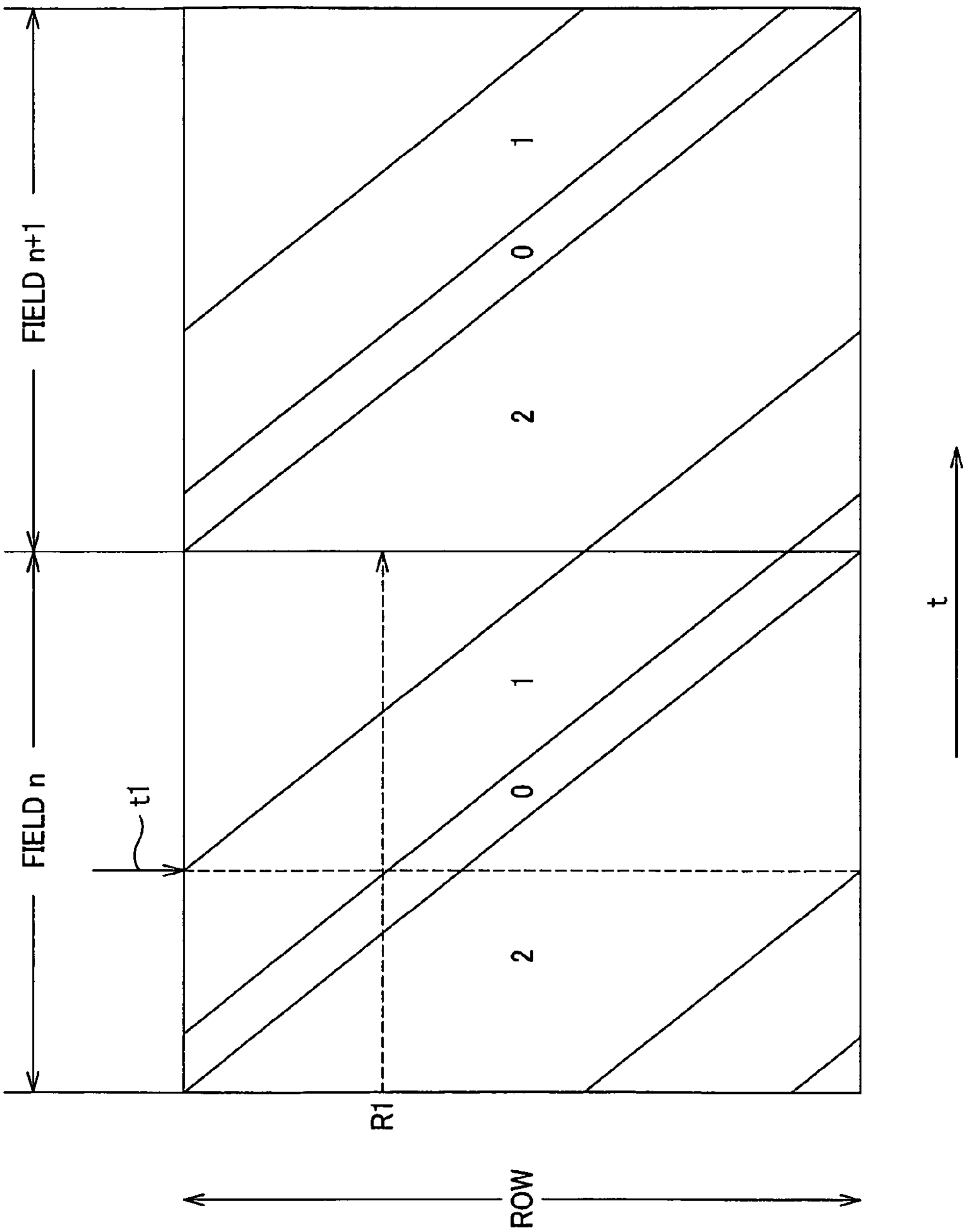
FIG. 1 is an explanatory view showing the concept of a display drive method according to the present invention.

A drive method for display element to which the present invention is applied will now be described. Explanation given below will be conducted by the following order.

1 Effective value response of liquid crystal
2 Concept of display drive of this embodiment
3 Configuration example of display apparatus
4 System configuration example (first example)
5 System configuration example (second example)

1 Effective Value Response of Liquid Crystal

In this embodiment, liquid crystal display element is used as a display element (light modulation element). In view of this, prior to explanation of this embodiment, the concept of the effective value response of liquid crystal will be described.

As one of the concepts when drive with respect to the liquid crystal is considered, there is so-called "effective value response". For example, in drive of non-memory type display (simple matrix drive) such as STN (Super-Twisted Nematic), etc., the concept of this effective value response is used.

Voltage applied to the liquid crystal is considered as an effective value. The effective value is root mean square of instantaneous value. Transmission factor change corresponding to this effective value is indicated by time average. In the case where response speed is sufficiently low with respect to drive frequency, the effective value-mean transmission factor characteristic at this time approximately coincides with voltage transmission factor characteristic of static drive. It is to be noted that response in the case where response speed is sufficiently low will be referred to as "effective value response" hereinafter. The effective value response is expressed as follows.

$$V_{rms} = \sqrt{\frac{1}{t_f}\int_0^{t_f}\{V(t)\}^2 dt} \tag{2}$$

$$T_{eff} = \frac{1}{t_f}\int_0^{t_f} T(t)dt \tag{3}$$

In the above-mentioned formulas (2), (3),

T(t) is transmission factor,

V(t) is applied voltage waveform, and $t_f$ is frame period.

Here, if the concept of the above-described effective value response can be applied to the PWM system, it is unnecessary that response speed of modulation element represented by, e.g., liquid crystal, etc. is the least significant bit time width or less. Namely, if effective value of input pulse to the modulation element and mean transmission factor corresponding thereto are determined, it becomes possible to perform modulation for gradation representation. This means that in the case where ordinary modulation element of high speed response is used as drive by the PWM system, the integral effect in point of time of the visual sense system of the human being is utilized with respect to light outputs of respective subfields, whereas in the case where modulation element of effective value response is used, if integral effect of input voltage to the modulation element is utilized, equivalent gradation representation can be made.

In the case where the concept of the effective value response is applied to the PWM system, there are cases where continuous gradation representation cannot be made depending upon arrangement of subfields (subfield pattern) with respect to the optical response of the actual liquid crystal. With respect to this point, the content as described below is described in the Specification and the Drawings of the Japanese Patent Application No. 2001-162776 which has been already filed by this applicant of the present invention.

For example, in the case where response speed of the modulation element is higher to a certain degree or more, continuous gradation representation cannot be maintained in the case where there exist two light outputs or more which can be considered to be independent within one field as bit output pattern (subfield pattern) by the PWM system. This is because according as response speed of the modulation element is higher, black level time period during which no light is outputted becomes conspicuous as response state of the modulation element itself in response to plural independent bit output time periods within one field.

From this fact, it can be said that the subfield pattern should be constituted in accordance with optical response speed of the liquid crystal. It is to be noted that subfield pattern shown in the system practical example of this embodiment which will be described later is also set in consideration of the optical response speed of the liquid crystal.

Similarly, as described in the Specification and the Drawings of the Japanese Patent Application No. 2001-162776, γ-characteristic obtained from optical output of the result of the effective value response varies in dependency upon whether the liquid crystal is normally white or normally black.

In the case where comparison is made on the premise that application to the PWM system is conducted with respect to normally white and normally black, it is sufficient that necessary number of bits (number of subfields) of the normally white is less. Accordingly, normally white is more excellent. In connection with gradation continuity, unless the least significant bit time width is caused to be short, the normally white cannot maintain gradation continuity. Accordingly, normally black is more excellent.

It is known that drive voltage level for driving the liquid crystal display element varies in dependency upon liquid crystal operating mode. The liquid crystal operating mode should be determined in consideration of data transfer speed, memory capacity and/or withstand voltage of pixel output buffer in constituting the system as the liquid crystal display.

2 Concept of Display Drive of This Embodiment

FIG. 1 conceptually shows a display drive method to which the present invention is applied.

In this figure, the longitudinal direction indicates scanning line direction, and the lateral direction indicates time passage. It is to be noted that, in this specification, since scanning lines form row (ROW) within display picture, they are also represented as merely "row". In this figure, the case where gradation representation is made by 3 bits is taken as an example. In this case, the number of subfields becomes equal to 3 to conduct rewrite operation of field picture by subfield data 0, 1, 2.

In accordance with FIG. 1, as rewrite state of subfield data by display drive of this embodiment, the matter as described below can first apply in connection with one row. For example, in the case where row R1 in the field n is viewed with lapse of time, subfield data are outputted in order of 2→0→1→2. In this case, although output time period of the subfield data 2 is halved, respective output time widths of halved SFD2 are totalized to thereby have output time width as the subfield 2. At the row R1, within one field time period, respective output time widths of subfield data 0, 1, 2 necessary for field rewrite operation are satisfied. This similarly applies to other rows of the field n, and also applies to other rows of the filed n+1.

Accordingly, also when any arbitrary row is viewed, respective output time widths of subfield data 0, 1, 2 necessarily required for field rewrite operation are satisfied every one field time period irrespective of difference between output patterns of subfield data 0, 1, 2. This means the matter as described below.

Figure 46:
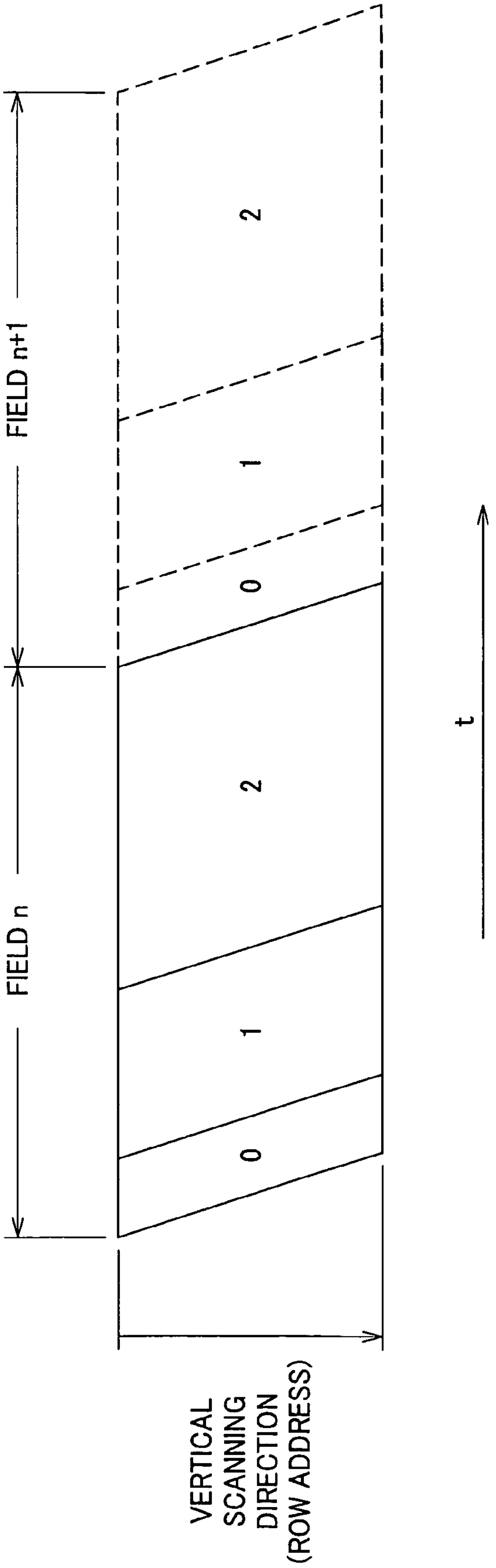
(PRIOR ART) FIG.46
FIG. 46 is an explanatory view showing display drive of the subfield system as the prior art by the relationship between row scanning and time passage.

Rewrite operations of all subfields are conducted in the state where time period of one field is required. This point is similar to the subfield system as the prior art shown in FIG. 46, for example. In the case where viewed every subfield, respective these subfields are rewritten in the state where time period of one field is required. On the contrary, in the conventional subfield system, also as shown in FIG. 46, rewrite operations of respective subfields are sequentially conducted every time width (subfield time period) corresponding to weighting of those subfields within one field time period.

In the case where output state of subfield data, e.g., at timing indicated as time point t1 is viewed with respect to the field n, row where subfield data 0 is being outputted, row where subfield data 1 is being outputted and row where subfield data 2 is being outputted necessarily exist. This similarly applies to other timings in the field n. This is similar also with respect to the succeeding field n+1. Namely, at any time point within one field time period, there are obtained the states where respective subfield data (bits) corresponding to plural subfields for field rewrite operation are necessarily outputted at the same time.

The fields n, n+1 shown in FIG. 1 are fields successive in point of time. In this case, because of a.c. drive, at the field n and the field n+1, subfield data have polarity inverted with each other. Here, it is assumed that drive by data which is positive in polarity is conducted in the field n, and drive by data which is negative in polarity is conducted in the field n+1.

The fact that drive of display pixels is conducted in such a manner that subfield data is outputted every subfield time period by the above-mentioned mode means that rewrite operations of respective subfield data are conducted in the state where time as one field time period is required. On the contrary, in the conventional subfield system, also as shown in FIG. 46, rewrite operation of one subfield data is executed by using time corresponding to output time width of subfield to which the subfield also corresponds within one field time period.

It is to be noted that, in this specification, in the case where reference is made to "one field time period", when rewrite operation corresponding to one picture (one field image) is completed by all subfield data of any of positive and negative data, that time is the time required for transferring all subfield data of any one of positive and negative data. As explained in FIG. 1, e.g., output of subfield data of this embodiment is placed in the state where all subfield data (bits) necessary for field rewrite operation are simultaneously outputted at any time point within field time period. The concept of a scanning example with respect to row in order that output state of such subfield data can be obtained will be explained with reference to FIG. 2.

Figure 2:
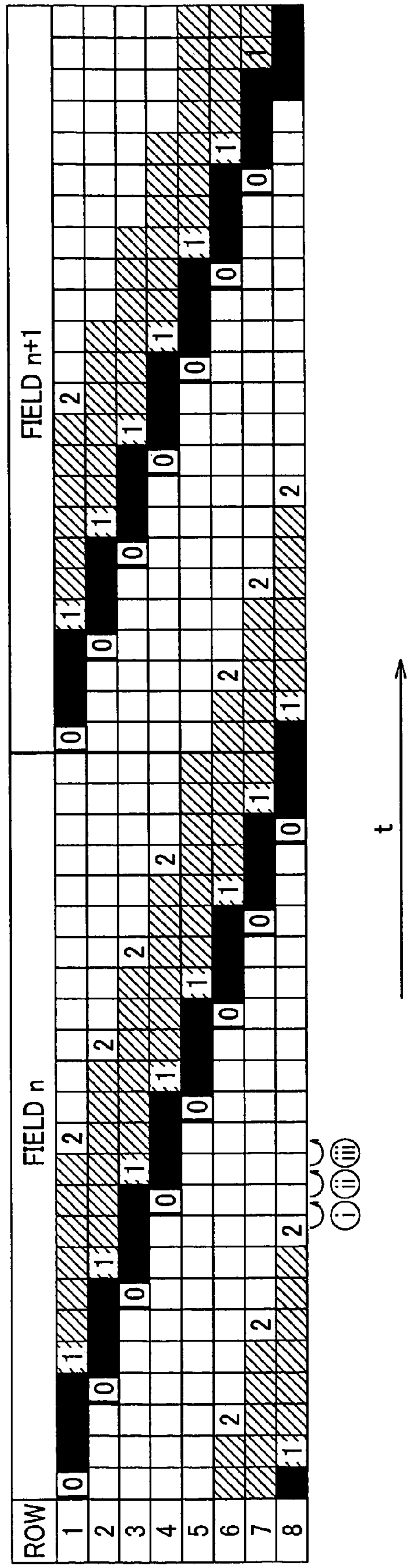
FIG. 2 is an explanatory view conceptually showing row scanning in the display drive method according to the present invention.

Output state of subfield data corresponding to time passage which corresponds to row scanning of this embodiment is shown in FIG. 2. Here, for the brevity of explanation, the number of rows which form liquid crystal display device is caused to be eight. On the premise that the number of subfields is three, rewrite operation of field is assumed to be conducted by subfield data 0, 1, 2. Also in FIG. 2, fields n, n+1 successive in point of time are shown, wherein the longitudinal direction indicates row number and the lateral direction indicates time passage.

When the time period of the field n is assumed to be started, row 1 is scanned at the first scanning time period to write subfield data 0. At the subsequent scanning time period, row 8 is scanned to write subfield data 1. Further, at the subsequent time period, row 6 is scanned to write subfield data 2. At times subsequent thereto, in a manner as shown, required rows are scanned every scanning time period to sequentially write subfield data 0, 1. 2.

Such scanning of row is the so-called interlace scanning, and it can be said that such scanning is not line-sequential scanning which performs sequential scanning in accordance with row number over, e.g., rows 1 to 8. The interlace scanning in this embodiment has the following rule.

This rule will be explained by taking, as an example, the interlace state of the number of scanning lines at respective timings of i→ii→iii in FIG. 2.

At the timing of i, since subfield data 2 is written at row 8 thereafter to write subfield data 0 at row 4, the number of interlace scanning lines at this time is "4". At the timing ii subsequent thereto, since subfield data 0 is written at row 4 thereafter to write subfield data 1 at row 3, the number of interlace scanning lines is "1". Further, at the timing of iii, since subfield data 1 is written at row 3 thereafter to write subfield data 2 at row 1, the number of interlace scanning lines is "2".

Such interlace scanning patterns are repeated by necessary number of times within field.

In the display drive shown in FIG. 2, when subfield data is written with respect to one row so that output of the subfield data is started, output of this subfield data is continued until that row is selected at the next time so that subfield data different from that until now is written. For example, in the case of row 1, subfield data 0 is first written. In this instance, output of this subfield data 0 is continued over scanning time period of rows corresponding to four lines until subfield data 1 is newly written. Such continuation operation of data output can be realized by employing, e.g., the configuration in which memories are provided at respective pixels. Such pixel configuration will be described later.

As the result of the fact that subfield data is outputted while performing interlace scanning in a manner as described above, output state of subfield data as shown in FIG. 2 is obtained in the relationship between row and time passage. Namely, output of subfield data in conformity with the concept shown in FIG. 1 is performed.

It is to be noted that there are instances where field data to be written into fields n, n+1 are the same or are different in accordance with the system configuration.

Weighting states of times of subfields 0, 1, 2 caused to correspond to subfield data 0, 1, 2 in this case are respectively as follows.

$$1+1/3$$

$$2+1/3$$

$$3+1/3$$

As described above, the number of interlace rows corresponding to subfields 1, 2, 3 are respectively caused to be [1], [2] and [4]. Thus, in this embodiment, ratio of weighting of output times of subfield data 0, 1, 2 at respective lines corresponds to ratio of the number of interlace rows.

From this fact, when the number of rows is assumed to be n, the number of subfields (the number of bits) caused to correspond to subfield data is assumed to be m, and time length of one field time period is assumed to be tf, the minimum time width Tmin which can be realized is expressed as follows.

$$T\min = tf\times(1+1/m)n \tag{4}$$

In accordance with the above-mentioned formula (4), the minimum time width is such that the number of rows is dominant. Thus, it is concluded that the data transfer speed (rate) is not related to time width of subfield. Weighting of subfield is determined in dependency upon only the number of interlace rows.

In the case where liquid crystal is employed as display element, it is the premise that a.c. drive is conducted. For this reason, also in this embodiment, as explained in FIG. 1, drive is conducted in a manner to apply subfield data having polarities opposite to each other, e.g., at the field n and the field n+1 subsequent thereto to pixel electrodes. Namely, the so-called bit inverting drive is conducted. In combination therewith, in this embodiment, the so-called common inverting drive such that common potential to be applied to the common electrode is also inverted is also combined.

Figures 3A, 3B, 3C:
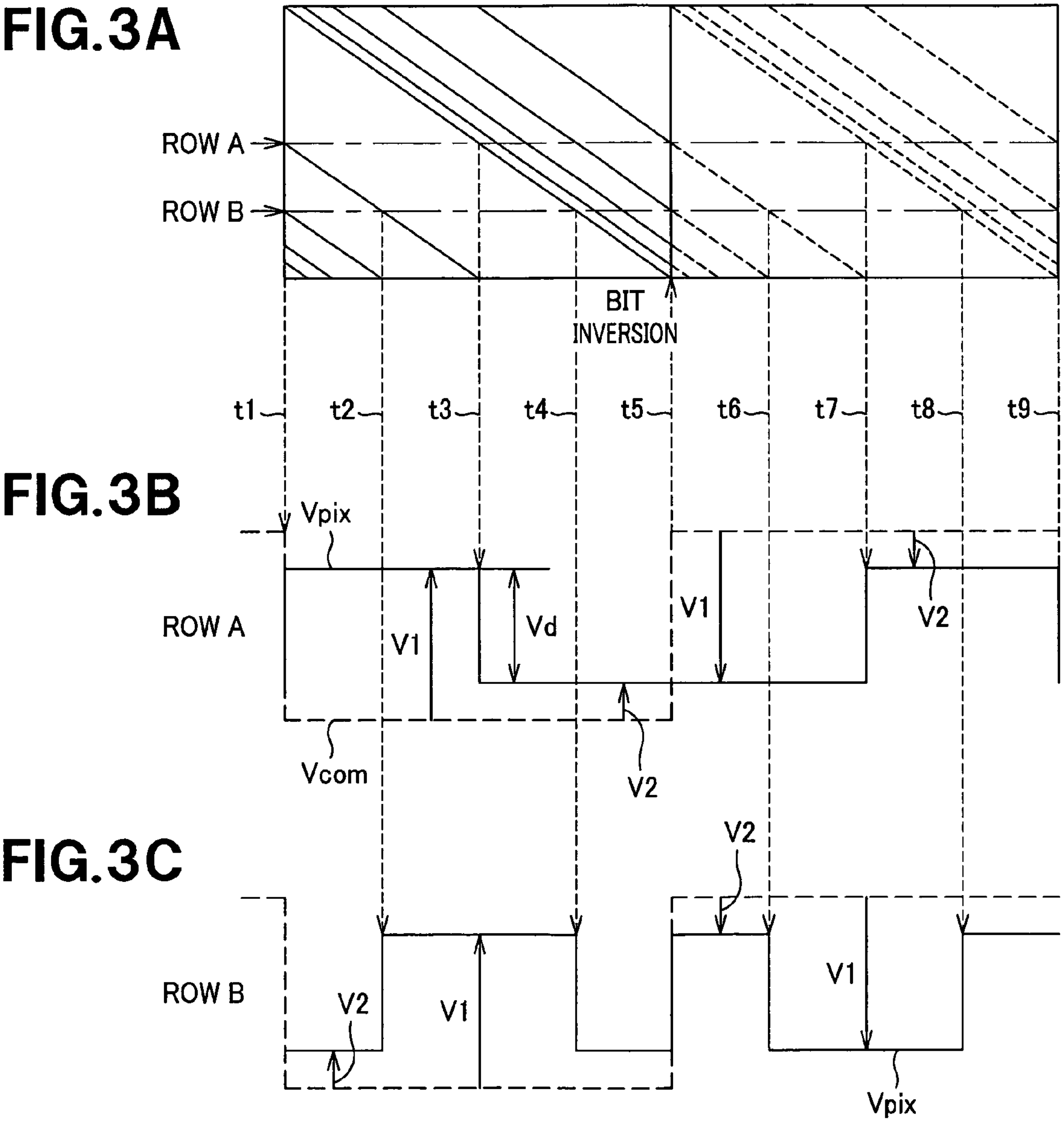
FIGS. 3A to 3C are explanatory views showing timings of a.c. drive.

FIGS. 3A to 3C show timings of such bit inverting drive and common inverting drive as this embodiment.

Output state of subfield data with respect to the fields n, n+1 corresponding to time passage is shown in FIG. 3A. Level changes with lapse of time of pixel potential $V_{pix}$ and common potential $V_{com}$ at row A and row B shown in the FIG. 3A are respectively shown in FIGS. 3B and 3C. In these figures, pixel potential $V_{pix}$ is indicated by solid lines and common potential $V_{com}$ is indicated by broken lines.

The pixel potential $V_{pix}$ is a potential obtained by subfield data applied to the pixel electrode. Here, for easiness of explanation, only output waveform of the Most Significant Bit (MSB) is shown. In addition, the common potential $V_{com}$ is a potential applied to the common electrode.

As understood from the waveform of the common potential $V_{com}$ shown in FIGS. 3B and 3C, inverting operation is made in such a manner that the common potential $V_{com}$ takes negative level at the time period t1 to t5 corresponding to the field n, and takes positive level at the time period t5 to t9 corresponding to the field n+1. The common potential should be applied commonly to all pixels.

With respect to the pixel potential $V_{pix}$ of the row A shown in FIG. 3B, at the time period of the field n, data which is positive in polarity is first outputted as subfield data. For this reason, at the time period of the field n, data of H level is outputted at the time period t1 to t3 which is the output time period of subfield data of the most significant bit. By potential difference V1 between the common potential $V_{com}$ and the pixel potential $V_{pix}$ at this time, the liquid crystal layer is driven. The time period t3 to t5 subsequent thereto is the time period in which output of subfield data of the most significant bit is stopped and subfield data having low order bit with respect to the most significant bit is instead outputted. At this time period t3 to t5, data of L level is outputted. Additionally, potential difference between the common potential $V_{com}$ and the pixel potential $V_{pix}$ at this time becomes equal to V2.

When the time period of the field n+1 is started after the time period t5 is passed, output of subfield data of the most significant bit is provided for a second time during the time period t5 to t7. At the timing corresponding to this time point t5, bit inversion for inverting subfield data is conducted.

In this case, as subfield data of the most significant bit to be outputted from the time point t5, as the result of bit inversion, output having the same L level as that at times before the time point t5 is continued. Namely, at this time, output of subfield data by the negative level is not performed. This is because common potential $V_{com}$ is inverted into positive potential at the time period (t5 to t9) of the field n+1 so that potential difference V1 can be obtained in the state of L level. At the time period t7 to t9 where output of subfield data of the most significant bit is stopped, which is subsequent thereto, data of H level is outputted.

Output timings of subfield data at row B shown in FIG. 3C are as follows.

Namely, with respect to the row B, since subfield data of the most significant bit is outputted at time period t2 to t4 within the field n, pixel potential $V_{pix}$ is caused to have H level over the time period t2 to t4 to thereby obtain potential difference V1 with respect to the common potential $V_{com}$. Further, at the time periods t1 to t2 and t4 to t5 except for this time period within the field n, data of L level is outputted.

At the subsequent time period t5 to t9 as the field n+1, waveform of the pixel potential $V_{pix}$ which has been outputted at the time period t1 to t5 of the field n is inverted to output inverted waveform. Thus, data of L level is outputted at time period t6 to t8 where subfield data of the most significant bit is outputted within the field n+1 to thereby obtain potential difference V1 with respect to the common potential $V_{com}$. At respective time periods t5 to t6, t8 to t9 where respective subfield data having low order bit with respect to the most significant bit should be outputted, data of H level is outputted so that output of subfield data of the most significant bit is stopped.

Namely, also at any one of rows A and B, within the field n where positive data should be outputted, common potential $V_{com}$ is caused to be at L level thereafter to output data of H level at the subfield data output time period, and to output data of L level at the output stop time period except for that time period. In addition, within the field n+1 where negative data should be outputted, the common potential is inverted into H level thereafter to output data of L level at the subfield data output time period, and to output data of H level at the output stop time period except for that time period.

In a manner as stated above, in this embodiment, common inversion which inverts common potential $V_{com}$ and bit inversion which inverts subfield data as pixel potential $V_{pix}$ are combined. Thus, it becomes unnecessary to conduct inverting drive by positive/negative amplitude with common potential $V_{com}$ of a certain predetermined value being as center as pixel potential $V_{pix}$. As a result, drive voltage of pixel electrode is expressed as Vmax-Vth, thus making it possible to reduce drive voltage to much degree. Following this, it becomes possible to lower, e.g., withstand voltage of pixel switch. In this case, Vmax is liquid crystal drive maximum voltage and Vth is threshold voltage of electro-optical characteristic.

It is to be noted that, in the explanation by FIGS. 3A to 3C, bit inversion is simultaneously conducted over the entirety of picture. Namely, bit inversion is conducted every field time period. In practice, at the time of bit inversion, there is the possibility that large current may flow in the element by cause such as parasitic capacitance, etc. Thus, there is the possibility element may be broken. In such case, there is employed an approach to divide picture to shift timing of bit inversion by sufficiently short time as compared to the field time period thus to have ability to solve the above-mentioned problem.

3 Configuration Example of Display Apparatus

Subsequently, explanation will be given with reference to FIG. 4 in connection with the configuration example of the display apparatus for the purpose of realizing display drive as this embodiment which has been explained with reference to FIG. 1 to FIG. 3.

As shown in this figure, the display apparatus of this embodiment comprises a formatter unit 1, a display panel 2 and a $V_{com}$ controller 3. The formatter unit 1 is composed of a subfield data generating logic section 11, a first field buffer 12, a second field buffer 13, and an input/output controller 14.

At the formatter unit 1, data by a predetermined gradation is inputted to the subfield data generating logic unit 11 as input data. This input data is γ-corrected as occasion demands. As this input data, e.g., data having the number of bits necessary for gradation representation are inputted in parallel. Accordingly, bus width for input data to the subfield data generating logic unit 11 should be suitably changed in accordance with the number of bits for this gradation representation.

The subfield data generating logic unit 11 comprises a logic circuit, and serves to generate subfield data from input data. The generated subfield data is alternately written into any one of first and second field buffers 12, 13 at a predetermined timing corresponding to the field time period by unit as field data corresponding to, e.g., one field in accordance with control of the input/output controller 14.

Meanwhile, some logic circuit within the subfield data generating logic unit 11 outputs subfield data by serial data. However, at this subfield data generating logic unit 11, subfield data as serial data is converted into parallel data corresponding to bus widths of the first and second field buffers 12, 13 by serial/parallel conversion section provided therewithin to output the parallel data. In this case, conversion into bus width of 16 bits is conducted.

The first field buffer 12 and the second field buffer 13 are respectively provided as memory areas for holding subfield data (field data) corresponding to one field. These first and second field buffers 12, 13 specifically use, e.g., widely used SDRAM having capacity of 16 Mb and bus width of 16 bits to form 2 banks as described above. Field data is alternately written into the first and second field buffers 12, 13 at 16 bit width by control of the input/output controller 14 as described above. In addition, write operations into respective field buffers are conducted by unit every one horizontal line (1H). The data of 1H becomes, e.g., data having burst length of 8(128b)×10.

Read-out operation of field data is conducted from field buffer where data write operation is not conducted among the first and second field buffers 12, 13. Read-out operation from this field buffer is also conducted on the 1 H basis by parallel data having 32 bit width in accordance with control of the input/output controller 14. Accordingly, read-out operation of data is executed in such a manner that transfer of field data corresponding to 1H is completed every line scanning time period. The field data which have been read out in this way are sequentially outputted to the display panel 2.

In a manner as shown, a horizontal synchronizing signal Hsync, a vertical synchronizing signal Vsync and a clock CLK are inputted to the input/out controller 14. In accordance with the timing generated within the inside on the basis of the synchronizing signals and the clock, write/read operations of data with respect to the above-described first and second field buffers 12, 13 are controlled. In a manner similar to the above, row address and polarity switching signal SP are outputted at a required timing in accordance with timing generated therewithin to deliver them to the display panel 2.

The timing pulse corresponding to, e.g., field timing which has been generated at the input/output controller 14 is inputted to the $V_{com}$ controller 3. The $V_{com}$ controller 3 outputs, to the display panel 2, common potential $V_{com}$ inverted at the timing every field time period, as shown in FIGS, 3B and 3C, for example, in accordance with the inputted timing pulse. It is to be noted that since timing pulse to be outputted to this $V_{com}$ controller 3 has the same timing as, e.g., polarity switching signal Sp which will be described later, this polarity switching signal Sp may be employed.

It is to be noted that the so-called double speed conversion may be conducted in dependency upon how to read out data with respect to the first and second field buffers 12, 13 as this embodiment. Specifically, in the case where, e.g., frame frequency of display is 120 Hz, whereas input image signal is 60 Hz, data of the same bank are continuously read out twice. Such twice continuous read-out operation is performed every alternate bank. In the case where field frequency of the input image signal is the same as field frequency of display, it is sufficient to read out data every time alternately from two bank data.

The display panel 2 comprises liquid crystal as display element (light modulation element), and has the configuration which performs image display based on the so-called active matrix system as the fundamental configuration. Under such configuration, there are employed interlace scanning with respect to row and hardware configuration for permitting that a required subfield time period is held at individual rows.

Figure 5:
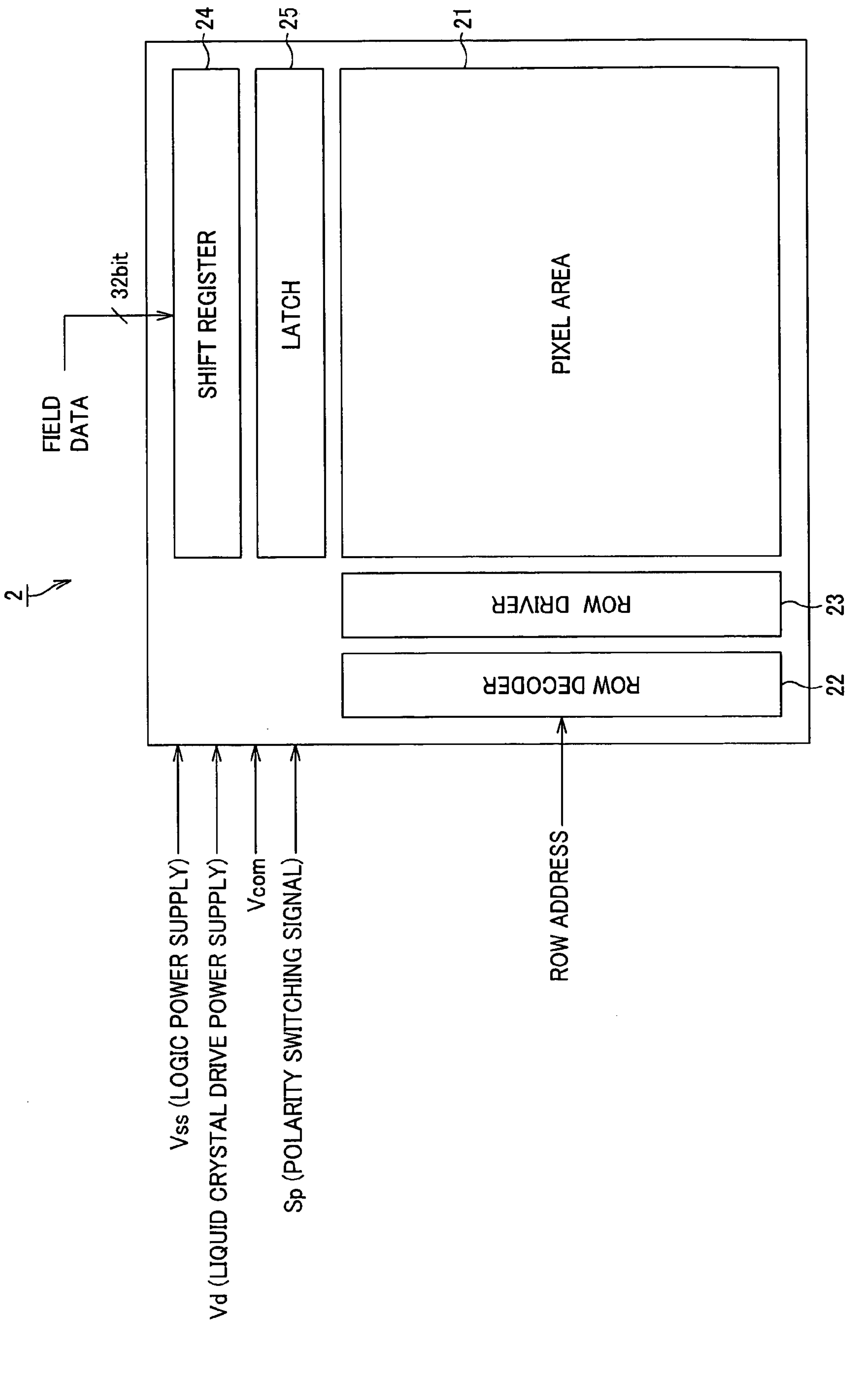
FIG. 5 is a block diagram showing a configuration example of display panel to which the present invention is applied.

FIG. 5 schematically shows a configuration example of the display panel 2 as this embodiment. As shown in this figure, the display panel 2 comprises a pixel area 21, a row decoder 22, a row driver 23, a shift register 24 and a latch circuit 25.

In the display panel 2, the pixel area 21 corresponds to the active matrix system, and is formed in such a manner that pixels are arranged in matrix form with respect to, e.g., semiconductor substrate. Namely, plural scanning lines are arranged along the horizontal (row) direction, and plural data lines are arranged along the vertical (column) direction. With respect to the position corresponding to crossing points of the scanning lines and the data lines, pixels (pixel cells) are formed. As the structure of pixels (pixel cell drive circuit) as this embodiment, in order that a required subfield time period is held at individual rows, memory function of 1 bit is provided. This point will be described later.

Such pixels are formed on Si (silicon) substrate to form thereon pixel electrode of the reflection type connected to output buffer 33 and orientation layer which will be described later. By the orientation layer and the common electrode (transparent electrode), transparent substrate is formed. The Si substrate and the transparent substrate are disposed in a manner opposite to each other in the state where liquid crystal layer is caused to intervene therebetween so that the entire structure as the pixel area 21 is obtained.

At the display panel 2, for the purpose of drive of horizontal line (row), there are provided the row decoder 22 and the row driver 23.

First, row addresses outputted from the input/output controller 14 are sequentially inputted to the row decoder 22 correspondingly every required line scanning time period. The row address is address of row to be scanned by interlace scanning shown in FIG. 2.

The row decoder 22 performs decode operation with respect to inputted row address to deliver that decode data to the row driver 23. The row driver 23 applies drive voltage to row to be scanned in accordance with the delivered decode data. This operation is repeated every time row address is inputted. Thus, row that row address designates is scanned so that interlace scanning as explained in FIG. 2, for example, is realized.

Scanning operation every horizontal line is conducted by the shift register 24 and the latch circuit 25.

Field data which are read out by unit of 1H from the first and second field buffers 12, 13 are inputted to the shift register 24 by 32 bit width. The shift register 24 inputs field data inputted in this way to the latch circuit 25 in such a manner to sequentially shift them. The latch circuit 25 latches inputted field data to output the latched field data to corresponding data line. In this case, data outputted every data line results in, i.e., subfield data.

For example, in a manner as illustrated, logic power supply Vss, liquid crystal drive power supply Vd, common potential $V_{com}$ and polarity switching signal Sp are inputted to this display panel 2 in addition to the row address and the field data.

The logic power supply Vss is delivered, as an operating power supply, to logic circuit units, e.g., row decoder 22, row driver 23, shift register 24 and latch circuit 25, etc. The liquid crystal drive power supply Vd is delivered to output buffer 33 of pixels (pixel cell drive circuit) by the structure which will be described later as a power supply for drive to thereby set level of subfield data outputted every pixel.

The polarity switching signal Sp is also outputted to a polarity selector 32 of pixels (pixel cell drive circuit) in a manner as described later to thereby perform inversion by positive/negative data every, e.g., field time period with respect to subfield data outputted every respective pixels.

The common potential $V_{com}$ is outputted from the $V_{com}$ controller 3 in such a manner that H/L level is switched every, e.g., field time period in a manner previously described, and is applied to the common electrode. Thus, common potential $V_{com}$ of actual common electrode is inverted between L level and H level every field time period as shown in FIGS. 3B and 3C, for example.

As the configuration of pixel (pixel cell drive circuit) unit in this embodiment, there is employed a configuration such that required subfield time periods are held at individual rows under the state where interlace scanning is conducted also in a manner previously described.

As the configuration therefor, two examples of the first example and the second example are mentioned here.

Figure 6:
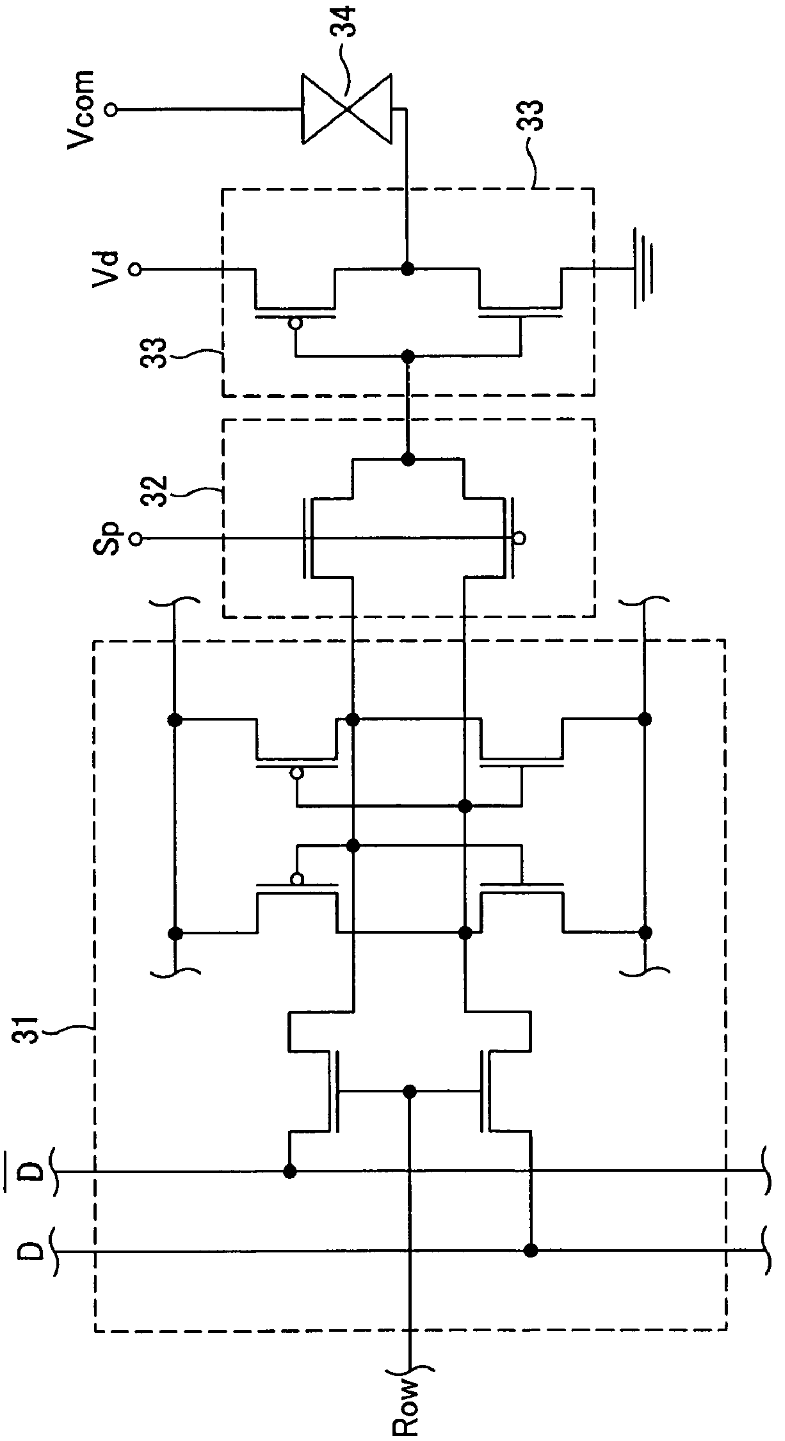
FIG. 6 is a circuit diagram showing a structure example of pixel of a first example of the present invention.

FIG. 6 shows an example of the configuration of pixels (pixel cell drive circuit) as the first example.

As shown in this figure, the pixel as the first example comprises SRAM type memory cell 31, polarity selector 32, output buffer 33, and liquid crystal layer 34. It is to be noted that, although not shown here, the liquid crystal layer 34 is disposed in such a manner that it is put between pixel electrode connected to the output buffer 33 and common electrode to which common potential $V_{com}$ is applied.

A pair of two data of positive data and negative data obtained by inverting this data are inputted to the SRAM type memory cell 31 at the same timing as subfield data in a manner as shown. In order to simultaneously input positive data and negative data in a manner as stated above, two data lines are drawn out every one pixel from the latch circuit 25 to dispose them. For example, at the latch circuit 25, data obtained by inverting inputted data is generated by making use of the inputted data to output these data different in polarity to respective two data lines as positive data and negative data.

The SRAM type memory cell 31 simultaneously holds, at the timing where, e.g., row drive signal (ROW) outputted from the row driver 23 is applied, positive data and negative data which have been applied to the data lines. These data are continuously held until new subfield data is applied to the data line by subsequent scanning of row so that rewrite operation is conducted.

Output of the SRAM type memory cell 31 is inputted to the polarity selector 32. The polarity selector 32 outputs, to the output buffer 33, any one of positive data and negative data in accordance with pulse timing as the polarity switching signal Sp.

The output buffer 33 is a portion constituted as, e.g., inverter, and is connected to pixel electrode (not shown) here. Voltage of level corresponding to positive or negative data outputted from the polarity selector 32 is applied to the pixel electrode. In this instance, since the output buffer 33 is adapted so that liquid crystal drive power supply Vd is inputted as operating power supply, the positive data and the negative data are outputted in the state where level setting is made so that potential difference corresponding to this liquid crystal drive power supply Vd can be obtained in a manner as shown in FIG. 3B, for example. Thus, pixel cell as liquid crystal layer 34 is driven.

In this way, there is employed the configuration comprising memory cell as SRAM and serving to conduct polarity switching to permit continuation of output of subfield data in such a manner that subfield time periods corresponding to respective subfield data are held at individual rows in a manner as shown in FIG. 2. Bit inversion of subfield data shown in FIG. 3 is performed.

Since the memory cell is of SRAM structure, such configuration has the advantage that respective positive/negative data can be stably held.

Figure 7:
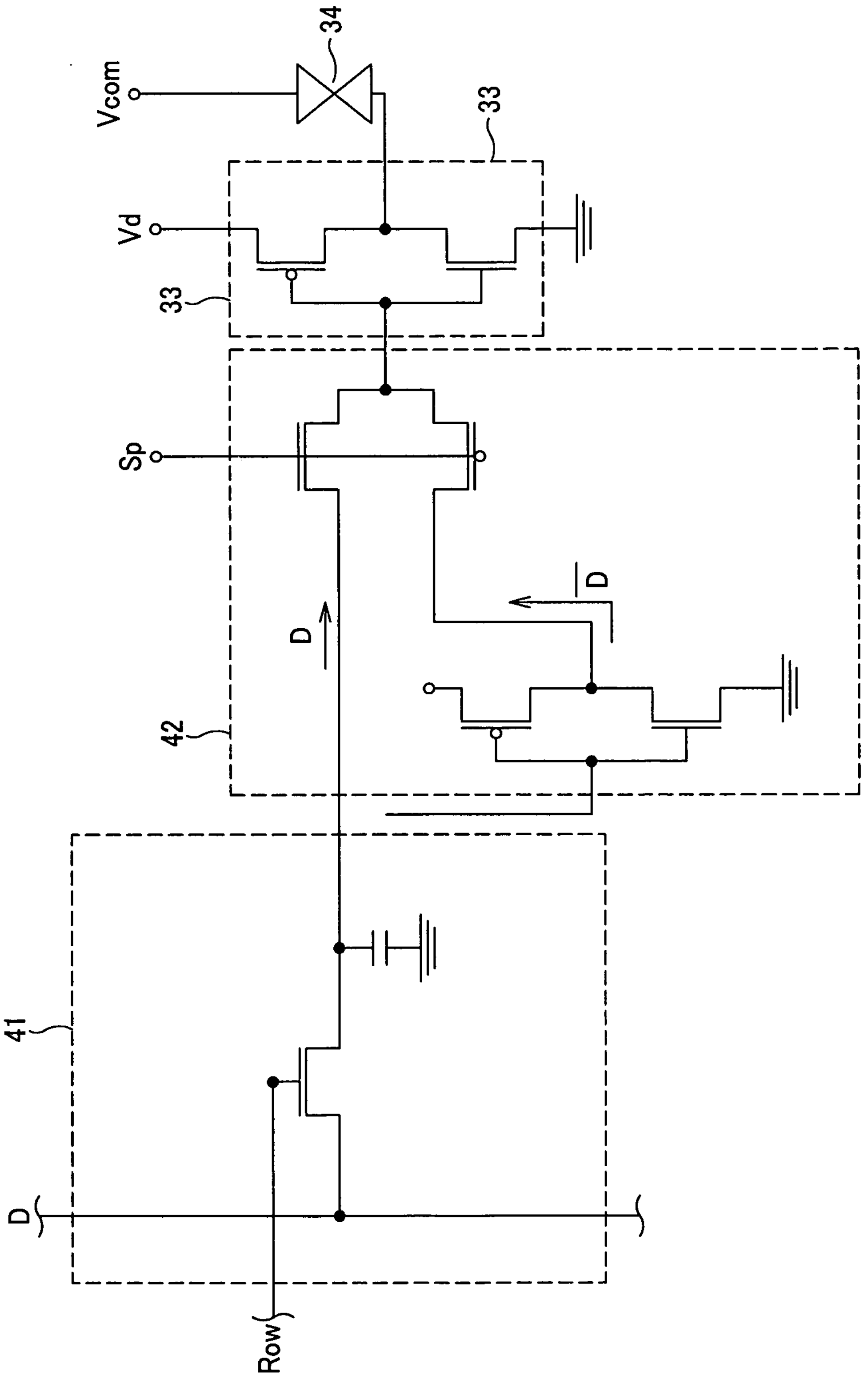
FIG. 7 is a circuit diagram showing a structure example of pixel of a second example of the present invention.

Subsequently, an example of the configuration with respect to pixel (pixel cell drive circuit) as the second example is shown in FIG. 7. It is to be noted that the same reference numerals are respectively attached to the same portions of FIG. 6 and explanation thereof will be omitted.

The pixel configuration as the second example comprises a DRAM type memory cell 41 and a polarity selector 42 in place of the SRAM type memory cell 31 and the polarity selector 32 which have been shown in FIG. 6.

The DRAM type memory cell 41 employs, e.g., the configuration that electrostatic capacitor is connected to one MOS type transistor. Only positive data is inputted to this DRAM type memory cell 41. At the timing where row drive signal (ROW) outputted from the row driver 23 is applied, positive data applied to the data line is held. Also in this case, data are continuously held until new subfield data is applied to the data line by the subsequent scanning of row so that rewrite operation is conducted.

The polarity selector 42 in this case employs a circuit configuration as shown to be thereby of the configuration in which, e.g., switching between an operation to output, as it is, positive data written and held in the DRAM type memory cell 41 and an operation to output inverted data as negative data can be performed in accordance with change of H/L level of pulse as polarity switching signal Sp.

In a manner as described above, data outputted from the polarity selector 42 is applied to pixel electrode of the liquid crystal layer 34 side through the output buffer 33, whereby pixel cell as the liquid crystal layer 34 is driven.

Even in the case of such configuration, it becomes possible to continue output of subfield data in such a manner that subfield time periods corresponding to respective subfield data are held at individual rows. Bit inverting function of the subfield data is also provided. Namely, the same operation as that of the pixel cell drive circuit shown in FIG. 6 can be obtained. In the case where comparison between the configuration shown in FIG. 7 and the configuration shown in FIG. 6 is made, the merit that the number of data lines can be reduced to much degree can be obtained.

4 System Cofiguration Example (First Example)

Subsequently, explanation will be given by taking the first example and the second example in connection with practical configuration example of display system which is based on the drive concept as the above-described embodiment. It is to be noted that it is the premise that the configuration which has been explained with reference to FIGS. 4 to 7 is employed in connection with the fundamental hardware configuration in the system which will be explained below.

In the system as the first example, display panel having resolution as WXGA (1280×768) is employed with respect to the display panel 2. The field frequency is assumed to be 120 Hz and the number of subfields is assumed to be 12. In this case, time of 1H becomes equal to 1/120/768/12=904 ns.

As the drive condition of this display panel 2, normally black perpendicular orientation mode is employed, and n-type nematic liquid crystal of Δn 0.15, Δε6 and rotation viscosity 300 m Pa*sec is further used. Pretilt angle is set to 2° and cell thickness was set to 1.4 μm.

Pixel electrode potential ($V_{pix}$) is set so that Hi=1.8 V and Lo=0V and common potential ($V_{com}$) is positive/negative to perform switching by 3.4 V/−1.6 V. Thus, voltage between liquid crystal layers is ±1.6 V in terms of black level, and is ±3.4 V in terms of white level.

Since the number of subfields is 12, weighting quantities in point of time every respective subfields in this case are as shown in FIG. 8. Namely, subfield 0=1+1/12 subfield 1=2+1/12 subfield 2=4+1/12 subfield 3=8+1/12 subfield 4=16+1/12 subfield 5=32+1/12 subfield 6=64+1/12 subfield 7=128+1/12 subfield 8=128+1/12 subfield 9=128+1/12 subfield 10=128+1/12 subfield 11=128+1/12

Here, the fact that weighting in point of time shown in FIG. 8 is obtained indicates that the rule described below is given as the number of interlace rows.

subfield 0→1: (1)
subfield 1→2: (2)
subfield 2→3: (4)
subfield 3→4: (8)
subfield 4→5: (16)
subfield 5→6: (32)
subfield 6→7: (64)
subfield 7→8: (128)
subfield 9→10: (128)
subfield 10→11: (128)
subfield 11→0: (128)

Output patterns of the subfield data as the first example are shown in FIGS. 9 to 32. In these figures, gradation is indicated in the longitudinal direction and time widths of respective subfield data are indicated in the lateral direction.

In the case where interlace scanning is conducted in accordance with the above-described number of interlace rows with respect to such subfield data, the minimum time width Tmin is expressed as follows by the previously indicated formula (4).

$$T\text{min}=1/120\times(1+1/12)/768s$$

As the system configuration of the first example, subfield patterns shown in FIGS. 9 to 32 are assumed to be prepared,. e.g., in a manner as described below.

In the first example, γ-correction is conducted by 10 bits to prepare data of 768 gradations. Low order 7 bits in the γ-corrected 10 bits are assigned to subfields 0 to 6. With respect to the remaining high order 5 bits, subfield data in which equal weighting by 128 has been conducted from high order bit are prepared by logic circuit to respectively assign those data to subfield data 7 to 11.

Figure 4:
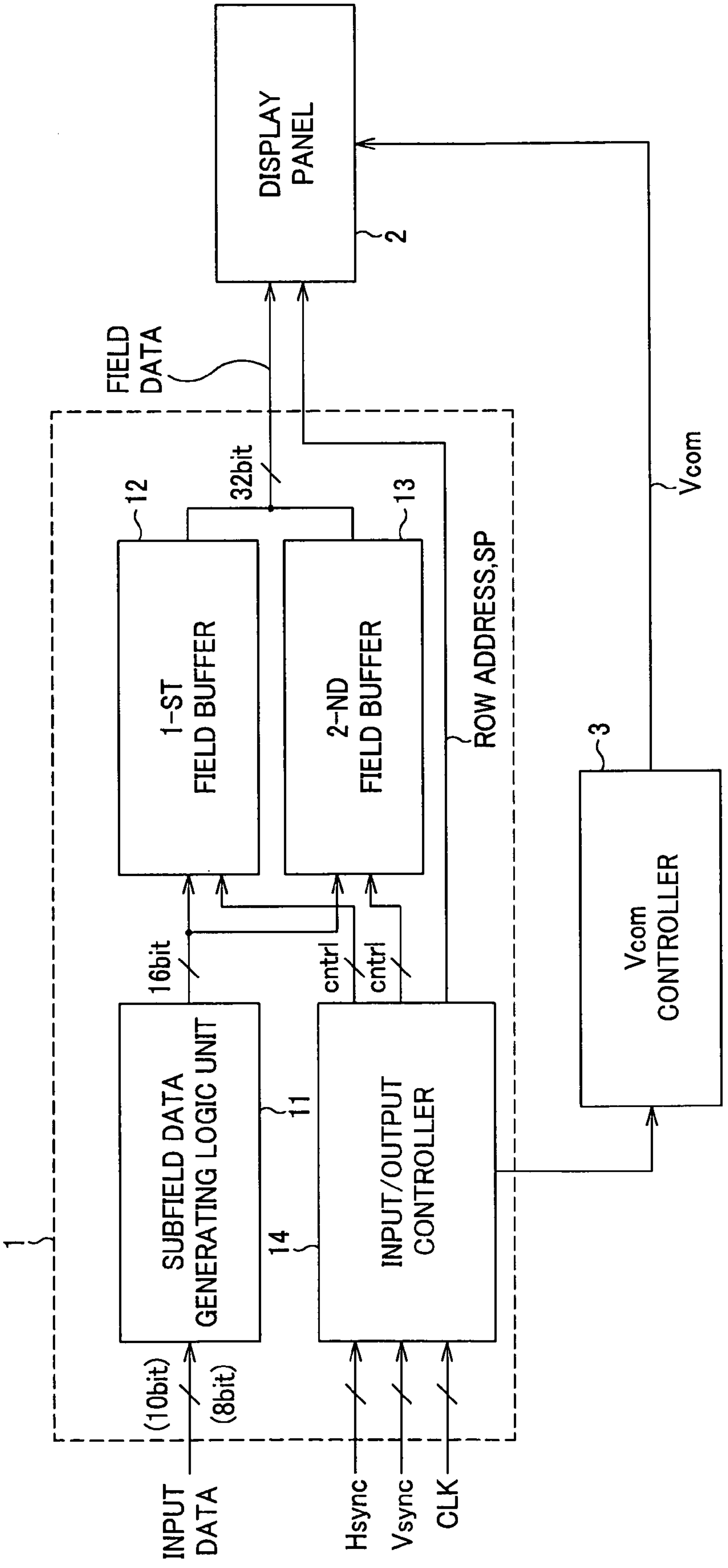
FIG. 4 is a block diagram showing a configuration example of a display apparatus according to the present invention.

The previously mentioned subfield data generating logic unit 11 shown in FIG. 4 is assumed to execute preparation of the above-described subfield patterns. Accordingly, input pulse width of the subfield data generating logic unit 11 becomes equal to 10 bits in correspondence with the system configuration of the first example, and γ-corrected data by 10 bits are inputted in parallel to the subfield data generating logic unit 11.

Meanwhile, because of employment of the previously mentioned weighting of the time shown in FIG. 8, shift of 1/12 takes place in weight with respect to respective subfields. For this reason, when considered rigorously, output time width with respect to input signal deviates from linearity. However, in the case where viewed on the whole, this shift quantity is small to negligible degree. For this reason, there is no possibility that such shift quantity may obstruct gradation reproducibility in practice.

Figure 33:
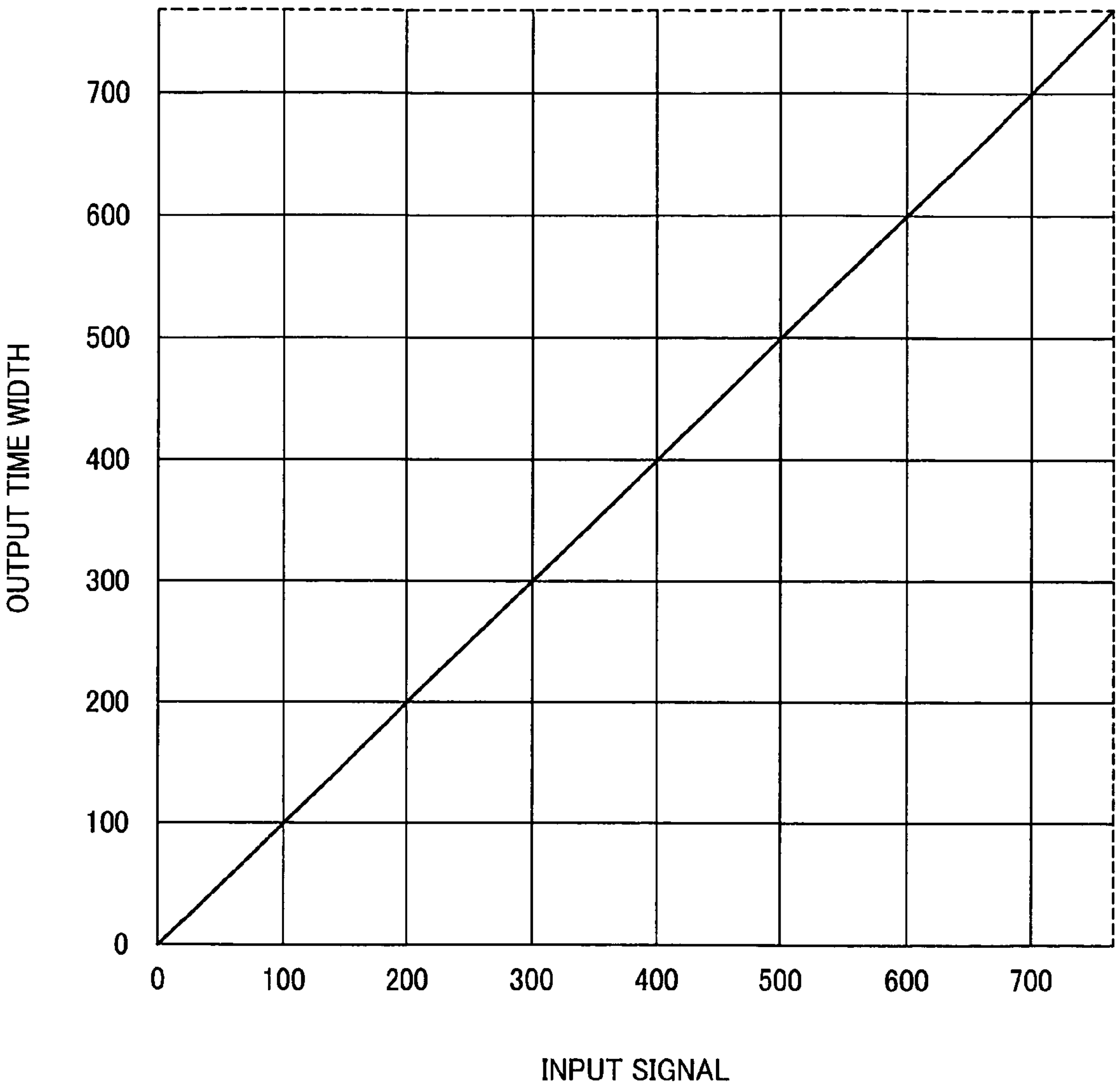
FIG. 33 is a view showing the relationship between input signal and time width in the system configuration of the first example of the present invention.

FIG. 33 shows the relationship of output time width with respect to input signal (gradation) as the characteristic of the system of the first example. Also as seen from this figure, the output time width with respect to input signal (gradation) is nearly linear.

Figure 34:
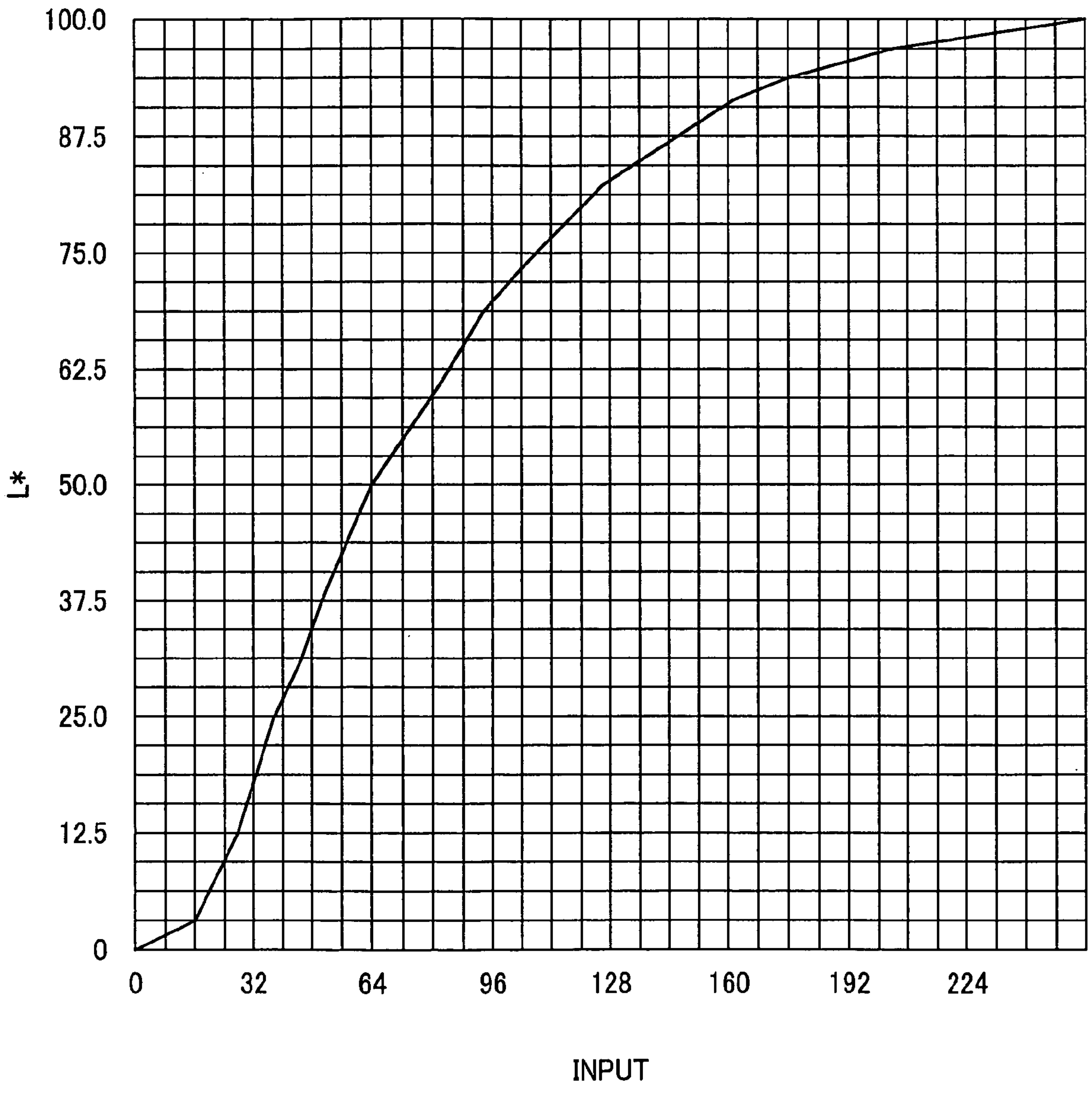
FIG. 34 is a view showing gradation characteristic (before γ-correction) in the system configuration of the first example of the present invention.

The gradation characteristic in the previously described drive condition of the system of the first example is shown in FIG. 34. This characteristic is the characteristic in which brightness index is determined from reflection factor with respect to input time width. If this characteristic is linear, gradation reproduction of 768 gradations can be made as it is with respect to input of 768 gradations. In practice, since reflection factor change is large at the intermediate gradation, increase percentage of brightness index with respect to input increase percentage becomes large at the low frequency band side in a manner as shown in FIG. 34. Namely, there results the tendency that the gradation reproduction of the low frequency band side becomes coarse. Thus, it is understood that 768 gradation is not satisfactorily reproduced.

It is known that the number of gradations that the human being can visually recognize is 256 at the most. For this reason, if γ-correction is implemented to an input signal so that 256 gradations are provided, reproduction can be made.

Figure 35:
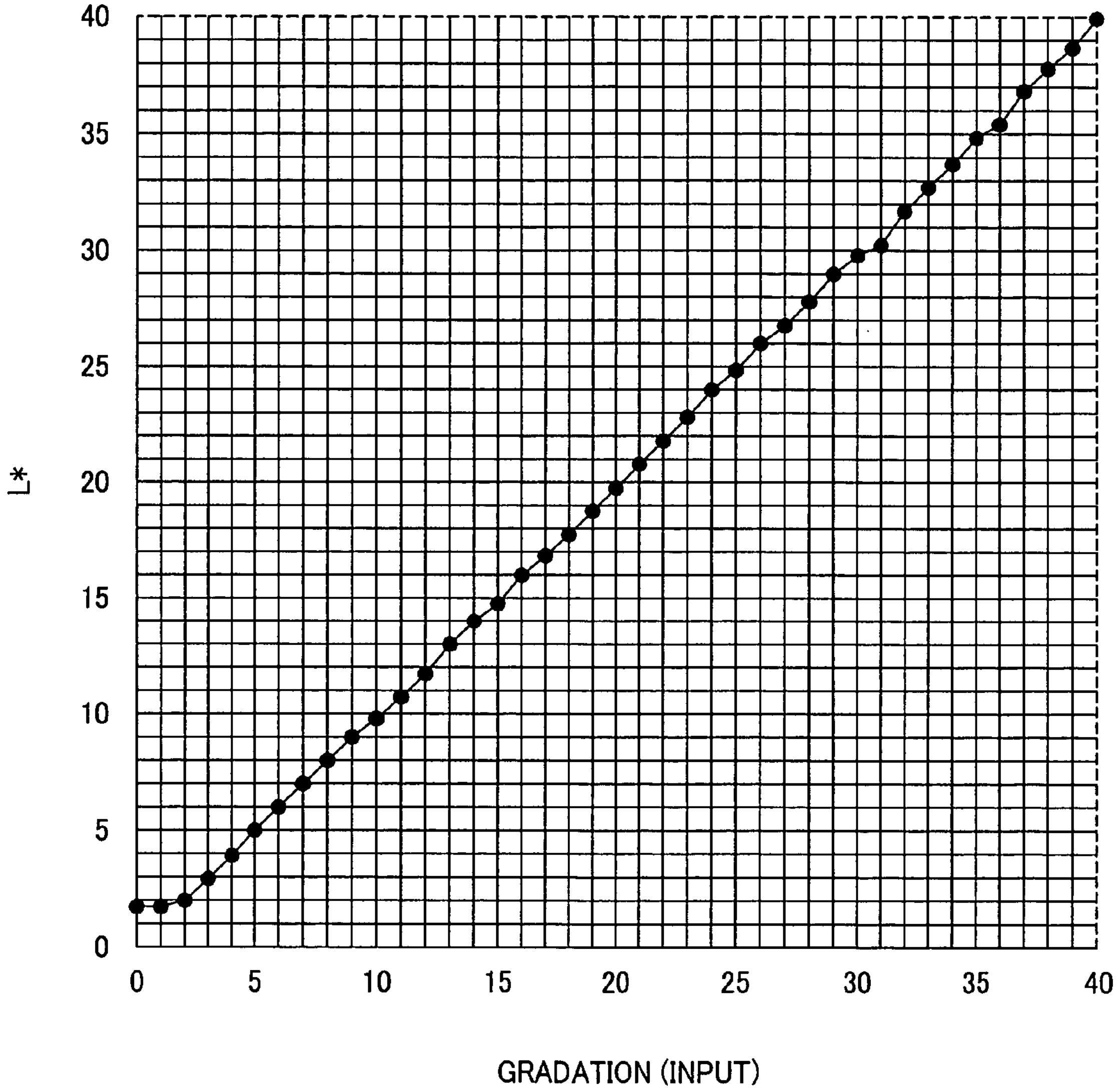
FIG. 35 is a view showing gradation characteristic (after γ-correction) in the system configuration of the first example of the present invention.
Figure 45:
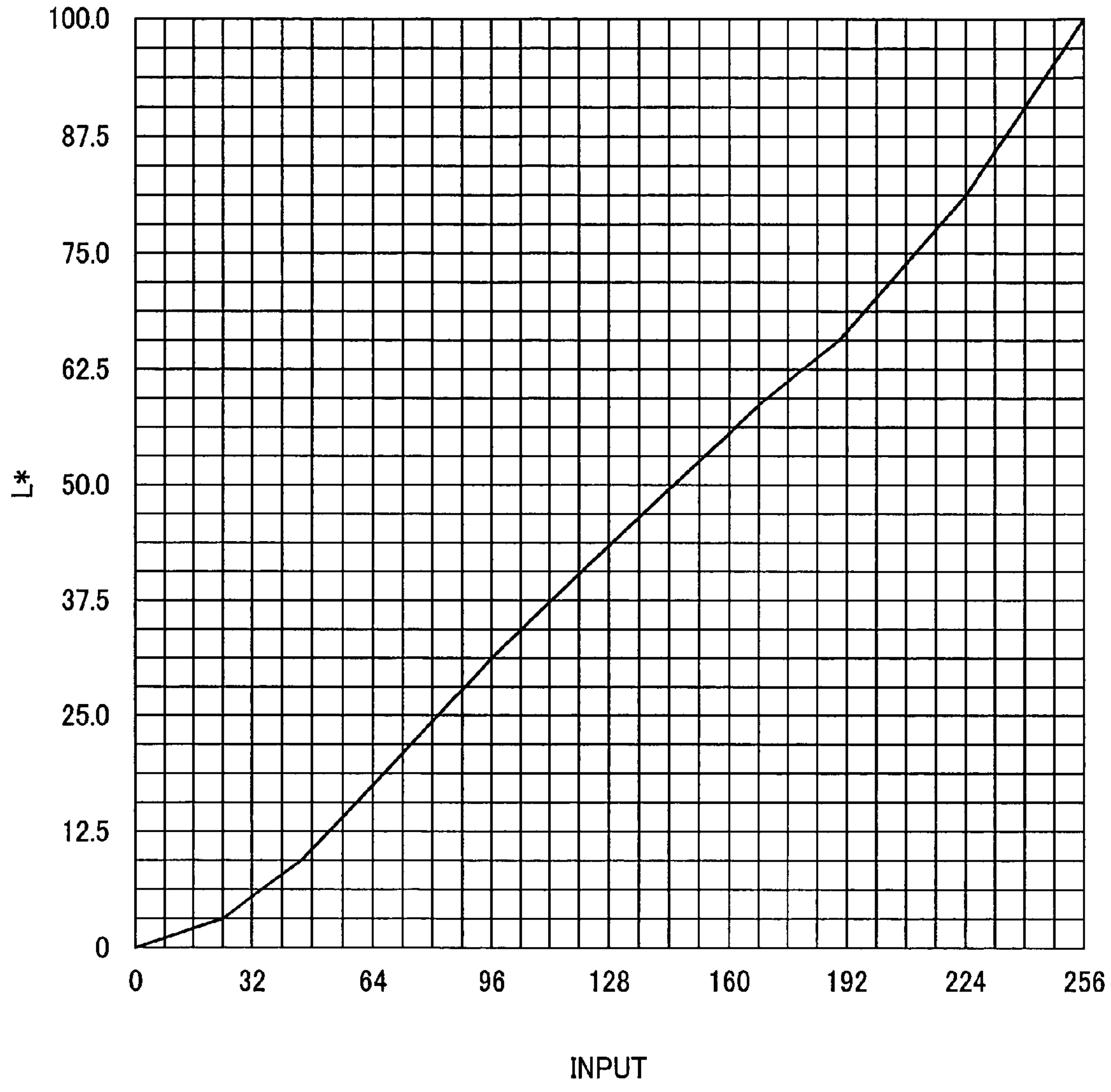
FIG. 45 is an explanatory view showing gradation characteristic in the system configuration of the second example of the present invention.

FIG. 35 shows, in an enlarged manner, the low frequency band portion as a γ-corrected gradation characteristic. As seen from this figure, if γ-correction is implemented, the characteristic which is approximately linear with respect to input of gradation can be obtained. Namely, this indicates that change quantity smaller than change quantity of 1/256 can be obtained as output corresponding to gradation, and indicates that reproduction of 256 gradations can be made as described above.

In the system configuration by such first example, 4 MHz is provided at bus width 32 bits as data transfer speed between the formatter unit 1 and the display panel 2 which are shown in FIG. 4. In this way, in this embodiment, lowering of data transfer speed can be realized to much degree.

5 System Configuration Example (Second Example)

Subsequently, explanation will be given in connection with the second example of the display system as this embodiment.

Also in the system as the second example, with respect to the display panel 2, display panel having resolution as WXGA (1280×768) is employed. The field frequency is assumed to be 120 Hz, and the number of subfields is assumed to be 12. Also in this case, time of 1H becomes equal to 1/120/768/12=904 ns.

The drive condition in this display panel 2 was set as follows.

Namely, normally white 54° SCTN mode is employed, and p-type nematic liquid crystal of Δn0.15, Δε9 and rotation viscosity 70 mPa*sec was used. Pretilt angle was set to 3° and cell thickness was set to 1.9 μm.

Pixel electrode potential ($V_{pix}$) is such that Hi=1.7V and Lo=0V, and common potential ($V_{com}$) is positive/negative to perform switching by 3.0V/−1.6V. Thus, voltage between liquid crystal layers is ±1.3V in terms of black level and ±3.0V in terms of white level.

In this second example, weighting quantities in point of time every respective subfields are set as shown in FIG. 36.

Namely, subfield 0=1×3+1/12 subfield 1=2×3+1/12 subfield 2=4×3+1/12 subfield 3=8×3+1/12 subfield 4=16×3+1/12 subfield 5=32×3+1/12 subfield 6=64×3+1/12 subfield 7=128×3+1/12 subfield 8=128×3+1/12 subfield 9=128×3+1/12 subfield 10=128×3+1/12 subfield 11=128×3+1/12

Here, in the weighting formula for time widths of respective subfields shown in FIG. 36, respective terms corresponding to weight of the subfield are respectively multiplied by [3]. This means that interlace scanning is conducted with three lines being as one set. In the second example, also as understood from the subfield pattern shown below, since 256 degradations are represented by data of 256 gradations, interlace scanning with three lines being as one set is employed on the basis of the fact that the relationship of 768/256=3 holds with respect to 768 gradations and 256 gradations.

Subfield patterns in this case are formed in a manner as shown in FIGS. 37 to 44. Also in these respective figures, gradation is indicated in longitudinal direction, and time widths of respective subfield data are indicated in lateral direction. In this case, 256 gradation is employed.

Here, as compared to subfield patterns of the first example (FIG. 9 to FIG. 32), it is understood that way of weighting of time in respective subfields is different from that of the second example. Following this, subfield pattern is also different. For example, when reference is made to weighting of time width, it is understood that the second example has shorter time with respect to subfield 6 to 10.

The operation of the liquid crystal varies every kind thereof, but weighting of time width should be determined by the operation of the liquid crystal. Normally black is employed in the first example, whereas normally white is employed in the second example. In the case where normally white is employed in the subfield system, when a large number of subfields in which output time width of subfield has been shortened are not provided as compared to the case of normally black, it is understood that satisfactory gradation reproducibility cannot be obtained. The reason why the subfield pattern as the second example is different from that of the first example in a manner as described above is based on such reason.

Also as previously described, the number of bits necessary for gradation representation of normally white can be reduced as compared to that of the normally black.

For this reason, in forming subfield patterns shown in FIGS. 37 to 44, data which represents 256 gradation by 8 bits is used. In this case, since 256 gradation is represented even in the case of subfield data, γ-correction is not performed with respect to this data of 256 gradation of 8 bits. Lower order 4 bits in this 8 bit data are assigned to subfields 0 to 3. MSB of 8 bit data is assigned to the subfield 11. Subfield data in which equal weighting by 16 has been made from the remaining 3 bits is prepared by a logic circuit to respectively assign those data to subfield data 4 to 10.

In this case, at the subfield data generating logic unit 11, circuit is constituted in order to have ability to prepare subfield pattern in a manner as described above. In this case, the input bus width of the subfield data generating logic unit 11 is caused to be 8 bits, and data by 256 gradation of 8 bits which is not γ-corrected are transferred in parallel through this input bus.

The gradation characteristic in the drive condition of the system of the previously described second example is shown in FIG. 46. This characteristic is also caused to be the characteristic in which brightness index is determined from reflection factor with respect to input time width. As understood from this figure, in the second example, reproduction of 256 gradation can be approximately made with respect to input of 256 gradation.

Also in accordance with such system configuration by the second example, lowering of data transfer speed between the formatter unit 1 and the display panel 2 is realized to much degree.

In order to realize output state of the subfield data shown in FIG. 1 as the present invention, in addition to employment of the approach to sequentially conduct interlace scanning every one scanning line in a manner explained in FIG. 2, such output state can be realized also by employing, e.g., the configuration as described below. Namely, with respect to scanning of row, in place of sequential interlace scanning, there is employed such an approach to suitably apply required subfield data to respective rows while conducting simultaneously scanning all rows or predetermined plural rows. Thus, output state of subfield data as shown in FIG. 2 can be obtained. In this case, there takes place the necessity of disposing, in parallel, set of data lines corresponding to the number of subfields in correspondence with columns of respective pixels. As a result, the structure of the display substrate becomes complicated. For example, as explained as the first example and the second example of the system, there frequently takes place the case where the number of subfields in practice becomes equal to about 10 to 12. However, it is relatively difficult to actually connect so far as 10 data lines with respect to respective pixel columns in the state disposed in parallel.

When viewed from such a point, in the system configuration on the premise of interlace scanning which has been explained until now, since it is sufficient that the number of data lines corresponding to respective pixel columns is one (the case of the pixel structure shown in FIG. 7), or two (the pixel structure shown in FIG. 6), more simple display substrate structure is provided and display apparatus can be actually and easily formed.

The display apparatuses as the system of the first and second examples are permitted to function as a reflection type light valve for projector or a light valve for virtual image display in combination with light source, illuminating unit and/or projection lens. The present invention is not limited to such use purpose, but may be applied also to, e.g., transmission type or direct-viewing display.

For example, while active matrix is formed on Si substrate in the above-mentioned embodiment, TFT active matrix of similar pixel structure may be constituted on glass substrate. Further, in such case, the present invention can be applied to various configurations such as transmission type display in combination with back light, or reflection type display provided with reflection electrode on the substrate, etc.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

INDUSTRIAL APPLICABILITY

As explained above, the present invention is adapted to output corresponding subfield data every plural subfields by pulse width modulation to thereby drive display element. In driving this display element, display drive is conducted in such a manner that respective plural subfield data are simultaneously outputted even at any time point within one field time period.

Output state of such subfield data is provided, whereby plural subfields are not sequentially rewritten within one field time period as in the case of the prior art as the PWM control system based on the subfield system, but rewrite operations with respect to respective subfields are first completed after one field time period is completed. Thus, transfer speed of data to be transferred in correspondence with the minimum time width can be greatly lowered as compared to the case of display drive by the conventional general subfield system. As a result, e.g., design of the display drive system becomes realistic and easy.

The data transfer speed is lowered, whereby SDRAM can be employed with respect to memory for holding subfield data, e.g., field memory, etc. In the existing state, since manufacturing cost of SDRAM is low among various RAMs, reduction in cost as the display apparatus can be realized.

In the present invention, bit inverting function is given as a circuit configuration for driving pixel. Thus, common inverting drive for inverting common potential can be made. If such common inverting drive is employed, reduction in pixel drive voltage can be realized. Accordingly, it becomes possible to reduce withstand voltage of transistor element, etc. which forms a drive circuit for driving pixels. Thus, e.g., high fineness and/or miniaturization of liquid crystal display device can be hastened.

The invention claimed is:

1. A display apparatus adapted for driving a light modulation element to thereby perform image display, the display apparatus comprising drive means adapted to output corresponding subfield data every predetermined plural subfields by pulse width modulation to thereby drive the light modulation element, and adapted to drive the light modulation element in such a manner that respective subfield data are simultaneously outputted also at any time point within one field time period, wherein the drive means includes pixel drive means comprising a memory cell and a polarity selector, whereby two data lines are drawn out for every pixel from a latch circuit in order to simultaneously import positive data and negative data, wherein the memory cell simultaneously holds the data and the negative data, wherein the memory cell outputs the positive data and the negative data to the polarity selector and the polarity selector output any one of the positive data or the negative data in accordance with accordance with pulse timing as the polarity switching signal, and common potential inverting means capable of inverting polarity of common potential to be applied to the light modulation element in accordance with the positive time period and the negative time period.

2. The display apparatus as set forth in claim 1, wherein memory means for holding subfield data is provided, and wherein the drive means is caused to be of the configuration for reading out, from the memory means, in accordance with a timing at which the scanning line is scanned, subfield data which should be written into a pixel corresponding to the scanning line to be scanned to output the subfield data which has been read out to a data line of the display apparatus.

3. The display apparatus as set forth in claim 1, wherein the pixel drive means comprises a memory cell to which subfield data is inputted on one bit basis, bit inverting means for switching, in accordance with the positive time period and the negative time period, subfield data held in the memory cell so that it becomes positive data or negative data to have ability to output the subfield data thus switched, and an output buffer for applying data outputted from the bit inverting means to a pixel electrode for driving pixel.

4. A display apparatus adapted for driving a light modulation element to thereby perform image display, the display apparatus comprising drive means adapted to output corresponding subfield data every predetermined plural subfields by pulse width modulation to thereby drive the light modulation element, and adapted to drive the light modulation element in such a manner that respective subfield data are simultaneously outputted also at any time point within one field time period, wherein the drive means includes pixel drive means comprising a memory cell and plurality selector, wherein the memory cell comprises an electrostatic capacitor connected to a transistor, whereby only positive data is inputted into the memory cell, and at a timing where a road drive signal is output from a road driver and applied to the memory cell, the positive data is held within the memory cell, and wherein the polarity selector employs a circuit configuration in which switching between an operation to output positive data written and held in the memory cell in an operation to output inverted data as negative data can be performed in accordance with a change of an H/L level of pulse as a polarity switching signal.

* * * * *